(12) United States Patent
Kikkawa

(10) Patent No.: US 12,473,200 B2
(45) Date of Patent: Nov. 18, 2025

(54) GREEN ENERGY TRANSPORTATION SYSTEM AND TRANSPORTATION METHOD USING GREEN HYDROGEN

(71) Applicant: Yoshitsugi Kikkawa, Yokohama (JP)

(72) Inventor: Yoshitsugi Kikkawa, Yokohama (JP)

(*) Notice: Subject to any disclaimer, the term of this patent is extended or adjusted under 35 U.S.C. 154(b) by 0 days.

(21) Appl. No.: 19/032,012

(22) Filed: Jan. 18, 2025

(65) Prior Publication Data

US 2025/0296837 A1 Sep. 25, 2025

(30) Foreign Application Priority Data

Mar. 25, 2024 (JP) ................. 2024-048549

(51) Int. Cl.
   *C01B 3/36* (2006.01)
   *C01B 32/40* (2017.01)
   (Continued)

(52) U.S. Cl.
   CPC ............... *C01B 3/36* (2013.01); *C01B 32/40* (2017.08); *C07C 1/12* (2013.01); *C25B 15/081* (2021.01); *F25J 1/0022* (2013.01); *F25J 1/0027* (2013.01); *F25J 1/0229* (2013.01); *H01M 8/0656* (2013.01); *H01M 2008/1293* (2013.01)

(58) Field of Classification Search
   CPC .... C01B 3/00; C01B 3/02; C01B 3/32; C01B 3/34; C01B 3/36; C01B 32/00; C01B 32/40; C07C 1/00; C07C 1/02; C07C 1/12; C25B 15/00; C25B 15/08; C25B 15/081; F25J 1/00; F25J 1/0002; F25J 1/0022; F25J 1/0027; F25J 1/02; F25J 1/0228; F25J 1/0229; H01M 8/00; H01M 8/06; H01M 8/0606; H01M 8/0656; H01M 2008/00;
   (Continued)

(56) References Cited

U.S. PATENT DOCUMENTS 10,208,665 B2 * 2/2019 Simpson ............... C25B 9/73

FOREIGN PATENT DOCUMENTS

| JP | 2023-122581 A | 9/2023 |
| WO | 2018/069993 A1 | 4/2018 |

* cited by examiner

Primary Examiner — Natasha E Young
(74) Attorney, Agent, or Firm — Troutman Pepper Locke LLP

(57) ABSTRACT

There is provided a transportation system that can efficiently transport renewable energy from power generation facilities in remote locations to hydrogen energy consumption areas with low environmental impact. The system includes a power generator that generates and stores electricity using renewable energy, a water electrolyzer that generates hydrogen by electrolyzing water using the electricity generated by the power generator, a methane synthesizer that generates methane using the hydrogen generated and recycled $CO_2$ as raw materials through the Sabatier reaction, a methane transportation means that transports the generated methane to the hydrogen energy consumption site without emitting $CO_2$ into the atmosphere, a hydrogen production and carbon capture unit that produces hydrogen by autothermal reforming method using the transported methane and separately prepared oxygen as raw materials, and a $CO_2$ transportation means that transports the recycled $CO_2$ without emitting $CO_2$ into the atmosphere to the site where the methane synthesizer is installed.

20 Claims, 22 Drawing Sheets

(51) Int. Cl.
*C07C 1/12* (2006.01)
*C25B 15/08* (2006.01)
*F25J 1/00* (2006.01)
*F25J 1/02* (2006.01)
*H01M 8/0656* (2016.01)
*H01M 8/12* (2016.01)

(58) Field of Classification Search
CPC ......... H01M 2008/10; H01M 2008/12; H01M 2008/1293
See application file for complete search history.

FIG.11
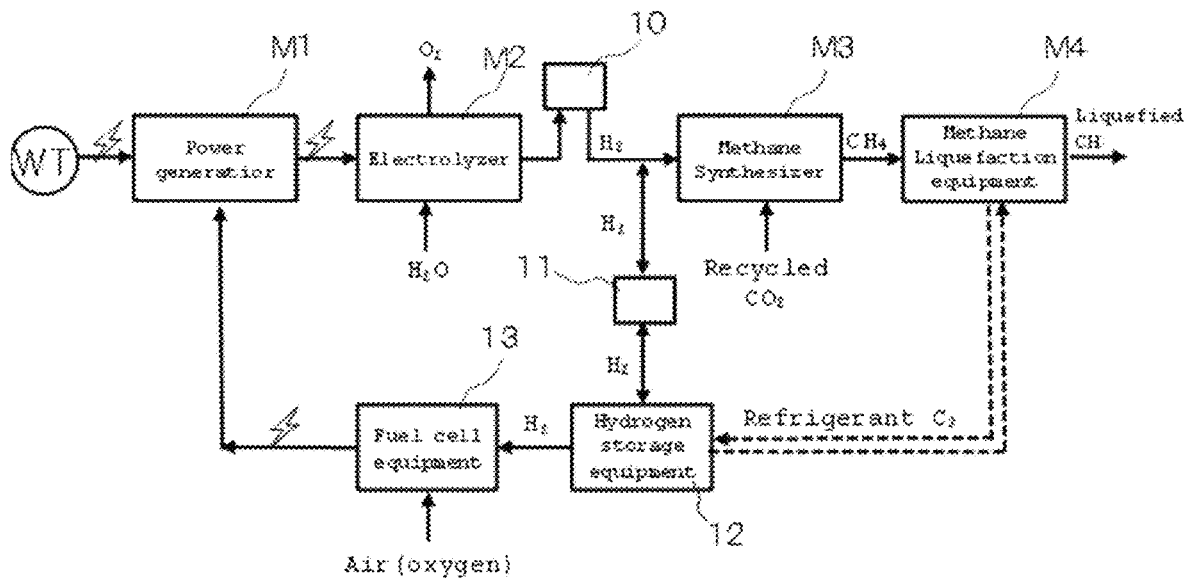
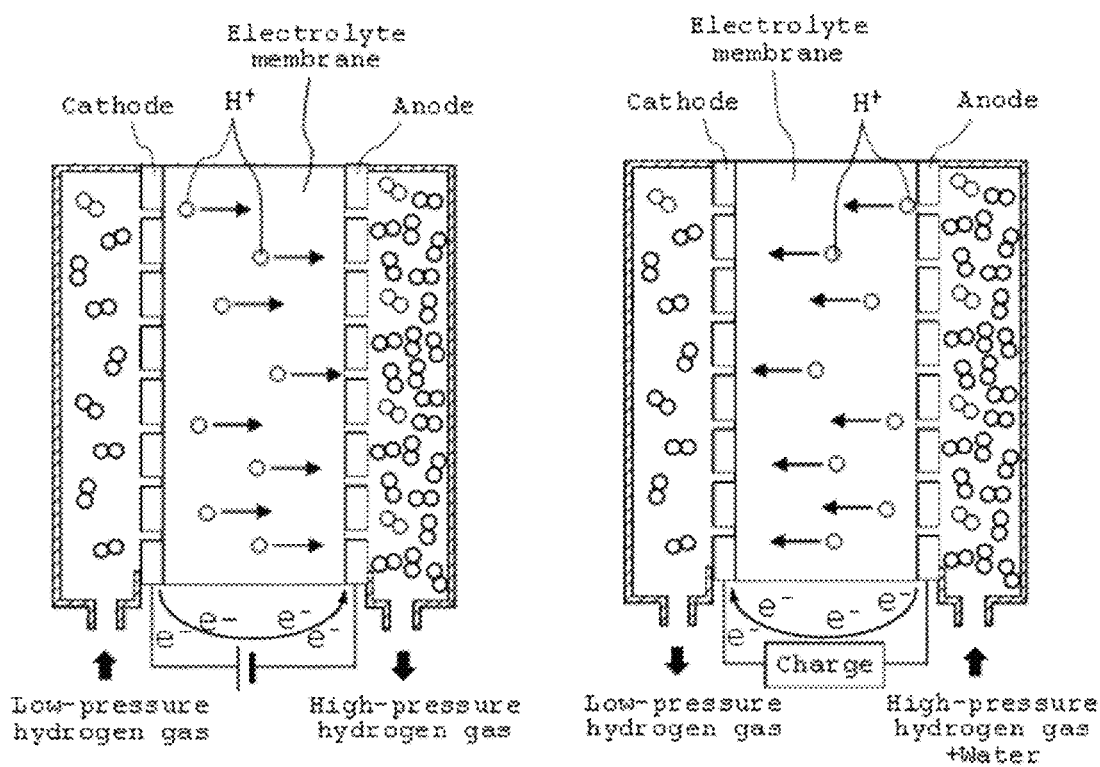
FIG.12A      FIG.12B

FIG.13
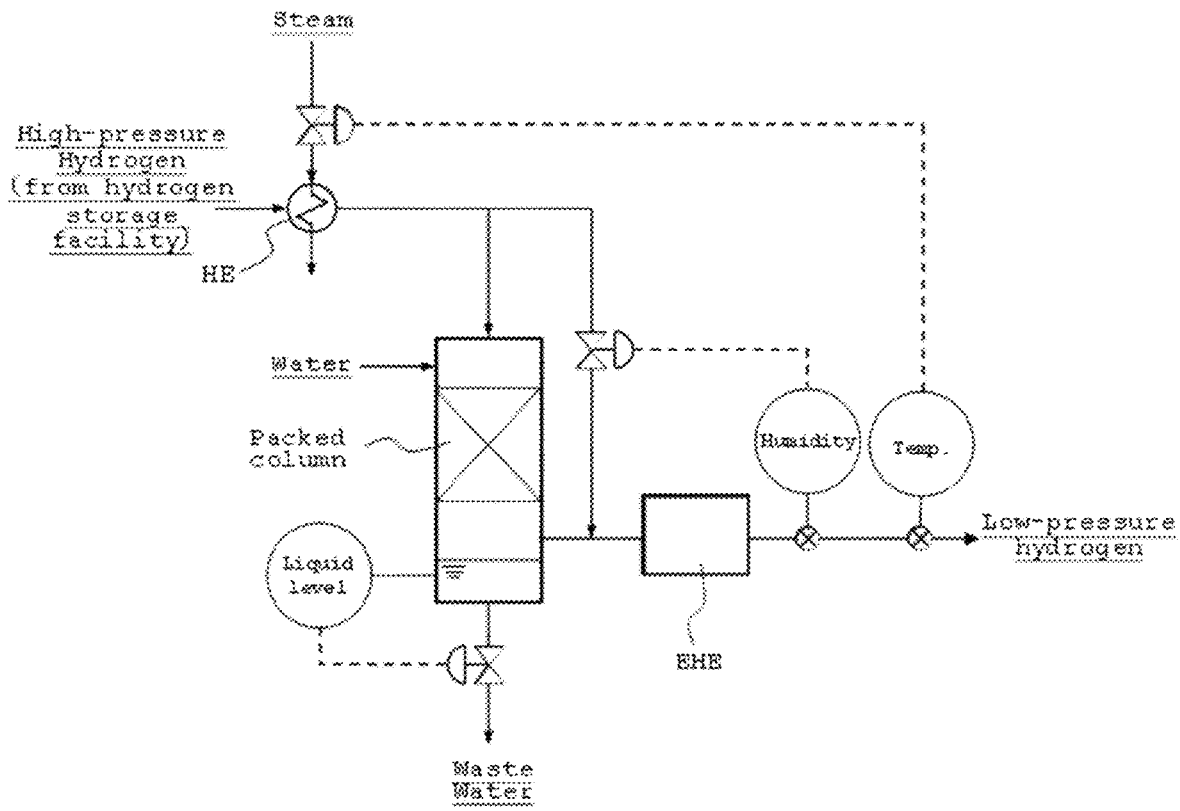
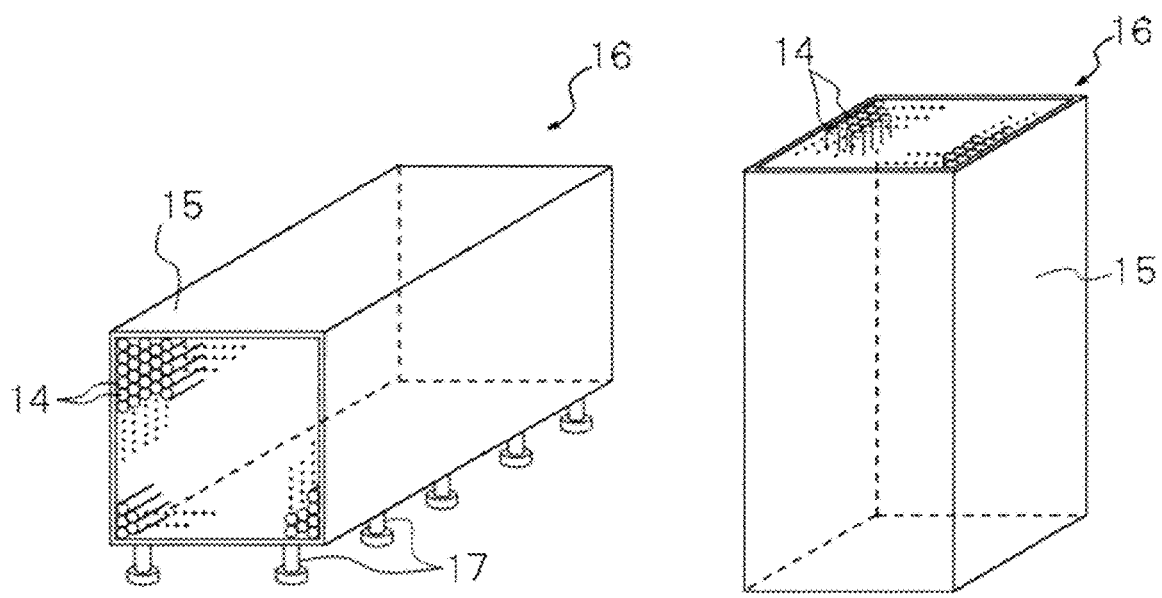
FIG.14A    FIG.14B

| Stream property Stream No. Name | ① Liquefied methane | ② Methane gas | ③ Highly concentrated CO₂ | ④ Liquefied CO₂ |
|---|---|---|---|---|
| -- Overall -- | | | | |
| Molar flow rate kmol/s | 1 | 1 | 1 | 1 |
| Mass flow rate kg/s | 16.043 | 16.043 | 44.01 | 44.01 |
| Temperature C | -162 | 17.8865 | 30 | -46 |
| pressure bar | 50 | 49.5 | 65 | 64.5 |
| Vapor mol fraction | 0 | 1 | 1 | 0 |
| Enthalpy MJ/s | -89.471 | -75.935 | -397.73 | -411.27 |
| Tc C | -82.58 | -82.51 | 31.05 | 31.05 |
| Pc bar | 46.0015 | 46.0015 | 73.8152 | 73.8152 |
| Std sp gr. wtr =1 | 0.3 | 0.3 | 0.827 | 0.827 |
| Std sp gr. air =1 | 0.554 | 0.554 | 1.52 | 1.52 |
| Degree API | 340.1666 | 340.1666 | 39.6004 | 39.6004 |
| Average mol wt | 16.043 | 16.043 | 44.01 | 44.01 |
| Actual dens kg/m³ | 424.8002 | 36.8313 | 812.1146 | 1140.8702 |
| Actual vol m³/h | 135.9676 | 1568.0917 | 746.936 | 138.8729 |
| Std liq m³/h | 192.5163 | 192.5163 | 191.5795 | 191.5795 |
| Std vap 0 C m³/h | 80669.133 | 80669.133 | 80669.133 | 80669.133 |

FIG.41

Map of U.S. interstate and intrastate natural gas pipelines

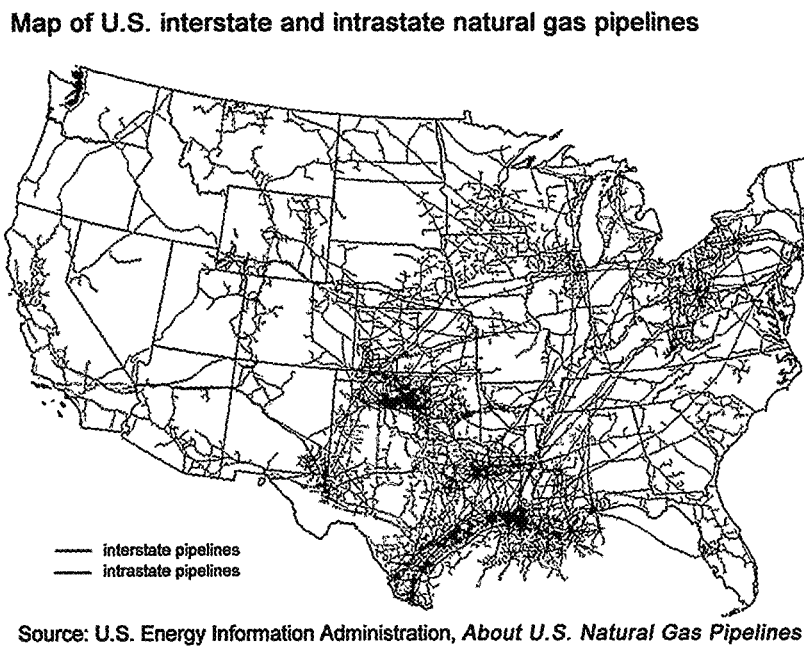

Source: U.S. Energy Information Administration, *About U.S. Natural Gas Pipelines*

FIG.42

Carbon Capture Pipeline for Net Zero America

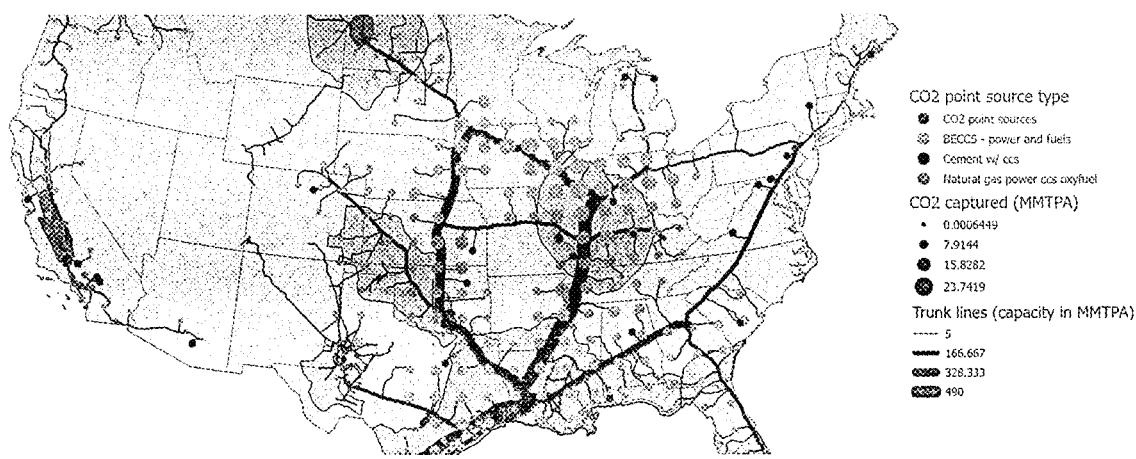

Here, a map of the United States shows where carbon capture pipelines and projects would be in the year 2046 to 2050 under the high biomass (E- B+) scenario, in which bioenergy with carbon capture and storage (BECCS) is a primary energy resource.

Copyright © 2022 Kikkawa Giken All Rights Reserved.

GREEN ENERGY TRANSPORTATION SYSTEM AND TRANSPORTATION METHOD USING GREEN HYDROGEN

This application claims priority to and the benefit of Japanese Patent Application No. JP2024-048549, filed in the Japanese Intellectual Property Office on Mar. 25, 2024 the entire contents of which are incorporated herein by reference.

TECHNICAL FIELD

This invention relates to a green energy transportation system and method using green hydrogen.

BACKGROUND ART

With growing concern about global environmental issues, there is a focus on power generation using so-called renewable energy sources such as wind, solar, solar thermal, geothermal, hydro, wave, and biomass, as a means of replacing finite fossil fuels such as oil, coal, and liquefied natural gas (hereinafter referred to as "LNG") and mitigating global warming. However, since power generation using renewable energy is affected by natural phenomena, if the proportion of electricity generated by this method that is connected to the existing power grid increases, there is a risk that the voltage and frequency will become unstable, and this could interfere with the maintenance of power quality.

Therefore, a technology has been proposed that uses renewable energy to produce hydrogen using a so-called green hydrogen production method that emits almost no $CO_2$, and then uses the resulting green hydrogen as a feed for fuel cells in energy-consuming areas with high energy demand. For example, Patent Document 1 discloses a technology including a hydrogen production unit that uses electricity supplied from a power generation unit that generates electricity using renewable energy such as wind power and solar power to produce hydrogen by electrolysis of water, a hydrogen storage unit that stores the hydrogen produced in the hydrogen production unit, in for example a hydrogen tank, and a hydrogen power generation unit comprising for example a fuel cell that uses the hydrogen stored in the hydrogen storage unit to generate electricity in energy consumption areas.

CITATION LIST

Patent Literatures

[Patent Literature 1] International publication No. 2018/069993

SUMMARY OF INVENTION

Technical Problem

As mentioned above, since hydrogen can be stored in large quantities, use of the technology of Patent Document 1, makes it possible to stably supply energy in the form of hydrogen energy using unstable renewable energy. However, the power generation facilities for renewable energy, such as wind power and solar power, mentioned above are often installed in the polar regions or desert areas, which are generally remote from densely populated urban areas or suburban hydrogen energy consumption site, taking into account natural conditions such as wind conditions, land prices, and social impact. Therefore, technology that can efficiently and cost-effectively transport energy from such remote locations to areas where hydrogen energy is consumed is required for green hydrogen production using renewable energy.

In addition, in the above-mentioned energy transportation, it is important to reduce the emission of carbon dioxide, which is cited as one of the causes of global warming due to the greenhouse effect, in order to popularize the method of green hydrogen production using renewable energy. This invention was made in light of the above circumstances, and aims to provide a green energy transportation system that can transport hydrogen energy from green hydrogen production facilities in remote areas that use electricity of renewable energy to an energy consumption site with low environmental impact and high efficiency.

Solution to Problem

In order to achieve the above objective, the green energy transportation system of the present invention comprises a power generator that generates and stores electricity using renewable energy, a water electrolyzer that generates hydrogen by electrolyzing water using the electricity obtained from the power generator, a methane synthesizer that generates methane through the Sabatier reaction using the hydrogen generated by the water electrolyzer and recycled $CO_2$ as raw materials, a methane transportation means that transports the methane generated by the methane synthesizer to a hydrogen energy consumption site without emitting $CO_2$ into an atmosphere, a hydrogen production and carbon capture unit that produces hydrogen by an autothermal reforming method, which is a process that generates a synthesis gas containing hydrogen and carbon monoxide by sequentially causing partial oxidation reactions of the methane and steam reforming reaction to occur in reactors, using the methane transported by the methane transportation means and oxygen prepared separately as raw materials and that recovers high-concentration $CO_2$ as recycled $CO_2$ from a process gas produced during the hydrogen production, and a $CO_2$ transportation means that transports the recycled $CO_2$ to a methane synthesis base where the methane synthesizer is installed without emitting $CO_2$ into an atmosphere. The system further has an oxygen transportation means that transports the oxygen generated by the water electrolyzer to the hydrogen energy consumption site without emitting $CO_2$ into an atmosphere.

The green energy transportation method of the present invention comprises a power generation step that generates and stores electricity using renewable energy, a water electrolysis step that generates hydrogen by electrolyzing water using the electricity obtained in the power generation step, a methane synthesis step that generates methane using the hydrogen generated by the water electrolysis step and recycled $CO_2$ as raw materials through a Sabatier reaction, and a methane transportation step that transports the methane generated in the methane synthesis step to a hydrogen energy consumption site by using a means that does not emit $CO_2$ into the atmosphere, a hydrogen production and carbon capture step that produces hydrogen and carbon monoxide by a autothermal reforming method, which is a process that generates a synthesis gas containing hydrogen and carbon monoxide by sequentially causing a partial oxidation reaction of the methane and a steam reforming reaction to occur in a reactor using the methane transported by the methane transportation step and oxygen prepared separately as raw materials and that recovers high concentration $CO_2$ as recycled $CO_2$ from a process gas produced during the hydrogen production, and a $CO_2$ transport step that transports the recycled $CO_2$ to the methane synthesis site where the methane synthesis step is carried out by using a means that does not emit $CO_2$ into the atmosphere. The method further has an oxygen transport step that transports the oxygen generated by the water electrolysis step to the hydrogen energy consumption site by using a means that does not emit $CO_2$ into the atmosphere.

Effects of Invention

According to the present invention, it becomes possible to transport hydrogen energy from green hydrogen production facilities in remote locations that use electricity of renewable energy to an energy consumption site with low environmental impact and high efficiency.

BRIEF DESCRIPTION OF DRAWINGS

FIG. 11 shows a block flow diagram of a specific example of a PtG complex facility included in the energy transportation system of the first embodiment of the present invention.

FIG. 12 FIGS. 12A and 12B respectively show schematic vertical cross-section diagrams of an electrochemical hydrogen compressor and an electrochemical hydrogen expander that can be suitably applied to the PtG complex facility included in the energy transportation system of the first embodiment of the present invention.

FIG. 13 shows a process flow diagram showing one specific example of a temperature and humidity control system for high-pressure hydrogen supplied to the electrochemical hydrogen expander of FIG. 12(b).

FIGS. 14A and 14B respectively show perspective views of various specific examples of the hydrogen storage facility shown in FIG. 11.

FIG. 41 shows a map of the natural gas pipeline network that has been laid out across the United States.

FIG. 42 shows a map of the planned $CO_2$ gas pipeline network to be laid out across the United States.

DETAILED DESCRIPTION OF THE INVENTION

1. First Embodiment (Tanker Transportation System)

1-1. Green Energy Transportation System

Figure 1:
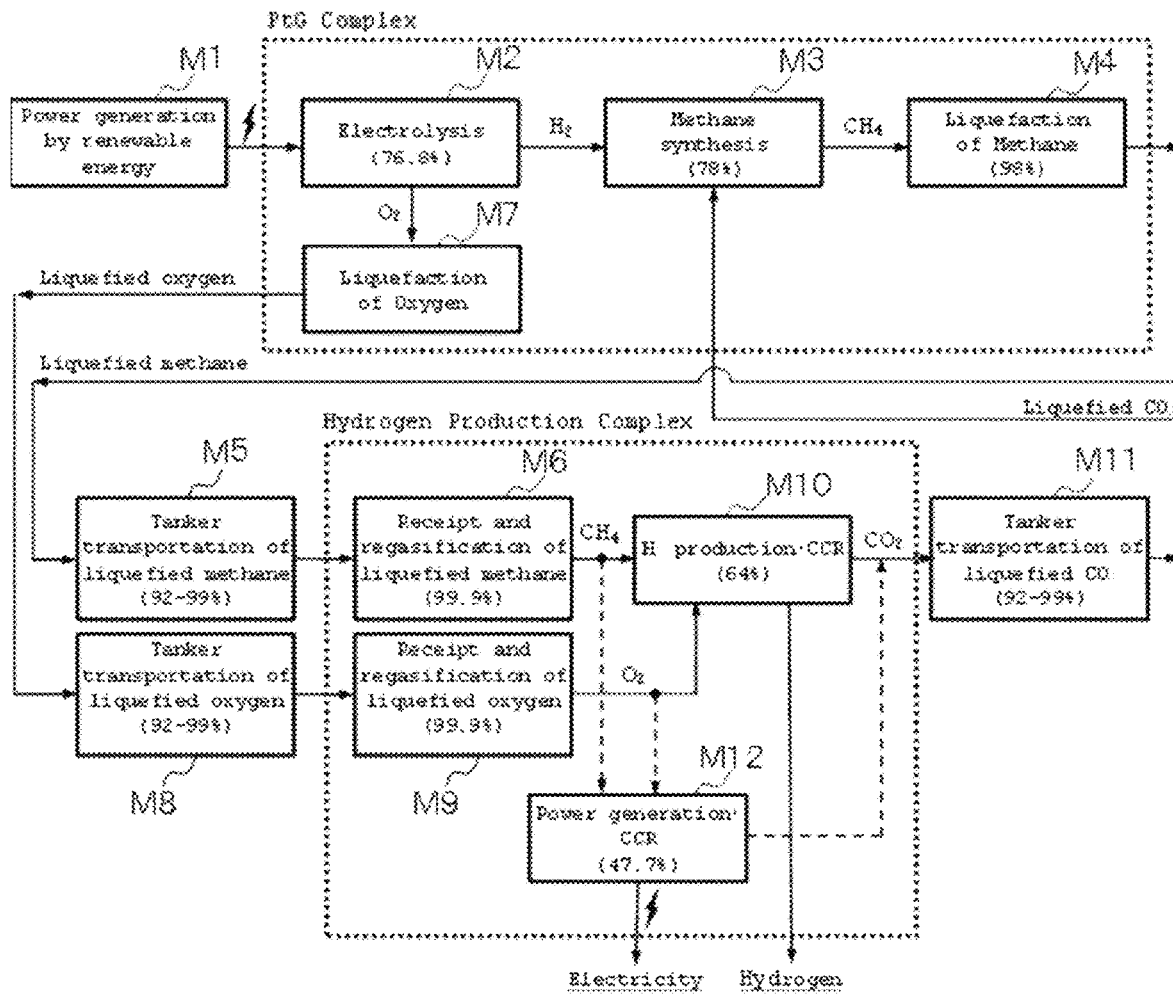
FIG. 1 shows a block flow diagram of the energy transportation system according to the first embodiment of the present invention.

Herein below, the first embodiment of the green energy transportation system that uses renewable energy as an energy source will be described. As shown in FIG. 1, the energy transport system of the first embodiment of the present invention includes a power generator M1 that generates and stores electricity using renewable energy, a water electrolyzer M2 that generates hydrogen by electrolyzing water using the electricity generated by the power generator M1, a methane synthesizer M3 that generates methane through methanation by the Sabatier reaction using the hydrogen generated by the water electrolyzer M2 and recycled $CO_2$ as raw materials, a methane liquefaction unit M4 that liquefies the methane using a rotary-type volumetric refrigerant compressor driven by a synchronous motor to which electricity from renewable energy as an energy source is supplied via a variable-speed motor inverter so as to transport the methane in the form of liquefied methane generated by the methane synthesized M3 liquefied methane transportation means M5 that transports the methane liquefied by the methane liquefaction unit M4 to the hydrogen energy consumption site without emitting $CO_2$ into an atmosphere, a liquefied methane receiving and regasification unit M6 that receives the liquid methane transported by the liquefied methane transportation means M5 into a liquefied methane storage tank and then regasifies it, an oxygen liquefaction unit M7 that liquefies the oxygen generated by the water electrolyzer M2 using a rotary-type volumetric refrigerant compressor driven by a synchronous motor to which electricity from renewable energy as an energy source is supplied via a variable-speed motor inverter so as to transport the oxygen in the form of liquid oxygen, a liquefied oxygen transport means M8 that transports the oxygen liquefied in the oxygen liquefaction unit M7 to the hydrogen energy consumption site without emitting $CO_2$ into an atmosphere, a liquefied oxygen receiving and regasification unit M9 that receives the liquefied oxygen transported by the liquefied oxygen transport means M8 into a liquefied oxygen storage tank and then regasifies it, a hydrogen production and carbon capture unit M10 that produces hydrogen by an Autothermal Reforming method that uses the methane and oxygen as raw materials that have been regasified after being temporarily received by the liquefied methane receiving and regasification unit M6 and the liquefied oxygen receiving and regasification unit M9, respectively, and that recovers high-concentration $CO_2$ gas from a process gas generated during the hydrogen production as recycled $CO_2$, and a $CO_2$ transportation means M11 that transports the recycled $CO_2$, without emitting $CO_2$ into an atmosphere, recovered by the hydrogen production and carbon recovery unit M10 to a methane synthesis site where the methane synthesizer M3 is installed. The green energy transportation system may further include a power generation and carbon capture unit M12 that generates power by respectively extracting portions of the above-mentioned regasified methane and oxygen for reaction to each other, and that recovers carbon emitted during the power generation in the form of high-concentration $CO_2$ gas. In this case, it is preferable to mix the recovered high-concentration $CO_2$ gas with the recycled $CO_2$ recovered by the above-mentioned hydrogen production and carbon capture unit M10 and use it as a raw material in the methane synthesizer M3.

The methane transportation means M5 transports liquefied methane liquefied in the methane liquefaction unit M4 to the hydrogen consumption site in a liquefied methane tanker driven by a first power means that does not emit $CO_2$ to the atmosphere. The hydrogen production and carbon capture unit M10 has a $CO_2$ liquefaction unit (not shown) that liquefies the recovered recycled $CO_2$ in order to transport it in a form of liquid $CO_2$, and the methane synthesis unit M3 has a liquefied $CO_2$ receiving and regasification unit (not shown) that regasifies the liquefied $CO_2$ transported by the liquefied $CO_2$ transportation means M12 after received it in the liquefied $CO_2$ storage tank. Although not limited, the former $CO_2$ liquefaction unit may preferably have a heat exchanger that liquefies $CO_2$ using the cryogenic heat generated when liquefied methane is regasified in the liquefied methane receiving and regasification unit M6. Although not limited, the latter liquefied $CO_2$ receiving and regasification unit may preferably have a similar equipment configuration to the liquefied methane receiving and regasification unit M6 and the liquefied oxygen receiving and regasification unit M8. In this case, the liquefied $CO_2$ transport means M12 transports the liquefied $CO_2$ produced in the $CO_2$ liquefaction unit to the methane synthesis site where the methane synthesizer M3 is installed by using a liquefied $CO_2$ tanker driven by a second power means that does not emit $CO_2$ to the atmosphere. The figures in parentheses in FIG. 1 show the energy efficiency, and in the case of a 3,000 nautical mile distance between the locations of the wind power generation farm and the location of the unit performing the autothermal reforming, the energy efficiency is approximately 64% when a proton exchange membrane (PEM) is used in the water electrolyzer, and approximately 74% when a solid oxide water electrolysis cell unit (SOEC) is used in the water electrolyzer.

Among the above series of unit/means, the hydrogen generation unit M2, the methane synthesizer M3, the methane liquefaction unit M4, and the oxygen liquefaction unit M7 may be collectively referred to as the PtG complex (Power to Gas Complex), while the liquefied methane receiving/regasification unit M6, the liquefied oxygen receiving/regasification unit M9, the hydrogen production/carbon capture unit M10, and the power generation and carbon capture unit M12, which is installed as necessary, may be collectively referred to as the hydrogen production complex. Recoveries of carbon in the hydrogen production and carbon capture unit M10 and power generation and carbon capture unit M12 may be referred to as CCR (Carbon Capture and Reuse). The energy transportation system of the first embodiment of this invention can utilize the existing many infrastructure facilities, such as shipping terminals, LNG tankers, and receiving terminals of LNG, which are used in Japan and around the world as fuel for power generation or as household city gas, so the hurdles to achieving it as an alternative energy to fossil fuels are not considered to be high. Hereinbelow each of these units/means that constitute the green energy transportation system will be described in detail.

Unlike energy generated by combustion of fossil fuels such as oil, coal, and natural gas, the power generator M1 handles a renewable energy that can be used repeatedly because it is derived from natural phenomena on the earth. Typical renewable energies include wind power, photovoltaic power generation, solar thermal power generation, geothermal power generation, hydroelectric power generation, biomass power generation, wave/tidal-current/tidal power generation, etc. Electricity generated by these renewable energies can be transmitted through AC power cables which are most commonly used.

A generation method of the wind power uses force of the wind to rotate a wind turbine, and its rotational motion is transmitted to a generator to generate electricity. A generation method of the photovoltaic power uses solar cells composed of semiconductors or dyes that is irradiated with sunlight to directly convert light energy into electricity. A generation method of the solar thermal power uses a reflector that concentrates sunlight, and heat of this concentrated sun light generates a high-temperature steam which rotates a turbine for electric generation. A generation method of the geothermal power uses steam, produced from rainwater that has percolated underground and heated by magma, to rotate a turbine for electric generation. A generation method of the hydroelectric power uses a force of falling water stored in a dam to rotate a turbine for electric generation. A generation method of the biomass power uses biomass fuels for combustion that are made by recycled organic resources derived from plants and animals other than fossil fuels, such as unused wood resources, sewage sludge, and general waste, such that steam generated by a combustion heat is used to rotate turbine for electric generation. Wave power generation, tidal-current power generation, and tidal power generation all use ocean energy for power generation. Wave power generation using wave energy can be broadly classified into the following types. Namely, a first type rotates a turbine by using air currents generated by a vertical movement of the sea surface in an air chamber. A second type uses wave energy that is converted into hydraulic pressure via a movable body so as to generate electricity using a hydraulic motor. A third type uses a drop (height) of a sea water discharged from a water storage pond to the sea level so as to rotate a turbine for electric generation where the water storage pond stores the sea water originated from an overflow of sea waves. A generation method of the tidal-current power uses a kinetic energy of tidal-current to rotate a turbine for electric generation. A generation method of the tidal power uses a difference in tidal level caused by tides to rotate a turbine for electric generation which is similar to a hydropower generation.

The power generator M1 can use any of the above-described renewable energies as an energy source, but in the following description, the power generator M1 using the wind power as the energy source for electric generation will be exemplarily described. The wind power can stably generate electricity throughout the day and night, and therefore it is suitable for using existing LNG infrastructure facilities, unlike solar photovoltaic and solar thermal power generation which cannot generate electricity at night. According to an article by Cristina L. Archer et al. (Journal of Geophysical Research, Vol. 110, D12110, doi: 10.1029/2004JD005462, 2005), the potential for wind power is estimated to have about five times the world's entire energy demand. If all the energy needed by mankind is supplied from renewable energies, the concentration of carbon dioxide in the atmosphere can be returned to pre-industrial levels, which may suppress the progression of global warming and bring back to the cold weather of the pre-industrial era.

Figure 2:
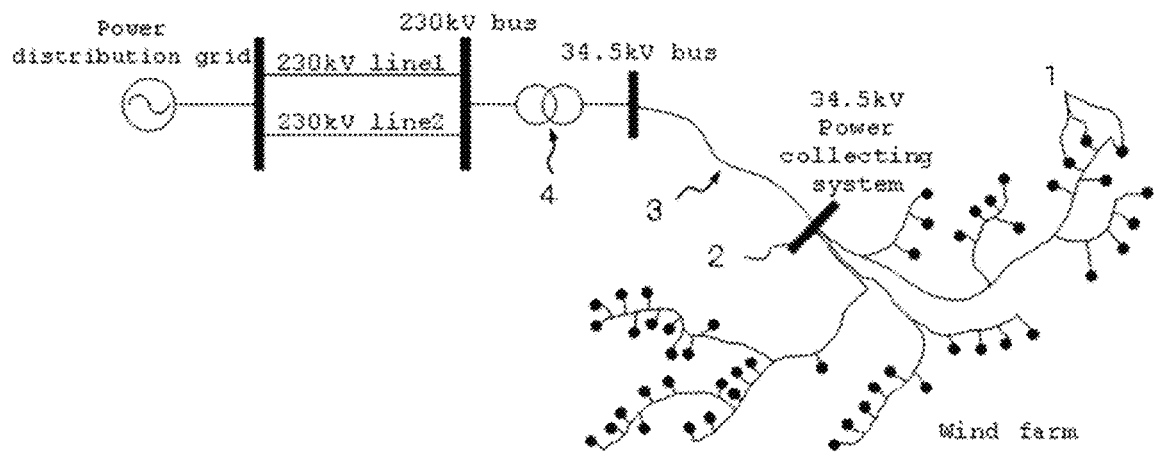
FIG. 2 shows a configuration diagram of one specific example of a power generator that constitutes the energy transportation system of the first embodiment of the present invention.

When the wind power is used as a renewable energy source, it is preferable to operate it as a single power plant as a whole by installing a plurality of wind turbine generators to take advantage of economies of scale, and this type of operation is sometimes referred to as a wind farm. As shown in FIG. 2, for example, a wind farm consists of a plurality of wind power generators (wind turbine generators)

1 with a rated output of 2.5 MW and an output voltage of AC 690 V which are installed offshore along the coast or at a remote location more than about 40 km away. Each output power of the wind turbine generators is boosted to 34.5 kV medium voltage (MV) by pad-mounted or nacelle transformers on the generator side, and then collected in the power collection system 2 and transmitted to the substation 4 via underground or submarine power transmission lines 3. At the substation 4, the output power is boosted to a high voltage (HV) of 69 kV or higher for transmission, which is the power transmission level.

The types of the above-described wind turbine generators can be broadly classified into a fixed-speed wind turbine using cage-type induction generator (SCIG: Squirrel Cage Induction Generator) or a variable-speed wind turbine using a doubly fed induction generator (DFIG: Doubly Fed Induction Generator) or a permanent magnet synchronous generator (PMSG: Permanent Magnet Synchronous Generator). Among these, the variable-speed wind generator is preferable because it is connected to the grid using a power converter and thus can control the generator speed independently of the grid frequency, and the PMSG is more preferable because it can be gearless by being multi-polarized.

The wind farm can achieve, for example, an output capacity of 15,000 MW by installing 1,000 units of wind turbine generators (V236-15.0 MW) manufactured by VESTAS as shown in Table 1 below, in a substantially matrix pattern.

TABLE 1

| Wind Power Generator | |
|---|---|
| Rated output | 15.0 MW |
| Number of units | 1,000 |
| Rotor diameter (D) | 236 m |
| Separation distance between adjacent generators | |
| Wind direction (7D) | 1,652 m |
| Perpendicular to wind direction (4D) | 944 m |
| Wind Farm | |
| Capacity | 15,000 MW |
| Total length in wind direction | 39,648 m (24 rows) |
| Total width perpendicular to wind direction | 39,648 m (42 columns) |

Figure 3A:
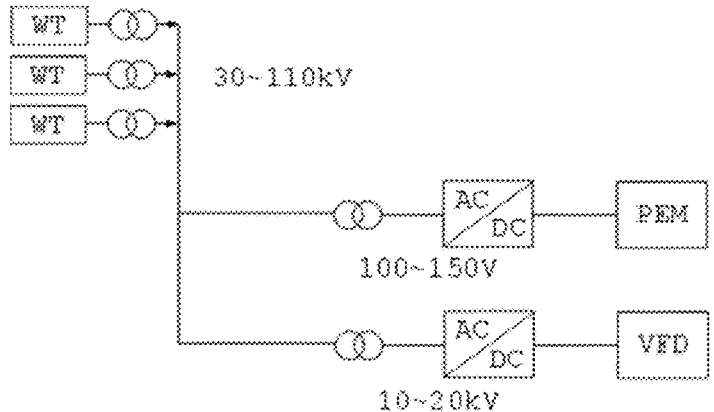
FIGS. 3A and 3B respectively show a conventional power distribution diagram and a specific example of a power distribution diagram for a power generator that constitutes the energy transportation system of the first embodiment of the present invention.

There are two types of power transmission from the wind turbine generator 1 to the substation 4 described above, i.e., AC transmission and DC transmission, which are appropriately selected in consideration of the economy. As shown in FIG. 3A, for example, the power distribution configuration in the case of AC power transmission is as follows: the output voltage of AC 690 V generated by the wind turbine generator (WT) is boosted to 30 to 110 KV by a transformer, and then it is transmitted via a cable of 3-phase AC to a transformer installed near the synchronous motor for driving the refrigerant compressor used in the methane liquefaction unit M4. The output voltage is stepped down by the latter transformer installed near the synchronous motor to 10 to 20 kV and then it is supplied to a VED (Variable Frequency Drive). Inside the VFD, a DC current converted by an AC-DC converter is converted to AC current of variable frequency by an inverter and this AC current is fed to the synchronous motor. On the other hand, the output voltage is stepped down to 100 to 150 V by a transformer and then it is converted to DC current of 100 to 150 V by an AC-DC converter and this DC current is fed to the electrolyzer for electrolysis of water used in the water electrolyzer M2. For this AC power transmission, the number of the transmission cables are in principle three (3) cables or three (3) sets of two (2) cables.

Figure 3B:
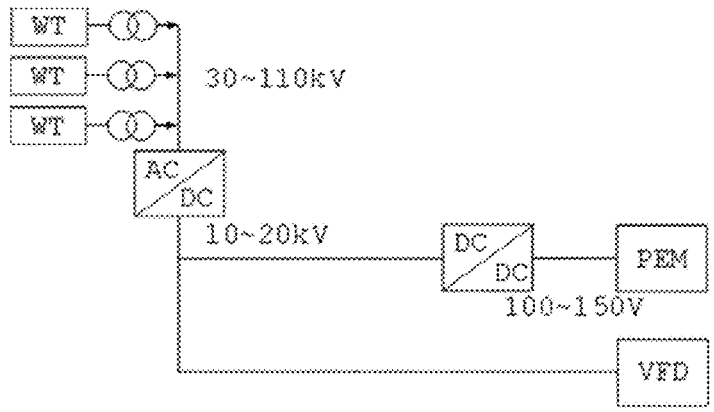
Figure 4:
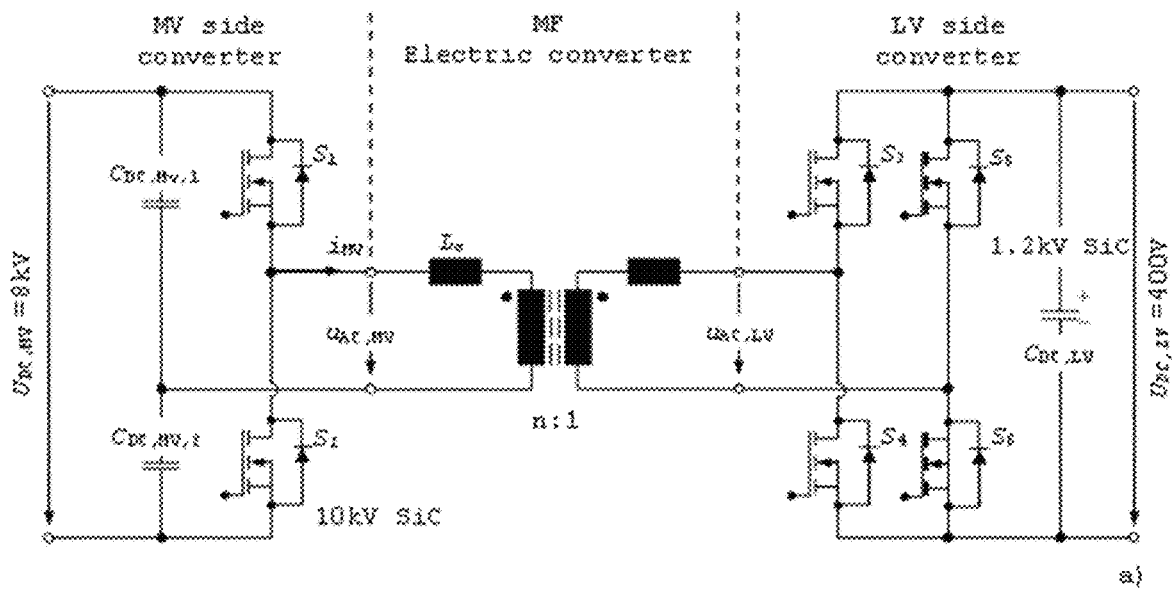
FIG. 4 shows a specific example of a configuration diagram of a solid-state transformer (SST) for a power generator that constitutes the energy transportation system of the first embodiment of the present invention.

In contrast, as shown in FIG. 3B, for example, the power distribution configuration in the case of DC power transmission is as follows: the output voltage of AC 690 V generated by the wind turbine generator (WT) is boosted to 30 to 110 kV by a transformer, and then it is converted to a DC power of DC voltage of 10 to 20 kV DC and DC current of 5.0 to 10.0 kA by an AC-DC converter. This DC power is fed to a synchronous motor for driving the refrigerant compressor used in the methane liquefaction unit M4 in the subsequent stage. On the other hand, the voltage of 10 to 20 kV is too high for the electrolyzer for electrolysis of water used in the water electrolyzer M2, and therefore a DC-DC converter consisting of a solid-state transformer (SST: Solid State Transformer), which is suitably used when the degree of step-down is large, as shown in FIG. 4, is used to step down the voltage to 100 to 150 V before feeding. In this DC power transmission, the number of the transmission cable is in principle one (1) cable plus ground cable or two (2) cables. As described above, this configuration of reducing AC power transmission as much as possible and adopting more DC power transmission instead can reduce the transformer and the wiring for 3-phase AC, which leads to cost reduction.

The water electrolyzer M2, located in the subsequent stage of the power generator M1 described above, produces hydrogen by electrolysis of water using the renewable energy obtained by the power generator M1 as an energy source. The hydrogen produced in this way is also referred to as green hydrogen. The apparatus that performs electrolysis of water (also referred to as water electrolysis) can be classified into several types depending on the type of electrolyte, i.e., solid oxide water electrolysis cell unit (SOEC), proton exchange membrane (PEM) water electrolysis apparatus, and alkaline water electrolysis apparatus.

Figure 5:
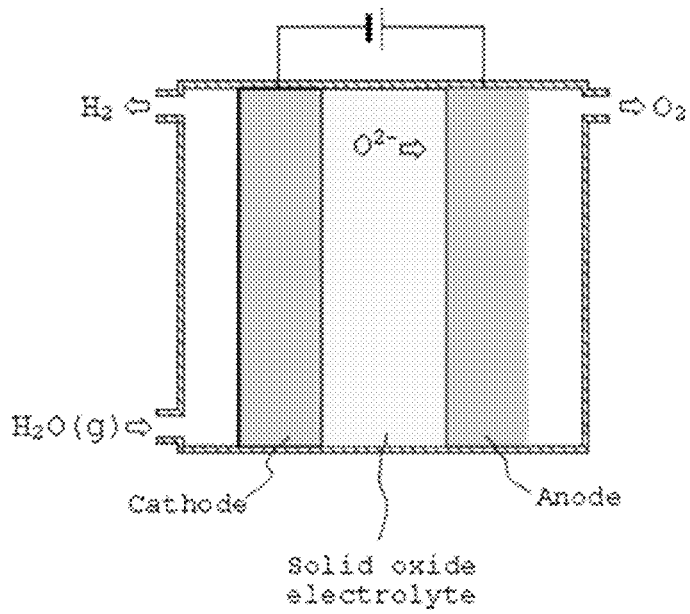
FIG. 5 shows a schematic vertical cross-section of a solid oxide water electrolyzer, which is a specific example of a water electrolyzer that constitutes the energy transportation system of the first embodiment of the present invention.

The solid oxide water electrolysis cell unit (SOEC) electrolyzes water at a high temperature of about 600 to 1100° C. by the reverse reaction of solid oxide fuel cells (SOFC) which will be described later. As shown in FIG. 5, the SOEC apparatus has a basic structure of an electrolyte made of solid oxide such as zirconium oxide modified by yttrium, and the electrolyte is sandwiched between a cathode and an anode respectively provided on both sides thereof. Water vapor supplied to the cathode side is decomposed into hydrogen and oxide ions, and the oxide ions pass through the electrolyte to become oxygen at the anode.

Figure 6:
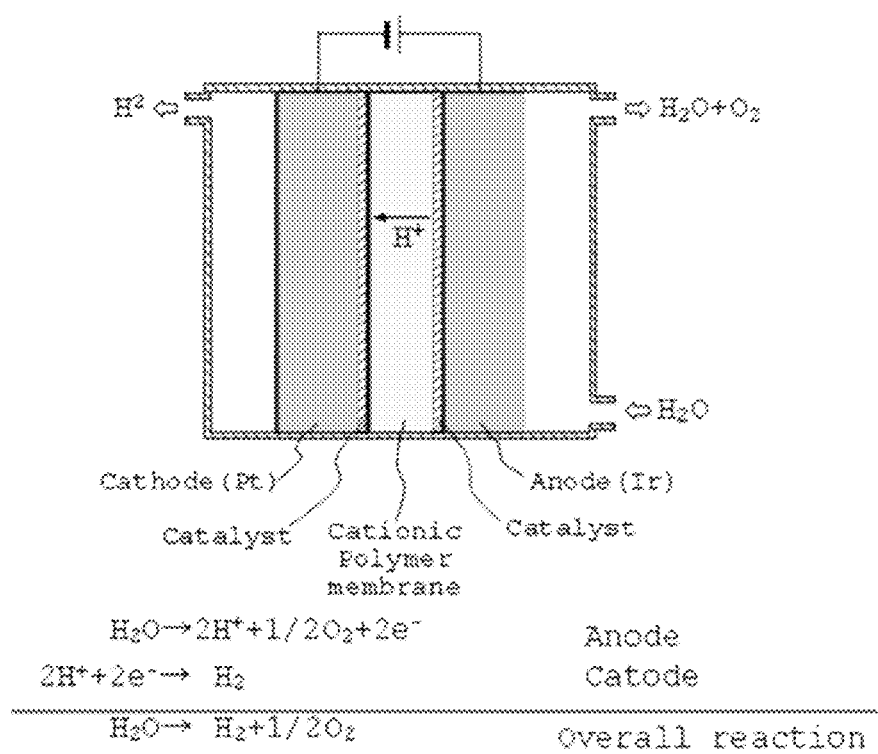
FIG. 6 shows a schematic cross-sectional view of a proton exchange membrane water electrolyzer, which is another specific example of a water electrolyzer that constitutes the energy transportation system of the first embodiment of the present invention.
Figure 7:
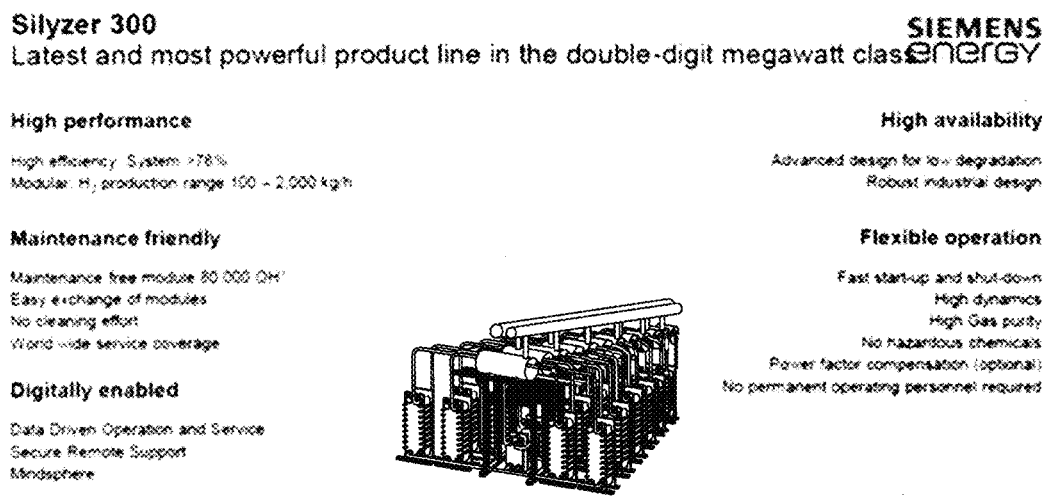
FIG. 7 shows a perspective view of a specific example of the proton exchange membrane water electrolyzer of FIG. 6.

As shown in FIG. 6, the proton exchange membrane (PEM) water electrolyzer has a basic structure of a proton exchange membrane (PEM) made of a proton-conducting cationic polymer membrane as an electrolyte, and this electrolyte is provided with a cathode and an anode via catalyst layers on both sides thereof, respectively. The cathode is made of platinum-supported carbon, platinum-coated titanium, etc., and the anode is made of iridium oxide-coated titanium, iridium-ruthenium-nickel oxide, etc. It should be noted that the above-described PEM may mean a solid polymer membrane (Polymer Electrolyte Membrane) as well as a proton exchange membrane. Water ($H_2O$) supplied to the anode side is decomposed into oxygen and protons ($H^+$), and the protons pass through the proton exchange membrane and receive electrons at the cathode to become hydrogen. An example of a water electrolyzer using a solid polymer membrane with the above structure is Silyzer 300 by SIEMENS' as shown in FIG. 7.

Figure 8:
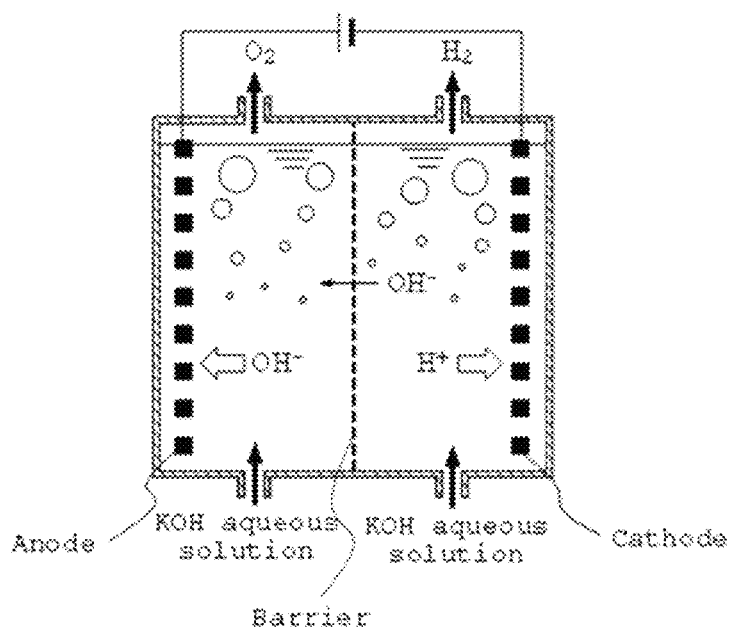
FIG. 8 shows a schematic cross-sectional view of an alkaline water electrolyzer, which is yet another specific example of a water electrolyzer that constitutes the energy transport system of the first embodiment of the present invention.

As shown in FIG. 8, the alkaline water electrolyzer has a basic structure of a partition wall as a gas barrier membrane, which is sandwiched between an anode and a cathode facing each other. The anode is made of lanthanum-doped cobalt oxide or nickel cobalt oxide etc., and the cathode is made of a high surface area catalytic electrode such as Raney nickel etc. Water molecules are decomposed into hydrogen ions and hydroxide ions at the cathode side, and these hydroxide ions pass through the partition wall to produce oxygen at the anode side. In any case of SOEC, PEM water electrolyzer, or alkaline water electrolyzer, it is preferable that the pressures of hydrogen and oxygen produced are in the range of 30 to 200 barA. If these pressures are less than 30 barA, the cost and power requirements of a compressor for pressurization will be excessive, while if these pressures exceed 250 barA, the oxygen content (impurities) in the hydrogen will increase too much. This pressure range can be achieved by stacking multiple cells in the water electrolyzer.

The hydrogen generator (water electrolyzer) M2 preferably has a hydrogen storage facility that stores a part of the hydrogen generated by the electrolysis of water, which can supply a fixed amount of hydrogen to the methane synthesizer M3 in the subsequent stage even if the amount of electricity generated by the power generator M1 fluctuates greatly due to wind conditions, which can vary day and night or seasonally.

In addition, by installing a fuel cell system alongside the hydrogen storage facility, even if the power generation system M1 stops generating power due to wind conditions, etc., as described above, the electricity generated by the fuel cell system can be used as a backup power supply in addition to the storage batteries installed in the power generation system M1, so it is possible to continue operating the water electrolysis system M2 without stopping it, which generally has a minimum load ratio of around 3-5% of the design load. The specific structure of the hydrogen storage facility is not limited, and the facility may have a high-pressure hydrogen tank, which stores compressed hydrogen under high pressure, or the facility may use a hydrogen storage alloy made of alkaline earth alloy, rare earth alloy, titanium alloy, or other alloys. When storing hydrogen in the high-pressure hydrogen tank, it is preferable to use high-tensile steel (ultra-high-strength steel) such as X80 or X120 of API (American Petroleum Institute) 5L standard, special stainless steel, aluminum alloys, polymer composite materials, etc. as materials for the high-pressure hydrogen tank to prevent embrittlement due to high-pressure hydrogen.

Figure 9A:
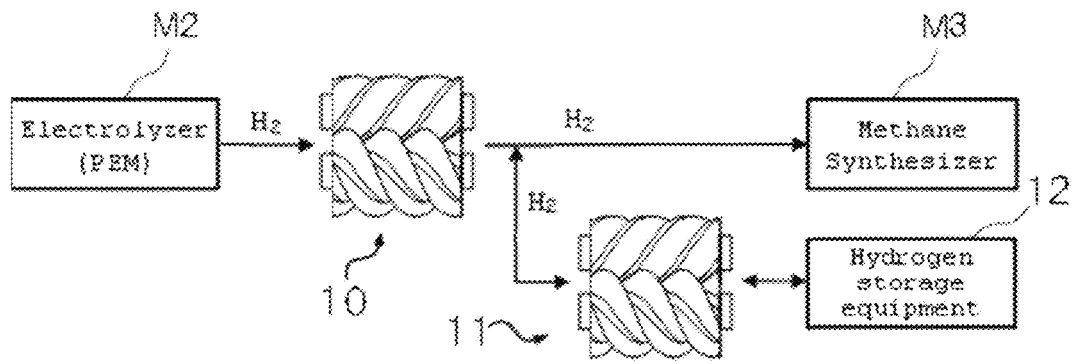
FIGS. 9A and 9B respectively show a Process flow diagram of the high-pressure hydrogen storage facility which is suitably included in the water electrolyzer of FIG. 1, and a schematic diagram of one specific example of this facility.
Figure 9B:
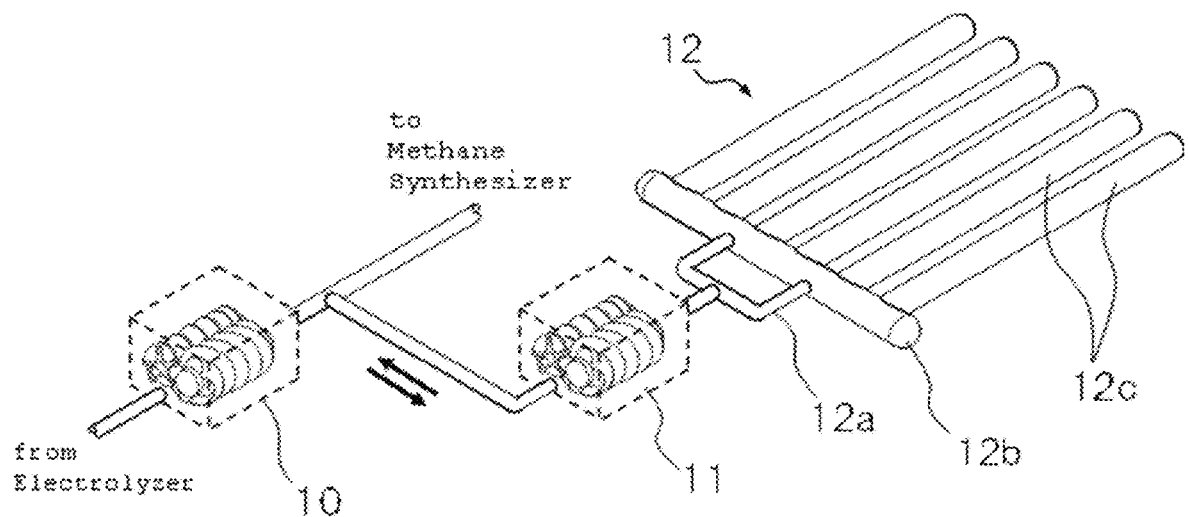

FIGS. 9A and 9B respectively show a process flow diagram and a perspective view of a configuration in which hydrogen produced by the water electrolyzer M2, for example by PEM, at a pressure of preferably about 1.0 to 5.0 MPaG, more preferably about 3.0 to 4.0 MPaG, and most preferably about 3.5 MPaG, is supplied to the methane synthesizer M3 after being pressurized by the primary pressurize unit 10. This configuration has a secondary pressurize unit 11 on a branch pipe that branches from the secondary side piping of the primary pressurized unit 10 and high-pressure hydrogen storage facility 12 for storing the high-pressure hydrogen boosted by the secondary pressurize unit 11. In this case, the structure of the high-pressure hydrogen storage facility 12 is not particularly limited, and can be composed of, for example, as shown in FIGS. 9A and 9B, a primary piping 12a for transporting high-pressure hydrogen, a manifold 12b for distributing the high-pressure hydrogen introduced via the primary piping 12a, and a plurality of storage pipes 12c for storing the high-pressure hydrogen distributed by the manifold 12b.

There are no particular restrictions on the type of primary pressurize unit 10 or secondary pressurize unit 11, and a screw compressor may be used for the primary pressurize unit 10, while a compander capable of pressurizing and depressurizing may be used for the secondary pressurize unit 11. The compander is a screw-type rotary machine that combines the functions of both an expander and a compressor. In the first embodiment of the green energy transportation system described in this invention, there is no need to normally extract the high-pressure hydrogen from the high-pressure hydrogen storage facility 12 and reduce the pressure, when pressurized high-pressure hydrogen is introduced into the high-pressure hydrogen storage facility 12. On the other hand, there is no particular need to pressurize the hydrogen and introduce it into the high-pressure hydrogen storage facility 12, when the high-pressure hydrogen is extracted from the high-pressure hydrogen storage facility 12 and its pressure is reduced. This allows installing the compander which can reduce the facility cost. A compressor and an expander may be installed in parallel without installing a compressor, which can increase operational flexibility although this arrangement will increase the facility cost as compared to the compander.

Figure 10:
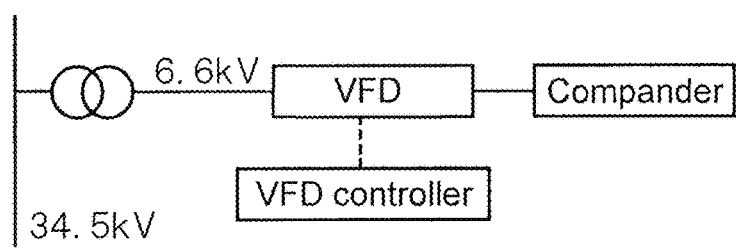
FIG. 10 shows a specific example of a power distribution diagram when a compander is used in the hydrogen pressurize/depressurize unit shown in FIGS. 9A and 9B.

As described above, the hydrogen generated by the water electrolyzer M2 can be introduced into the high-pressure hydrogen storage facility 12 as high-pressure hydrogen after being pressurized to a pressure of around 10.0 to 45.0 MPaG, preferably around 15.0 to 20.0 MPaG, using the primary pressurize unit 10 and the secondary pressurize unit 11. When the high-pressure hydrogen stored in the high-pressure hydrogen storage facility 12 is to be extracted, it is possible to recover the power by operating the secondary pressurize unit 11 in the opposite direction to that used for pressurization. In this case, if the gas is adiabatically expanded, its temperature will decrease, where as if the gas is adiabatically compressed, its temperature will increase. Accordingly installing heat exchangers as necessary on the primary and the secondary sides of the secondary pressurize unit 11 can recover/dispose the heat. FIG. 10 shows a specific example of a power distribution diagram when the compander is used in the secondary pressurize unit 11.

FIG. 11 shows a block flow diagram of a specific example of a system equipped with the primary pressurize unit 10, secondary pressurize unit 11, high-pressure hydrogen storage facility 12, and fuel cell facility 13 described above. The water electrolyzer M2 in this system shown in FIG. 11 is assumed to use an SOEC with a minimum load ratio of approximately 3% of the design load. In general, if there is no backup power supply, the SOEC will be unable to continue operating when the wind speed drops below approximately 4 m/s, and as a result, the facilities from the downstream methane synthesizer M3 onwards will also be unable to continue operating. In response to this case, as shown in FIG. 11, by extracting a portion of the hydrogen generated in the water electrolyzer M2 and storing it in the hydrogen storage facility 12, it becomes possible to stably supply hydrogen from the high-pressure hydrogen storage facility 12 to the methane synthesizer M3 as a reserve hydrogen raw material, even if hydrogen generation stops in the water electrolyzer M2.

Furthermore, as described above, by installing a fuel cell facility 13 in conjunction with the high-pressure hydrogen storage facility 12, it is possible to increase the options available for dealing with situations where the suspension period of the power generator M1 is prolonged. In other words, by using a part of the hydrogen stored in the high-pressure hydrogen storage facility 12 as a raw material for the fuel cell facility 13, it is possible to supply the electricity generated by the fuel cell facility 13 to the water electrolyzer M2 in the event that the operation of the power generator M1 is suspended for a long period of time due to reasons such as wind conditions. Fuel cells have a structure in which the anode and cathode face each other with an electrolyte sandwiched therebetween, and hydrogen extracted from the high-pressure hydrogen storage facility 12 is supplied to the anode. Air or oxygen is supplied to the cathode. There are various types of fuel cells, such as solid polymer, phosphoric acid, molten carbonate, and solid oxide, and the appropriate type is selected according to the operating conditions, etc.

The configuration shown in FIGS. 9A and 9B mentioned above performs mechanical compression/expansion of hydrogen using a compressor or a compander, but alternatively, compression/expansion of hydrogen electrochemically can be performed by using an electrochemical hydrogen compressor (EHC) or an electrochemical hydrogen expander (EHE). The electrochemical hydrogen compressor (EHC) has a structure in which, for example, as shown in FIG. 12A, an anode (positive electrode) and a cathode (negative electrode) face each other with an electrolyte membrane such as a solid polymer electrolyte membrane (PEM) sandwiched therebetween. When low-pressure hydrogen is introduced into the anode side flow channel (chamber) while a direct current is applied between this pair of anode and cathode, hydrogen is oxidized at the anode to produce hydrogen ions. The generated hydrogen ions move through the electrolyte membrane towards the cathode, and are reduced to hydrogen by receiving electrons at the cathode. As a result of this oxidation-reduction reaction, hydrogen gas moves from the anode to the cathode as a whole, and it becomes possible to extract isothermally compressed high-pressure hydrogen from the cathode side flow channel (chamber).

The voltage V of the direct current applied between the anode and cathode can be obtained from the Nernst equation shown in Formula 1 below, where the gas constant is R, the absolute temperature is T, the hydrogen partial pressure on the cathode side is Pc, and the hydrogen partial pressure on the anode side is Pa.

$$V = (RT/2F)\ln(Pc/Pa) \quad \text{[Formula 1]}$$

The electrochemical hydrogen compression described above is, in principle, isothermal compression, so it is more efficient than mechanical compression, and further the electrochemical hydrogen compression has no rotating parts, so it is expected to be low cost. In addition, since it is possible to increase the pressure to around 20 to 1000 barG, it is possible to use an electrochemical hydrogen compressor not only for the primary pressurize unit 10, but also for the secondary pressurize unit 11. For example, it is possible to electrochemically produce high-pressure hydrogen at around 700 barG by using the hydrogen compression system of HyET Hydrogen B.V. of the Netherlands.

On the other hand, as shown in FIG. 12B, the electrochemical hydrogen expander (EHE) isothermally expands the high-pressure hydrogen by introducing the high-pressure hydrogen into the cathode side flow channel and causing a reverse reaction, which in the opposite of the isothermal compression of the electrochemical hydrogen compressor (EHC) described above and it can recover power from the electrochemical hydrogen expander based on the principle of concentration cells. As electrochemical hydrogen compression is the reverse reaction of electrochemical hydrogen expansion, the electrochemical hydrogen compressor (EHC) may be made to play the role of the electrochemical hydrogen expander (EHE) to reduce equipment costs, as in the aforementioned compander, or the electrochemical hydrogen compressor (EHC) and electrochemical hydrogen expander (EHE) may be installed separately to increase operational flexibility.

The high-pressure hydrogen introduced into the electrochemical hydrogen expander (EHE) should preferably contain moisture in order to increase the efficiency of proton transport in the solid polymer electrolyte membrane, to the extent that the supply and discharge of hydrogen is not inhibited by the water droplets generated. It is also preferable that the high-pressure hydrogen has temperature of around 20-90° C., and more preferably around 50-80° C. This can be achieved by supplying high-pressure hydrogen to the EHE via a temperature and humidity control system, as shown in for example FIG. 13. In other words, the temperature and humidity control system shown in FIG. 13 controls the temperature of high-pressure hydrogen extracted from the high-pressure hydrogen storage facility by a heat exchanger so that the low-pressure hydrogen at the outlet of the EHE is within a specified temperature range, and then humidifies it by introducing it into the top of the column of the packed column along with a constant flow of moisture, and supplies it to the EHE as humidified high-pressure hydrogen by discharging it from the bottom side wall of the column. The level of the stored water in the bottom of the packed column is controlled by the amount of discharge. In addition, a hygrometer is provided in the low-pressure hydrogen piping connected to the EHE outlet side, and the valve opening in the bypass pipe for unhumidified high-pressure hydrogen bypassing the packed column is controlled so that the relative humidity RH of the hygrometer is preferably within the range of 60 to 95%, and more preferably within the range of 70 to 90%. In addition, the heat source for heating the heat medium in the above-mentioned heat exchanger can use the reaction heat generated by the Sabatier reaction described below.

In the case of the methane synthesizer M3 with a methane production capacity of 5,000,000 tons per year, equivalent to that of a typical LNG plant, it is sufficient to install a hydrogen storage facility 12 with a storage capacity of 1700 to 2200 tons of hydrogen together with a plurality of electrochemical hydrogen compressors, assuming that the wind speed of 4 m/s or less continues for a maximum of about one week to one month at the wind farm connected to the power generator M1. This will make it possible to secure a minimum load ratio of at least 5% compared to the design load of 100% in the downstream methane synthesizer M3. This capacity of hydrogen can be achieved by designing with for example, a design pressure of 150 to 700 barG using API 5L standard X120 grade pipes or API 5L standard P110 grade pipes used in oil production facilities.

Specifically, when storing hydrogen at a design pressure of 700 barG, the horizontal type shown in FIG. 14A or the vertical type shown in FIG. 14B can be used. In the case of the former horizontal type, for example, 43 sets of units 16 can be made, each containing 407 pipes 14 with an outer diameter of 3.5 inches and a total length of 200 meters, which are packed in a metal cylindrical housing 15 with a cross-sectional length of approximately 1.5 meters each, and these units 16 can be laid at the site of the hydrogen storage facility. When installing the units 16 of the pipe group as a hydrogen storage facility on permafrost, it is preferable to take measures to prevent the permafrost from melting due to the rise in temperature of the hydrogen gas caused by thermal compression, for example, by supporting the housing 15 from below with a plurality of legs 17 to keep it separated from the ground. If necessary, as shown by the broken line in FIG. 11, it is preferable to extract some of the propane refrigerant used in the subsequent methane liquefaction unit M4 and cool the group of pipes 14 to about −5° C.

The methane synthesizer M3, which is located after the water electrolyzer M2, uses hydrogen (H2) produced by the water electrolyzer M2 and recycled carbon dioxide ($CO_2$) as raw materials, and produces methane through methanation by the Sabatier reaction shown in the following reaction formula 2.

$$CO_2 + 4H_2 = CH_4 + 2H_2O \quad \text{[Reaction formula 2]}$$

Figure 15A:
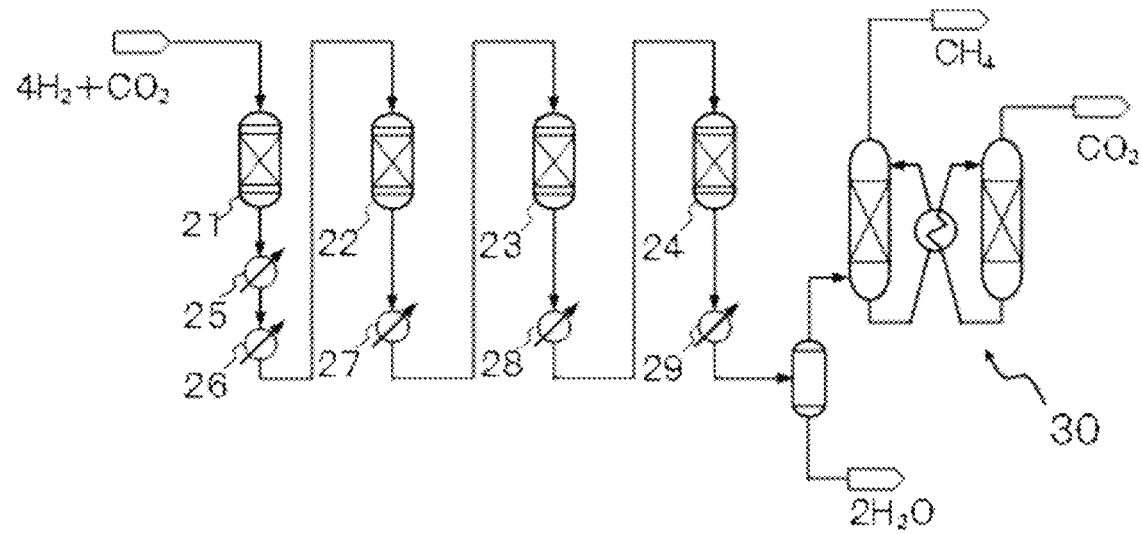
FIGS. 15A and 15B respectively show a process flow diagram of specific examples of a methane synthesizer that constitutes the energy transport system of the first embodiment of the present invention.

The Sabatier reaction is carried out, for example, under a high temperature and high pressure of about 200 to 700° C. and 3.0 to 7.0 MPaG, in the presence of a catalyst of nickel series or ruthenium series loaded on a support in an amount of 5 to 20% by mass on the support basis, in which the support is made of alumina, magnesia, zirconia, yttrium oxide, ceria, titania, zeolite, or a solid solution containing two or more of these. Accordingly, a plurality of reactors 21 to 24 connected in series, as shown in FIG. 15A, are generally used for the methane synthesizer M3, so as to proceed the reaction step by step. Since the Sabatier reaction is an exothermic reaction, steam generators using water or coolers 25 to 29 using water as a refrigerant are installed at the subsequent stage of each of these reactors 21 to 24.

Figure 15B:
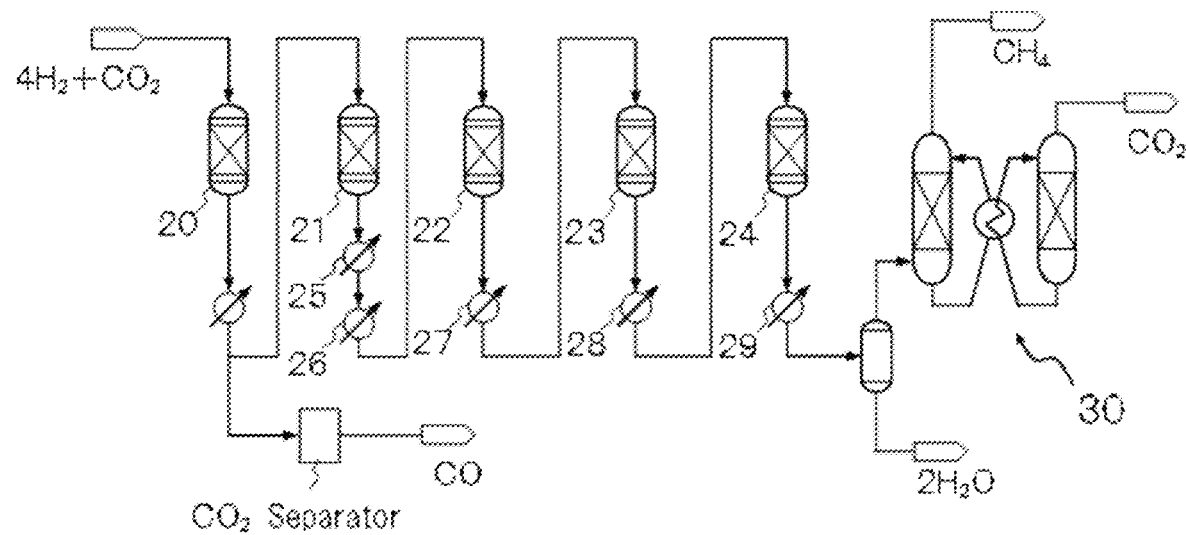

As shown in FIG. 15B, a reverse water gas shift reactor 20 which performs a reverse water gas shift reaction shown in Reaction Formula 3 below in the presence of a catalyst may be installed immediately before the reactors 21 to 24 that perform the Sabatier reaction, in which the catalyst is, for example, Cu, Fe, Mo, K, etc. loaded on a support made of silica, alumina, etc. or a catalyst made of $BaZr_{0.8}Y_{0.2}O_3$, $BaCe_{0.2}Zr_{0.6}Y_{0.16}Zn_{0.04}O_3$, etc.

$$CO_2 + H_2 = CO + H_2O \quad \text{[Reaction Formula 3]}$$

The reverse water gas shift reaction can produce carbon monoxide (CO), which is more reactive than $CO_2$, and therefore oxo alcohols or higher hydrocarbons can be produced by the oxo alcohol synthesis reaction or Fischer-Tropsch reaction after extracting a part of the product gas and separating the Co therefrom. Since the Sabatier reaction is exothermic while the reverse water gas shift reaction is endothermic, the reaction heat generated in Sabatier reactors 21 to 24 can be used to heat the feed gas to the reverse water gas shift reactor 20 to increase the thermal efficiency of the entire system.

In the Sabatier reaction, the stoichiometric amount of hydrogen is 4 moles to 1 mole of carbon dioxide gas, but it is not realistic in an actual system to achieve complete (100%) reaction with this stoichiometric amount, and about 2 to 4% of unreacted gas will remain in the product gas. Therefore, if the product gas of the Sabatier reaction is introduced directly into the methane liquefaction unit M4 in the subsequent stage, the carbon dioxide gas will solidify during the cooling process to form dry ice, which will lead to blockage of the liquefaction facility. It is therefore preferable to provide a carbon dioxide gas removal unit 30 using amine solution or the like before the methane liquefaction unit M4 like a conventional LNG liquefaction plant. The carbon dioxide gas removed in the carbon dioxide gas removal unit 30 can be recycled to the Sabatier reaction along with the hydrogen that is not liquefied in the liquefaction process described below.

Hydrogen is not liquefied and is recycled to the methane synthesizer M3 as described below. In this instance, as shown in Table 2 below, it is preferable that an excess amount of hydrogen gas is introduced into the reactor in a range of 4.05 to 7.00 moles relative to a stoichiometric amount of 4 moles of hydrogen gas in the Sabatier reaction. This allows the Sabatier reaction to proceed in a direction of methane synthesis, which can reduce the number of the reactors. Since an increase in the amount of hydrogen gas recycled will increase the cost of the methane liquefaction facility, hydrogen recycling compressors, etc., the amount of hydrogen gas recycled is determined in consideration of the cost of methane synthesis.

TABLE 2

| mole ratio of $H_2/CO_2$ in methane synthesis feed | mole ratio of recycled $CO_2$/synthesized methane | the number of reactors |
|---|---|---|
| 4.00 | 0.00 | 5 |
| 4.05 | 0.05 | 5 |
| 4.10 | 0.10 | 5 |
| 4.50 | 0.50 | 4 |
| 5.00 | 1.00 | 3 |
| 6.00 | 2.00 | 2 |
| 7.00 | 3.00 | 2 |

The methane liquefaction unit M4, which is located at subsequent stage of the methane synthesizer M3, can employ a liquefaction process that is in practical use in LNG plants that liquefies natural gas. Since the critical temperature of methane is −82° C., the liquefaction process employs a cryogenic liquefaction process such as the mixed refrigerant process, cascade process, and expander process, which can liquefy methane by cooling it to −162° C. under atmospheric pressure. In any of the above processes, the methane gas used as feed gas for the methane liquefaction unit M4 contains almost no impurities that can cause corrosion or other problems in the liquefaction facilities unlike the natural gas used as feedstock for LNG plants, and therefore a condensate separation facility and a mercury removal facility can be omitted.

Figure 16:
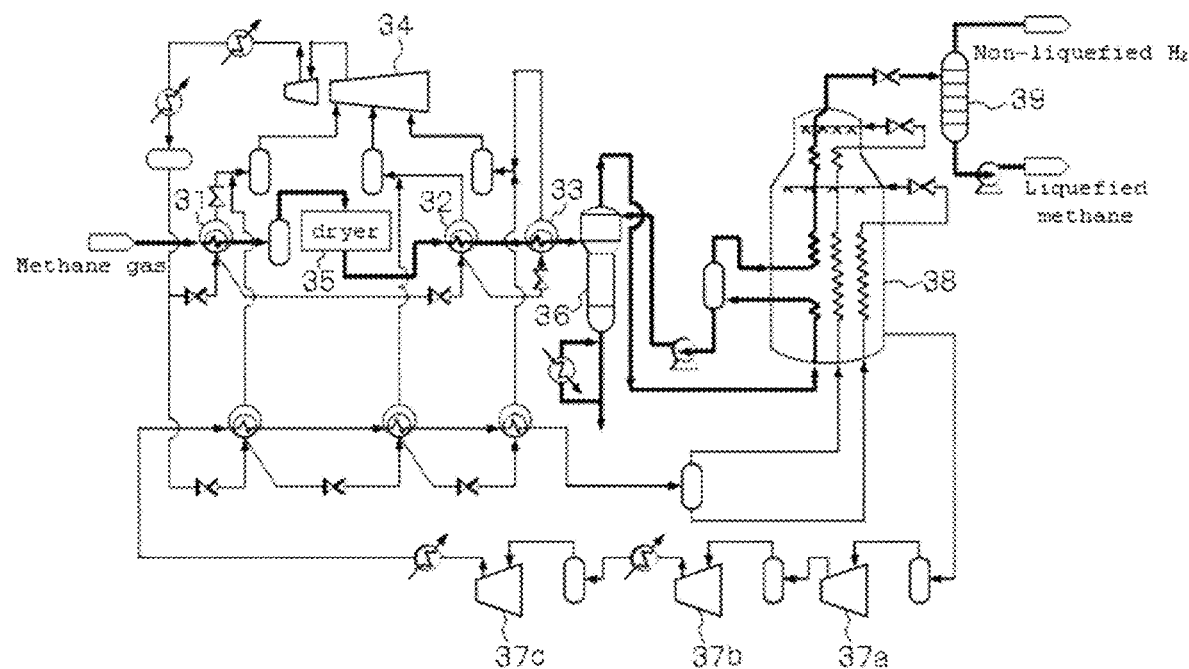
FIG. 16 shows a process flow diagram of a mixed refrigerant process that is a specific example of the methane liquefaction unit that constitutes the energy transport system of the first embodiment of the present invention.

The mixed refrigerant process is a method having a pre-cooling step using propane refrigerant followed by a cooling step using mixed refrigerant consisting of ethane, propane, etc. This process has been used in many projects under license from Air Products and Linde. Specifically, as shown in FIG. 16, in the mixed refrigerant process, the feedstock of methane gas is firstly introduced into a first kettle-type heat exchanger 31, a second kettle-type heat exchanger 32, and a third kettle-type heat exchanger 33 sequentially, such that the methane gas is pre-cooled in a stepwise manner with propane refrigerant which is compressed in three stages of low pressure stage, medium pressure stage, and high pressure stage by a propane multi-stage compressor 34. It should be noted that although FIG. 16 shows a scrubbing column 36 for hydrocarbon removal, which is required in natural gas liquefaction plants, the scrubbing column 36 can be omitted as mentioned above if the feedstock uses methane gas that is originated from methanation as in the first embodiment of the present invention. Further, if a process using non-aqueous solvent such as the SELEXOL process is used in the carbon dioxide removal facility 30 in a previous stage, a dryer 35 for dehydration can be omitted.

Next, the methane pre-cooled with the above-described propane refrigerant is introduced into a main cryogenic heat exchanger 38 such that the methane gas is liquefied by cooling to about −140° C. by a mixed refrigerant sequentially compressed by MR compressors 37a to 37c, and then it is adiabatically expanded (isentropic expansion) by a flash drum 39 (also referred to as a stripper), an expander, or Joule-Thomson expansion valve (J-T valve). The main cryogenic heat exchanger 38 has a structure like a Linde's main cryogenic heat exchanger as shown in FIG. 17, for example, in which an aluminum heat-transfer tube of about 10 mm in diameter is wound around a core rod in a coil shape and enclosed in a pressure vessel.

Figure 17:
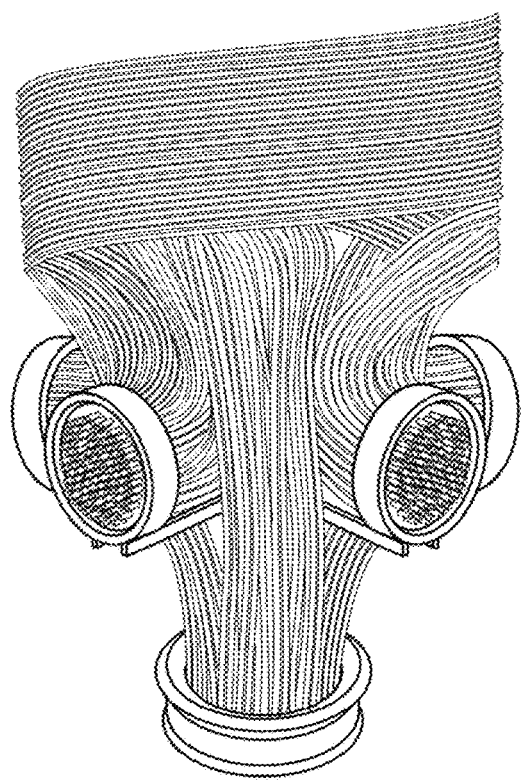
FIG. 17 shows a photograph showing a specific example of a heat transfer tube that constitutes the main cryogenic heat exchanger shown in the process flow diagram of FIG. 16.

In the so-called coil type heat exchanger having the structure shown in FIG. 17, it is preferable that the minimum flow rate of methane containing non-liquefied hydrogen, is ensure to be least 20% of the design flow rate. The reason for this is that if the flow rate falls below 20% of the design flow rate, the pressure loss will be less than about 4% of the design value, and there is a risk that the heat exchanger will not be able to demonstrate its performance due to gas-liquid separation occurring in the tubes or the liquid phase flowing back due to gravity. It is possible to check whether or not 20% or more of the design flow rate is being maintained as described above by creating a two-phase flow diagram.

Figure 18:
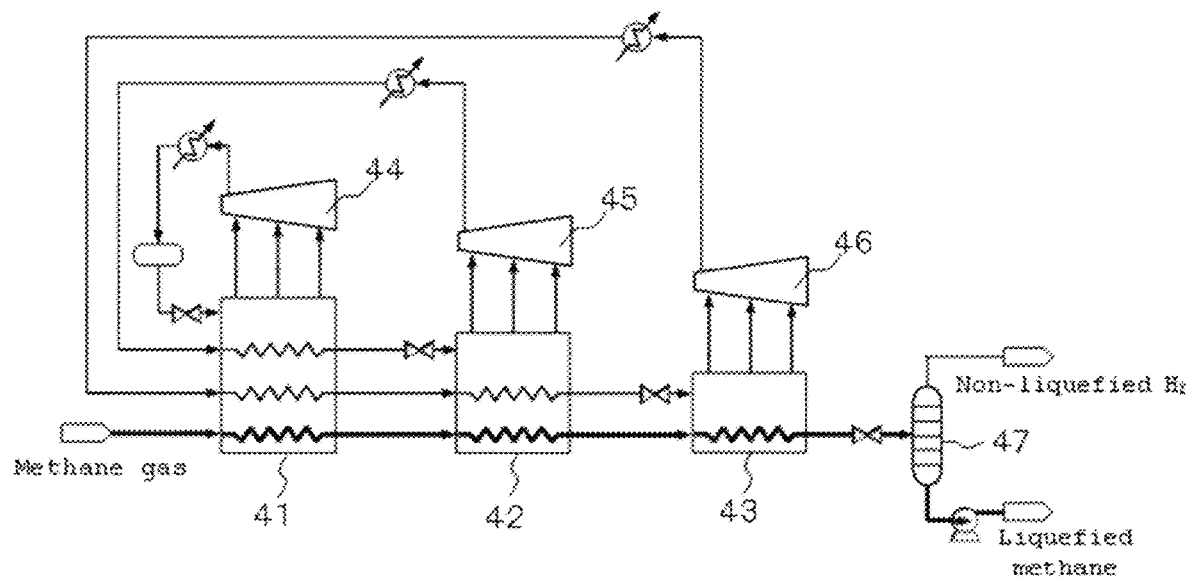
FIG. 18 shows a process flow diagram of cascade process, which is another specific example of methane liquefaction unit that constitutes the energy transportation system of the first embodiment of the present invention.

In the cascade process, as shown in FIG. 18, the feedstock of methane gas is sequentially introduced into a first heat exchanger 41, a second heat exchanger 42, and a third heat exchanger 43, such that the methane gas is liquefied by sequential cooling through refrigeration cycles of single-component refrigerants with different temperature levels, consisting of a propane refrigerant system compressed by a propane compressor 44, an ethylene refrigerant system or ethane refrigerant system compressed by an ethylene etc. compressor 45, and a methane refrigerant system compressed by a methane compressor 46, and then it is adiabatically expanded by a flash drum 47 in a similar manner as the mixed refrigerant process described above.

Figure 19:
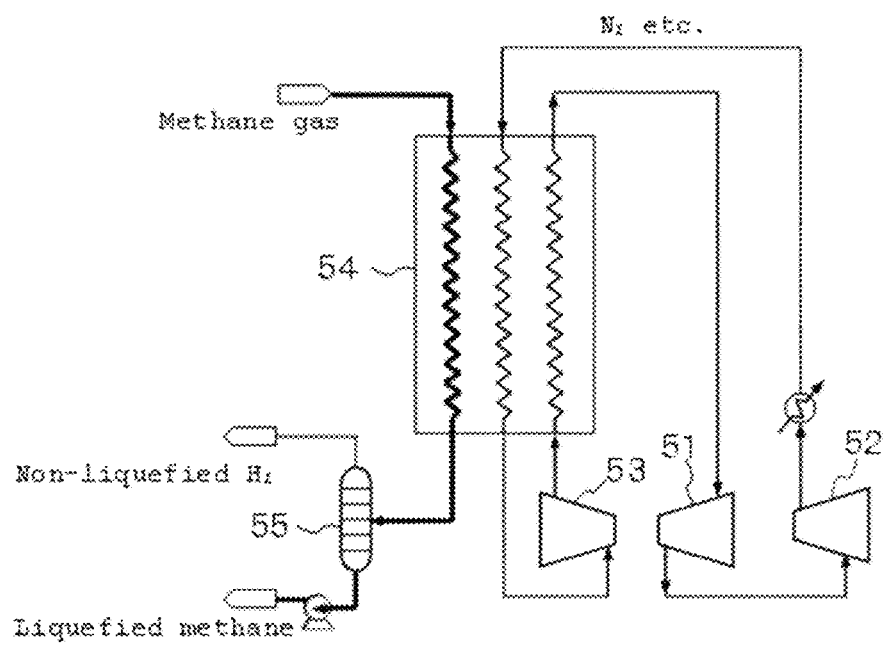
FIG. 19 shows a process flow diagram of expander process, which is yet another specific example of methane liquefaction unit that constitutes the energy transportation system of the first embodiment of the present invention.

In the expander process, as shown in FIG. 19, nitrogen, methane, etc. are used as a refrigerant, and this refrigerant is circulated through a heat exchanger 54 while being compressed and expanded by, compressors 51, 52, and expander 53 respectively. The feedstock of methane gas is introduced into this heat exchanger 54 for liquefaction by cooling, and then it is adiabatically expanded by a flash drum 55 in a similar manner as the mixed refrigerant process described above.

The flash drums 39, 47, and 55, which play the role of the stripper described above, all flash the liquefied methane liquefied by the methane gas liquefaction facility in the previous stage under a pressure of 0.8 to 2.0 barA and a temperature of −170 to −184° C. The non-liquefied hydrogen generated by the stripper is preferably recycled to the methane synthesizer M3 for reuse as a feedstock after recovering cold heat, for example, in the configuration shown in FIG. 20.

As described above, the lower limit of low-load operation of a coil-type heat exchanger using mixed refrigerant is generally about 20% of its design flow rate. Therefore, if it is desired to operate at a load lower than 20% of its design flow rate, it is preferable to adopt the above-described cascade process or expander process without using a coil-type heat exchanger, and the cascade process is more preferable. For example, in the case of the cascade process, the use of a shell-and-tube heat exchanger or a cross-flow plate-fin heat exchanger enables stable operation within the range of 1 to 100% of the design flow rate.

Figure 21:
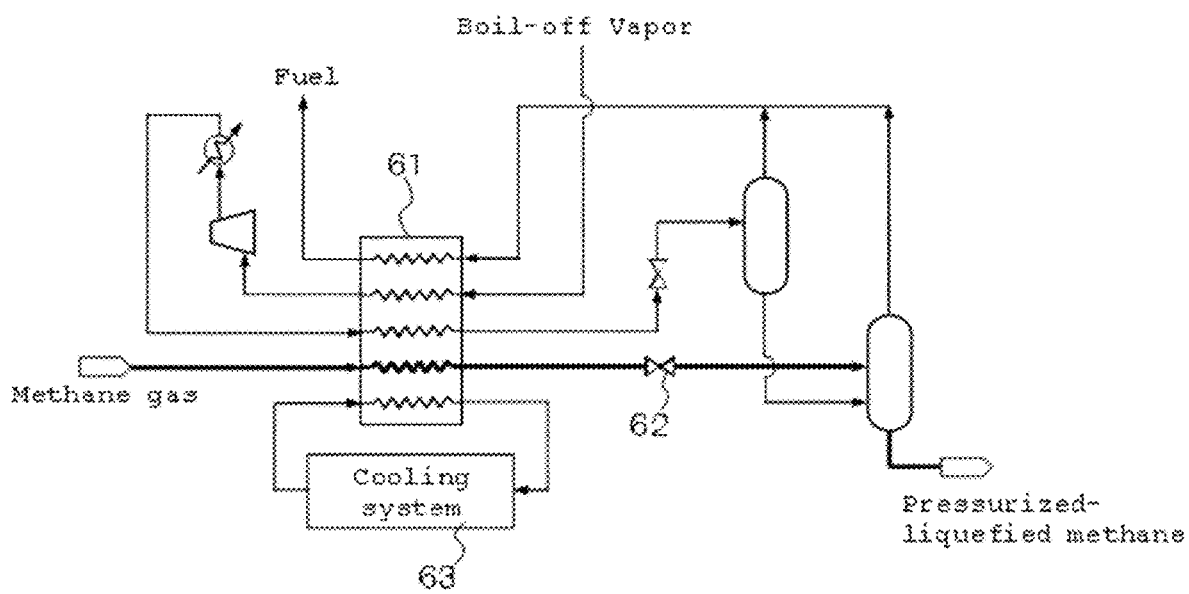
FIG. 21 shows a process flow diagram of the process for generating pressurized liquefied methane that can be generated using the methane liquefaction unit that constitutes the energy transportation system of the first embodiment of the present invention.

The above-described mixed refrigerant process, cascade process, and expander process all liquefies methane gas by cooling to about −160° C. under atmospheric pressure, but they can liquefy methane gas by cooling it to about −120 to −130° C. under pressurized condition. The pressurized liquefied methane can be produced, for example, by a liquefaction process shown in FIG. 21. In this liquefaction process shown in FIG. 21, a pre-pressurized methane gas is cooled by heat exchange with a refrigerant in a pressurized heat exchanger 61, such as a conventional plate fin heat exchanger or cold box heat exchanger, followed by flushing to partially depressurize to a pressure of 8.0 to 12.8 barA by using an expansion unit 62 such as an expansion valve, which thereby produces pressurized liquefied methane at a temperature of −120 to −130° C.

The refrigerant introduced into the pressurized heat exchanger 61 can be a single or multi-component substance suitable for refrigeration, such as propane, propylene, ethane, carbon dioxide, etc., and this refrigerant can be cooled by a cooling system 63 consisting of conventional heat exchanger and a refrigerant compressor. A boil-off gas generated from a storage tank, etc. of the pressurized liquefied methane and an exhaust gas discharged from a gas-liquid separation tank provided downstream of the expansion unit described above have approximately the same temperature as the pressurized liquefied methane, and therefore these gases can be used as a combustion gas after being heated up by recovery of cryogenic heat in the pressurized heat exchanger 61.

The oxygen liquefaction unit M7, which liquefies the oxygen generated by the water electrolyzer M2, can adopt the mixed refrigerant process, cascade process, or expander process in the same manner as the above-mentioned methane liquefaction unit M4, but it is preferable to adopt the mixed refrigerant process among these. Specifically, this mixed refrigerant process first uses propane refrigerant to pre-cool oxygen to a temperature of −20 to −40° C., and then uses a mixed refrigerant including nitrogen, methane, ethane, or ethylene, and propane or propylene to cool oxygen to a temperature of −183.1 to −157° C. and a pressure of 1 to 8 barA to liquefy it. The preferred composition of this mixed refrigerant is 20-30 mol % nitrogen, 30-50 mol % methane, 20-30 mol % ethane or ethylene, and 5-15 mol % propane or propylene, with a vapor pressure of 2.0-4.0 barA.

In the methane liquefaction unit M4 and the oxygen liquefaction unit M7 of the first embodiment of the present invention, it is preferable to use a rotary positive displacement type compressor driven by a synchronous motor for the refrigerant compressor in any of these liquefaction processes described above. The synchronous motor has a feature in that the motor rotates in synchronization with a frequency of an AC power source to be used, and by changing the AC frequency with an inverter, it is possible to freely control the number of rotations. A screw-type compressor is preferred for the rotary positive displacement type compressor. The reason for this is that when an output of the wind power generation fluctuates relatively moderate, i.e. from 70 to 100%, an axial flow type or a centrifugal type can be used, but when the fluctuation of this output is large, i.e. from 0 to 100%, use of the axial flow type or the centrifugal type necessitates a recycling operation to avoid surging that may occur in the 0 to 70% range, which wastes the drive power. In order to avoid this waste, it is preferable to use only the screw type, which is a rotary positive displacement type compressor, or to combine the screw type with the axial flow type or the centrifugal type.

Figure 22:
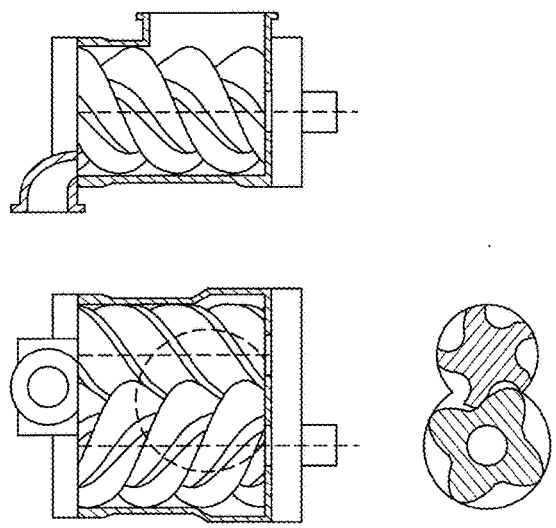
FIG. 22 shows a front, bottom and cross-sectional views of a specific example of a rotor section of a rotary-type refrigerant compressor that is suitably used in the methane liquefaction unit that constitutes the energy transportation system of the first embodiment of the present invention.

The above-described screw type compressor has a structure in which a pair of rotors, each having spiral projections and spiral grooves that intermesh with each other, are enclosed in a casing as shown in FIG. 22, for example. A gas sucked in from an inlet of the casing is gradually pressurized by a decreasing space caused by meshing of the rotating pair of rotors, and then it is discharged from an outlet of the casing as a pressurized gas having a predetermined pressure.

Figure 20:
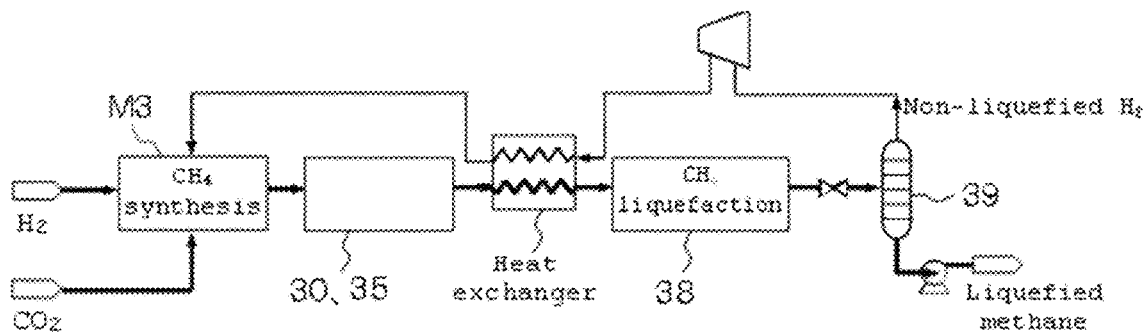
FIG. 20 shows a process flow diagram of a specific example of a process that recycles non-liquefied hydrogen generated in the methane liquefaction unit that constitutes the energy transportation system of the first embodiment of the present invention to the methane synthesis device.
Figure 23:
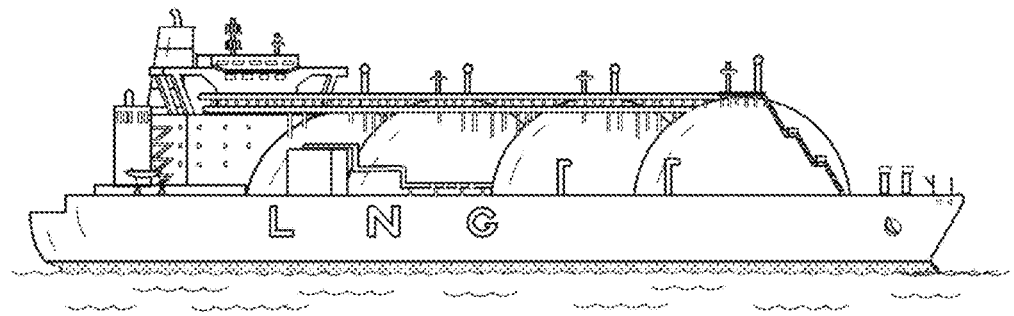
FIG. 23 shows a photograph showing a specific example of an LNG tanker.
Figure 24:
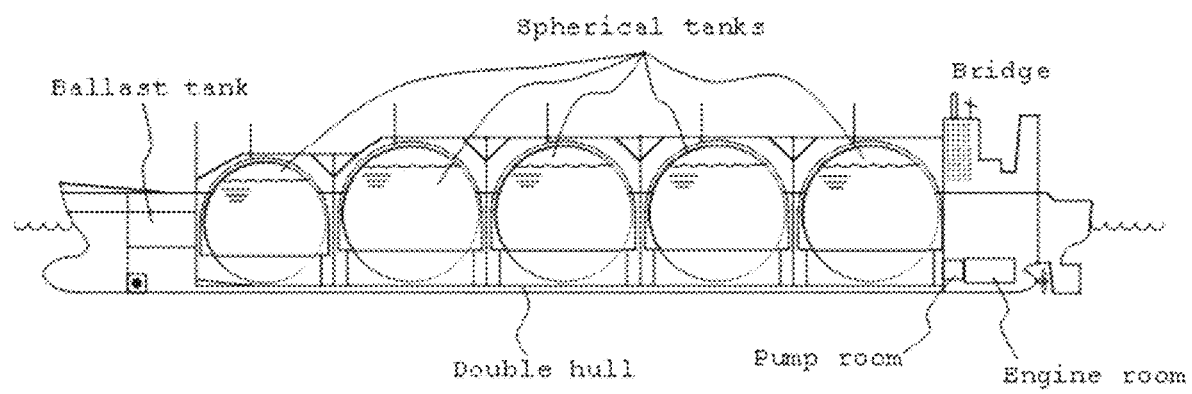
FIG. 24 shows a side view of a specific example of a cryogenic tanker that is suitably used for the liquefied methane transportation means and the liquefied $CO_2$ transportation means that constitute the energy transport system of the first embodiment of the present invention.

A technology of an LNG tanker used for marine transportation of LNG can be used for the liquefied methane transportation means M5 that transports a liquefied methane liquefied by the methane liquefaction unit M4 as well as for the liquefied oxygen transportation means M8 that transports a liquefied oxygen liquefied by the oxygen liquefaction unit M7 described above. When the LNG tanker is used, it is necessary to install a liquefied methane storage tank at a shipping terminal of the liquefied methane in order to load the liquefied methane to the LNG tanker as well as a liquefied oxygen storage tank at a shipping terminal of the liquefied oxygen in order to load the liquefied oxygen to the LNG tanker. As shown in FIG. 23, an LNG tanker is equipped with a plurality of cryogenic tanks that store cryogenic LNG at approximately −162° C. at nearly atmospheric pressure. The LNG tanker is classified into several types including a Moss type structure that has a plurality of spherical independent tanks each mounted on a hull with cylindrical support members, a membrane type structure that has a heat insulator attached to an inside of the hull structure and a thin-film metal membrane attached to an inner surface of the heat insulator, and an SPB (Self-Supporting Prismatic-Shape IMO type B) type structure that has a plurality of independent square tanks attached to a hull via reinforced plywood supports. Among the above structures, the Moss type shown in FIG. 20 is preferred because of its abundant construction experience and economic efficiency.

The liquefied methane transportation means M5 and the liquefied oxygen transportation means M8 are driven by a first power means that does not emit $CO_2$ into the atmosphere. Such a first power means can be either an engine driven type by combustion of hydrogen or fossil fuel (internal combustion engine), which is accompanied by a facility to recover $CO_2$ in the exhaust gas emitted during the combustion in the case of fossil fuel combustion, or a battery-driven type. The former engine-driven type is classified into several types that includes a steam turbine type that combusts boil-off gas generated by a heat input from a tank, heavy oil, or both of these fossil fuels to generate steam in a boiler and the resulting steam is used to rotate a turbine, a second type that drives a generator by a diesel engine fueled by the above-described boil-off gas or heavy oil, and the resulting electricity is supplied to an electric motor to rotate a propeller, or a third type that directly drive the propeller by a gas-fired diesel engine that combusts a mixture of these boil-off gas and heavy oil. In all of these types, a $CO_2$ recovery facility is required because combustion exhaust gas containing $CO_2$ is discharged during the combustion of fossil fuels. There is no particular limitation regarding the type of $CO_2$ recovery facility, and for example, a method of absorption by a chemical absorption solution in a similar manner to a $CO_2$ recovery facility provided in conjunction with an ATR reformer as described below can be suitably adopted. The $CO_2$ recovered from the ATR reformer discharge gas containing $CO_2$ can be reused as a raw material in the methane synthesizer M3.

Figure 25:
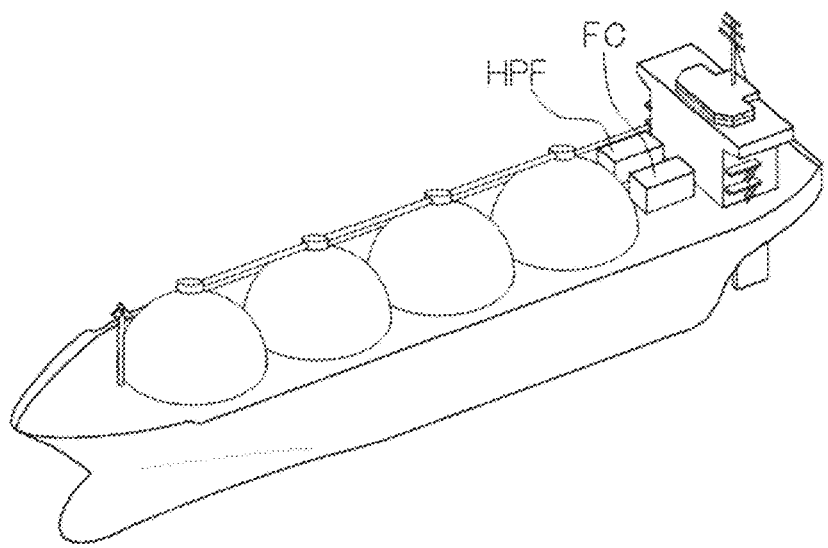
FIG. 25 shows a perspective view of a specific example of an LNG tanker equipped with a fuel cell (FC) for driving the tanker and a high-pressure hydrogen storage facility (HPF) for storing hydrogen, which is a raw material for the FC.

On the other hand, for the latter battery drive, a secondary battery that can be repeatedly charged and discharged can be preferably used, and in this case, it is preferable to use a lithium ion secondary battery in which lithium ions move between the positive and negative electrodes that face each other with a separator therebetween, allowing the battery to be repeatably charged and discharged. In order to charge the lithium-ion secondary battery, electricity from the power generator M1 by the renewable energy or electricity from the hydrogen production and carbon capture unit M7 can be used, which makes it possible to propel the cryogenic tanker without generating $CO_2$. Alternatively, as shown in FIG. 25, a high-pressure hydrogen storage facility (HPF) that stores high-pressure hydrogen that has been pressurized by an electrochemical hydrogen compressor (EHC) installed on land, and a fuel cell (FC) that generates electricity using the high-pressure hydrogen extracted from the high-pressure hydrogen storage facility as a raw material, can be installed on the tanker, and the electricity generated by the fuel cell can be used as the driving source for the tanker. When the tanker is equipped with the high-pressure hydrogen storage facility as fuel for the fuel cell, the ratio of the total capacity of high-pressure hydrogen containers such as hydrogen cylinders to the tank capacity of LNG or liquid oxygen is adjusted appropriately according to the transport distance and the storage pressure of the high-pressure hydrogen. If the storage capacity of the storage equipment installed on the tanker is only enough to store the amount of high-pressure hydrogen for one-way transport, an electrochemical hydrogen compressor (EHC) will be installed at the liquefied methane receiving terminal (hydrogen consumption site) in addition to the liquefied methane shipping terminal. The hydrogen at the liquefied methane receiving terminal can be produced using the autothermal reforming (ATR) process in the hydrogen production and carbon recovery unit M10.

Figure 26:
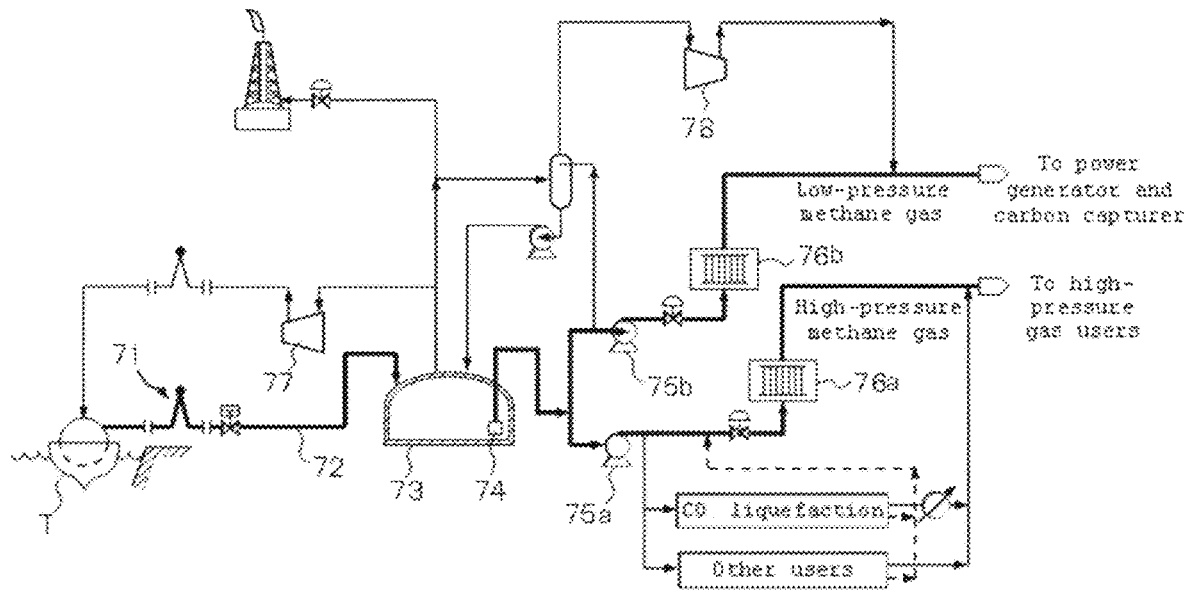
FIG. 26 shows a process flow diagram of a specific example of a liquefied methane receiving and regasification unit which constitutes the energy transportation system of the first embodiment of the present invention.

The liquefied methane transported by the liquefied methane transportation means M5 and the liquefied oxygen transported by the liquefied oxygen transportation means M8 are respectively received by the liquefied methane receiving and regasification unit M6 and the liquefied oxygen receiving and regasification unit M9. For example, the liquefied methane receiving and regasification unit M6 is mainly includes a liquefied methane tank 73 that stores liquefied methane at the liquefied methane receiving terminal, and vaporizers 76a and 76b that use heat transfer media such as seawater to regasify the liquefied methane discharged from the liquefied methane tank 73 by the first pump 74, as shown in FIG. 26. Of the high-pressure and low-pressure methane gas produced by regasification in vaporizers 76a and 76b, the high-pressure methane gas is sent to hydrogen production and carbon capture unit M10, and the low-pressure methane gas is sent to power generation and carbon capture unit M12. The liquefied oxygen receiving and regasification unit M9 can also be configured in a similar manner as the liquefied methane receiving and regasification unit M6. Similarly, high-pressure oxygen is sent to the hydrogen production and carbon capture unit M10, and low-pressure oxygen gas is sent to the power generation and carbon capture unit M12.

Hereinbelow, the liquefied methane receiving and regasification device M6 will be specifically described. the liquefied methane unloaded from the cryogenic tanker T is received into the liquefied methane tank 73 via the unloading arm 71 and the unloading line 72. The structure of liquefied methane tank 73 is not limited, and its type can be, for example, a ground metal two-shell high-floor type that consists of an inner tank made of 9% Ni steel or aluminum alloy and an outer tank made of common carbon steel, with perlite filled and nitrogen introduced between the inner and outer tanks, a PC outer tank type that uses a pre-stressed concrete (PC) instead of carbon steel for the outer tank of the ground metal two-shell high-floor type, or an underground membrane type that has a cold insulator inside a concrete frame and a stainless steel membrane is stretched over an inner surface of the cold insulator.

The liquefied methane discharged from the above-described liquefied methane tank 73 by the first pump 74 is pressurized by the second pump 75$a$ for high pressure service or the booster pump 75$b$ for low pressure service, and then respectively introduced into the vaporizer 76$a$ for high pressure service or the vaporizer 76$b$ for low pressure service. A part of a boil-off gas generated by the heat input to the liquefied methane tank 73 is pressurized by the return gas blower 77 and introduced into the cryogenic tank of the cryogenic tanker T in order to suppress the pressure drop in the tank of the cryogenic tanker T during unloading of the liquefied methane. The remaining boil-off gas is pressurized to a predetermined pressure by the BOG compressor 78 and then sent to the hydrogen production and carbon capture unit M7 together with the low-temperature methane gas vaporized in the above-described vaporizer 76$b$. The liquefied methane pressurized by the second pump 75$a$ is partially extracted and used as a refrigerant for the $CO_2$ liquefaction system described below.

Figure 27:
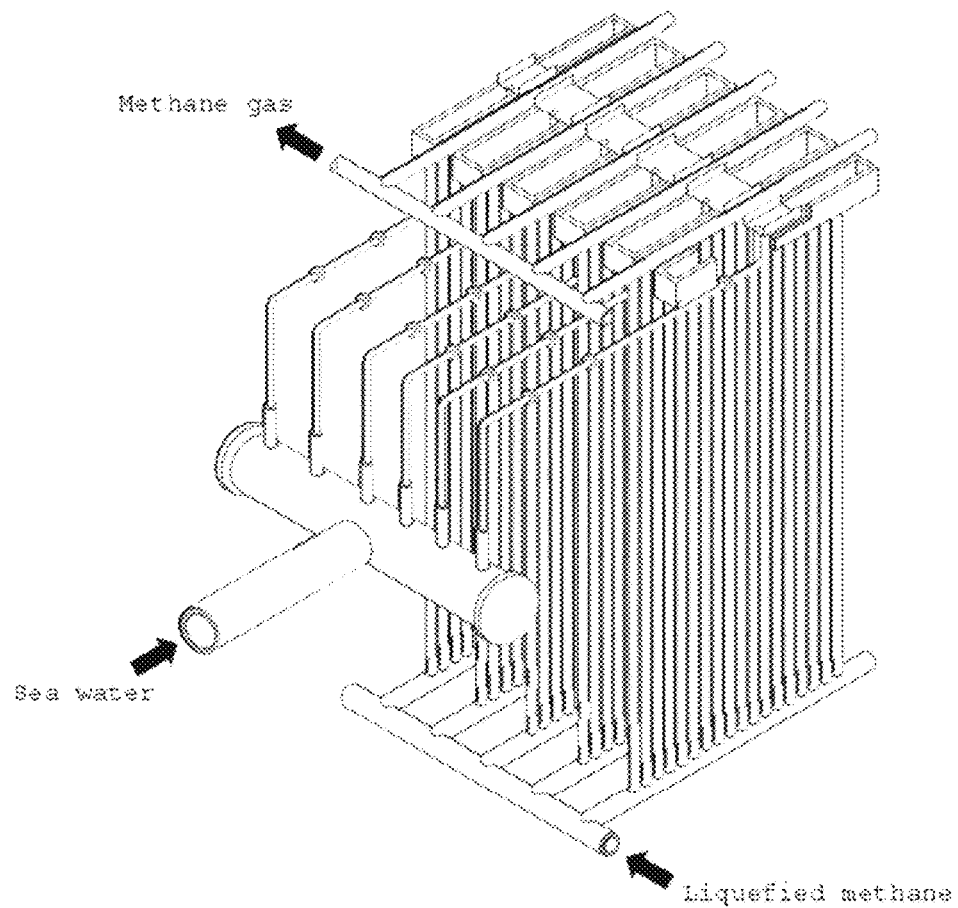
FIG. 27 shows a partial cutaway view of a specific example of the vaporizer shown in the process flow diagram of FIG. 26.

LNG vaporizers can be used for the above-described vaporizers, and either one of the following types is adopted that is an open rack type in which the liquefied methane is vaporized by exchanging heat with seawater flowing down the surface of the panels, a submerged type in which heat exchange tubes are provided in a concrete water tank, such that LNG introduced into the heat exchanger tubes is vaporizes by water to which a high-temperature combustion gas generated by a combustion burner is injected for heating, an intermediate heat medium type in which LNG introduced into one side of a shell-and-tube heat exchanger is vaporized by an intermediate medium such as propane evaporated in seawater and introduced into the other side of the heat exchanger, or an air temperature type in which air is used as the heat source. Although any of these types can be adopted, the open rack type shown in FIG. 27 is more preferable because it is inexpensive to operate and has many achievements. Alternatively, compressed $CO_2$ can be used as a heat source.

The methane that has been regasified in the liquefied methane receiving and regasification unit M6 and the oxygen that has been regasified in the liquefied oxygen receiving and regasification unit M9 are sent to the hydrogen production and carbon capture unit M10, where hydrogen is produced using the autothermal reforming (ATR) process. The auto-thermal reforming (ATR) process generates a synthesis gas containing hydrogen and carbon monoxide by sequentially causing the partial oxidation reaction of methane gas by oxygen, as shown in the following reaction formula 4, and the steam reforming reaction in the presence of a catalyst, as shown in the following reaction formula 5, to occur in a single reactor. Since the reaction heat generated by the partial oxidation reaction can be used for the endothermic reaction of the steam reforming reaction, it is possible to almost completely eliminate the need for external heat energy supply that involves $CO_2$ emissions.

$$CH_4 + 2O_2 \rightarrow CO_2 + 2H_2O \qquad \text{[Reaction Formula 4]}$$

$$CH_4 + H_2O \rightarrow CO + 3H_2 \qquad \text{[Reaction Formula 5]}$$

In other words, since the source of $CO_2$ emissions is process gas only, use of the auto thermal reforming process can produce hydrogen from methane at low environmental impact and low cost. To explain in more detail, the ATR facility that performs the auto thermal reforming process can be configured as shown in the process flow diagram in FIG. 28, for example. The facility shown in FIG. 28 includes of a pre-reformer 81 that reacts the raw material methane, which has been regasified in the liquefied methane receiving and regasification unit M6, with steam to perform preliminary reforming, an ATR reactor 82 that causes a autothermal reforming reaction in the presence of a catalyst called ReforMax (registered trademark) from Clariant, which is suitable for ATR, using the process gas that has been preliminarily reformed in the pre-reformer 81 and oxygen that has been regasified in the liquefied oxygen receiving and regasification unit M9 as raw materials, a first shift reactor 83, that causes the reaction shown in the following reaction formula 6 for reforming because the synthesis gas exiting the ATR reactor 82 contains CO and $CO_2$ as well as hydrogen, a second shift reactor 84 that further reforms the process gas exiting the first shift reactor 83, a gas-liquid separator 85 that separates and removes a condensate produced by cooling the process gas exiting the second shift reactor 84, a decarbonation unit 86 that separates the $CO_2$ contained in the process gas after the water has been removed by the gas-liquid separator 85, and a pressure swing adsorption (PSA) unit 87 that removes impurities of about 5 mol % contained in the process gas after the $CO_2$ has been removed by the decarbonation unit 86 to obtain high-purity hydrogen of 99.9 mol %.

$$CO + H_2O \rightarrow CO_2 + H_2 \qquad \text{[Reaction formula 6]}$$

Figure 28:
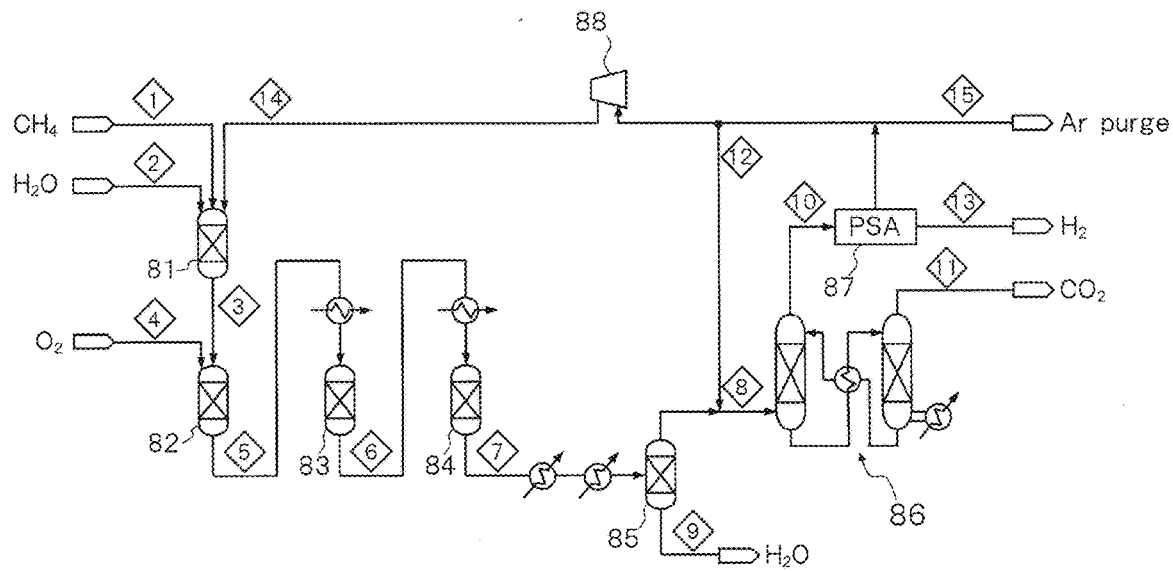
FIG. 28 shows a process flow diagram of an autothermal reforming (ATR) process, which is a specific example of a hydrogen production and carbon capture unit that constitutes the energy transportation system of the first embodiment of the present invention.

As shown above, Table 3 below shows one example of a material balance when the oxygen that has been re-gasified in the liquefied oxygen receiving and re-gasification unit M9 is used for raw material in the process flow diagram shown in FIG. 28.

[Table 3]

In the material balance shown in Table 3 above a pure oxygen derived from water electrolyzer M2 is used as a raw material, but the oxygen used as a raw material is not limited thereto, and for example, oxygen supplied from an air separation unit adjacent to the ATR facility may be used. The following Table 4 shows a specific example of a material balance when oxygen generated by such an air separation unit is used.

[Table 4]

An exhaust gas discharged from the waste heat recovery boiler 85 contains $CO_2$ produced by the combustion of the above-described methane gas, which is separated and recovered in the carbon recovery unit (carbon capturer) 87. There are no particular limitations regarding the method of $CO_2$ separation and recovery in the carbon recovery unit 87, and the method can be a chemical absorption method in which $CO_2$ is chemically absorbed using a solvent such as amine, a physical absorption method in which $CO_2$ is absorbed by a physical absorption solution such as methanol under high pressure, a membrane separation method in which $CO_2$ is separated using a membrane through which $CO_2$ is selectively permeated, or a physical adsorption method in which $CO_2$ is adsorbed onto a solid adsorbent such as molecular sieve (synthetic zeolite) and then $CO_2$ is desorbed and recovered by depressurizing or heating the adsorbent.

Figure 29:
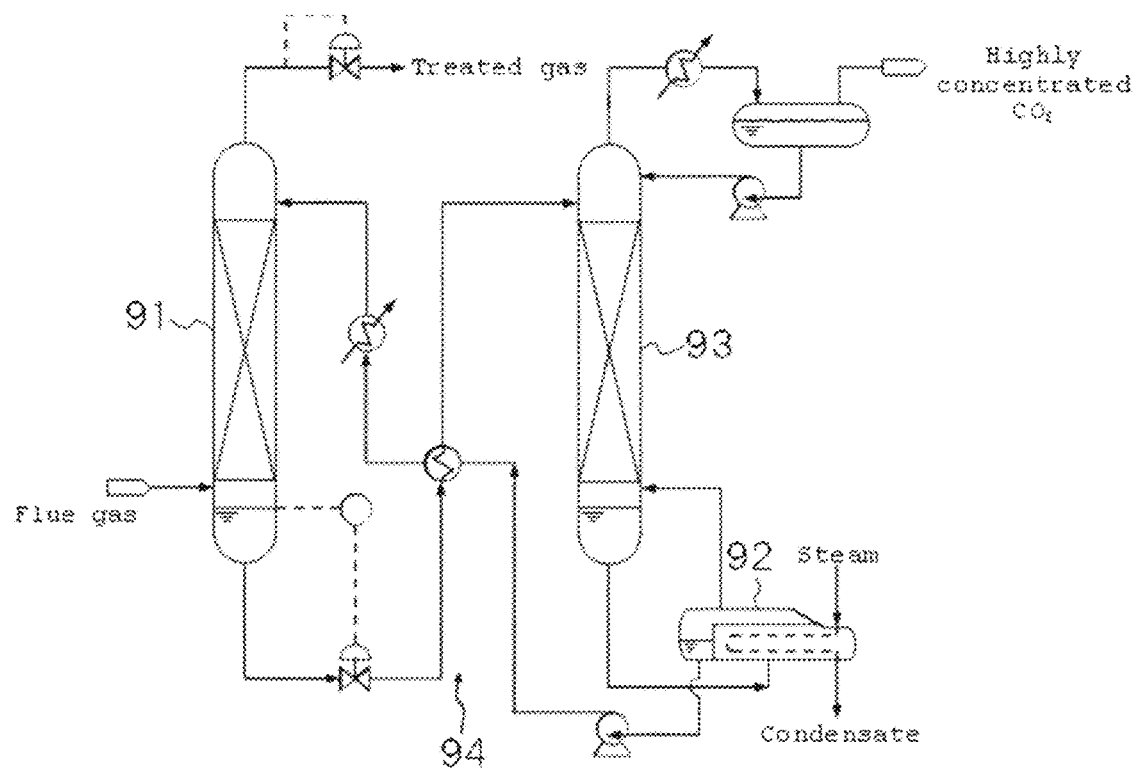
FIG. 29 shows a process flow diagram of an amine absorption liquid process, which is a specific example of a carbon capture unit shown in the process flow diagram of FIG. 28.

Among these methods, the chemical absorption method or physical adsorption method is preferred, and the chemical absorption method using amine absorption liquid or the physical adsorption method using molecular sieve is more preferred, and the chemical absorption method using amine absorption liquid is most preferred. The facility to perform the chemical absorption method using amine absorption liquid is shown in FIG. 29, for example, which includes an absorption column 91 in which gas-liquid contact is performed between the flue gas containing $CO_2$ and an amine absorption liquid, a reboiler 92 in which the rich amine absorption liquid containing $CO_2$ absorbed in the absorption column 91 in the form of amine carbonate is heated to about 110 to 130° C., a regeneration column 93 in which $CO_2$ is dissociated from the rich amine so as to recover the $CO_2$ from the top of the column as highly concentrated $CO_2$ gas with a $CO_2$ concentration of 99 vol % (dry basis) or higher, and to regenerate the rich amine absorption liquid as lean amine absorption liquid, and a circulation system 94 that circulates the amine absorption liquid between the absorption column 91 and the regeneration column 93.

As mentioned above, in the energy transportation system of the first embodiment of the present invention, a portion of the methane that has been regasified in the liquefied methane receiving and regasification unit M6 and a portion of the oxygen that has been regasified in the liquefied oxygen receiving and regasification unit M9 may be respectively extracted, and send them to the power generation and carbon capture unit M12, where the methane is reacted with the oxygen to generate power, and the carbon emitted during power generation may be recovered in the form of high-concentration $CO_2$ gas. The methods of generating electricity by reacting methane with oxygen in this case include the solid oxide fuel cell method, the Allam cycle method, or the oxy-fuel combustion combined cycle method. In any case, it is preferable to mix the recovered high-concentration $CO_2$ with the recycled $CO_2$ recovered in the hydrogen production and carbon recovery unit M10 described above, and transport it to the methane synthesis site via the $CO_2$ transportation means M11.

Figure 30:
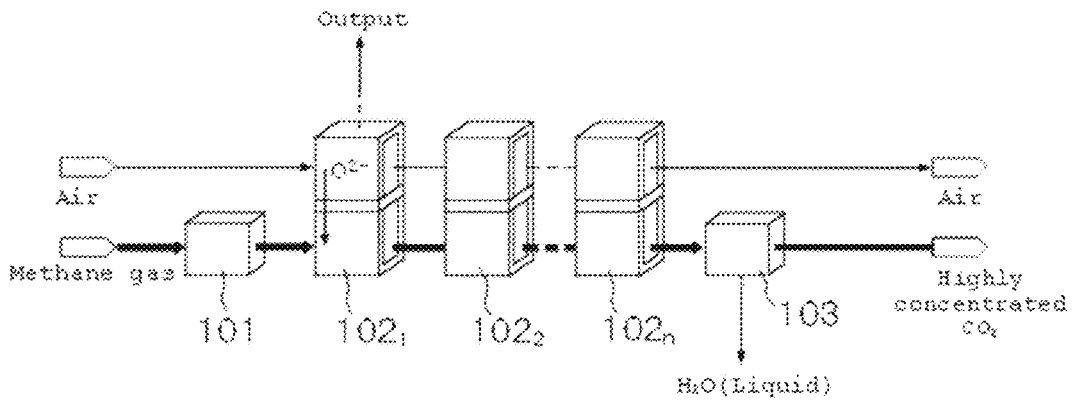
FIG. 30 shows a process flow diagram of power generation using a solid oxide fuel cell, which is another specific example of a hydrogen production and carbon capture unit that constitutes the energy transportation system of the first embodiment of the present invention.

The solid oxide fuel cell system may consist of the equipment shown in FIG. 30, for example. Namely, the equipment shown in FIG. 30 consists of a reformer 101 that generates hydrogen and carbon monoxide by a reforming reaction of methane gas and steam under a catalyst, a multi-stage flat plate fuel cell $102_1$, $102_2$, ... $102_n$ in which n-stage flat-plate single cells are connected in series where each of the cells having a structure of an air pole and a fuel pole facing each other in a vertical direction with a ceramic electrolyte made of, for example, zirconia etc. being sandwiched therebetween, and a condenser 103 that cools the exhaust gas discharged from the fuel electrode side of the final stage fuel cell $102_n$ to separate and remove condensate, and further concentrates $CO_2$ using a decarbonate unit or the like to recover highly concentrated $CO_2$ gas with a $CO_2$ concentration of 98% or more by volume. The decarbonation unit can use a chemical absorption method using the amine absorbent liquid shown in FIG. 29 described above.

Figure 31:
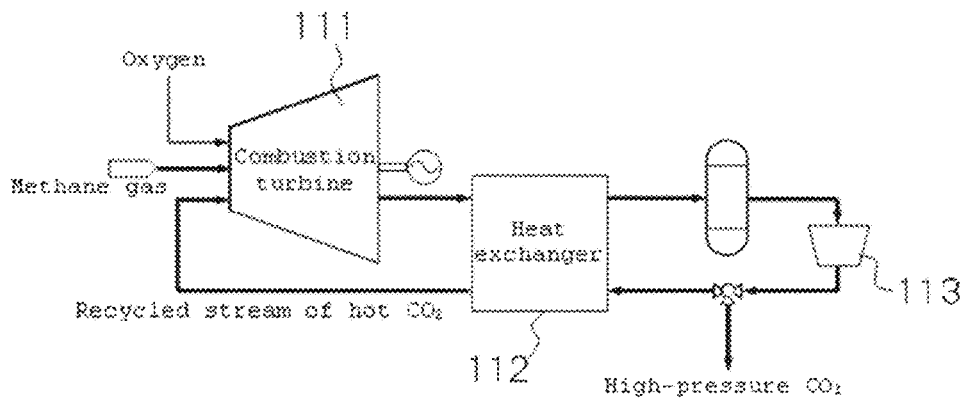
FIG. 31 shows a process flow diagram of power generation using the Allam cycle, which is yet another specific example of a hydrogen production and carbon capture unit that constitutes the energy transport system of the first embodiment of the present invention.

On the other hand, the Allam cycle system is a supercritical $CO_2$ cycle power generation system. As shown in FIG. 31, the Allam cycle is performed by a system that combusts the methane gas as a fuel with oxygen in a $CO_2$ atmosphere, and a high temperature and high-pressure mixture gas of $CO_2$ and steam generated by this combustion is used to rotate the turbine 111 to generate electricity. An exhaust gas discharged from the turbine 111 is cooled in the heat exchanger 112 to separate and remove steam as condensate, and then compressed in the compressor 113 to recover $CO_2$ as a highly concentrated $CO_2$ gas containing more than 98% volume of $CO_2$ produced from carbon derived from methane gas.

Figure 32:
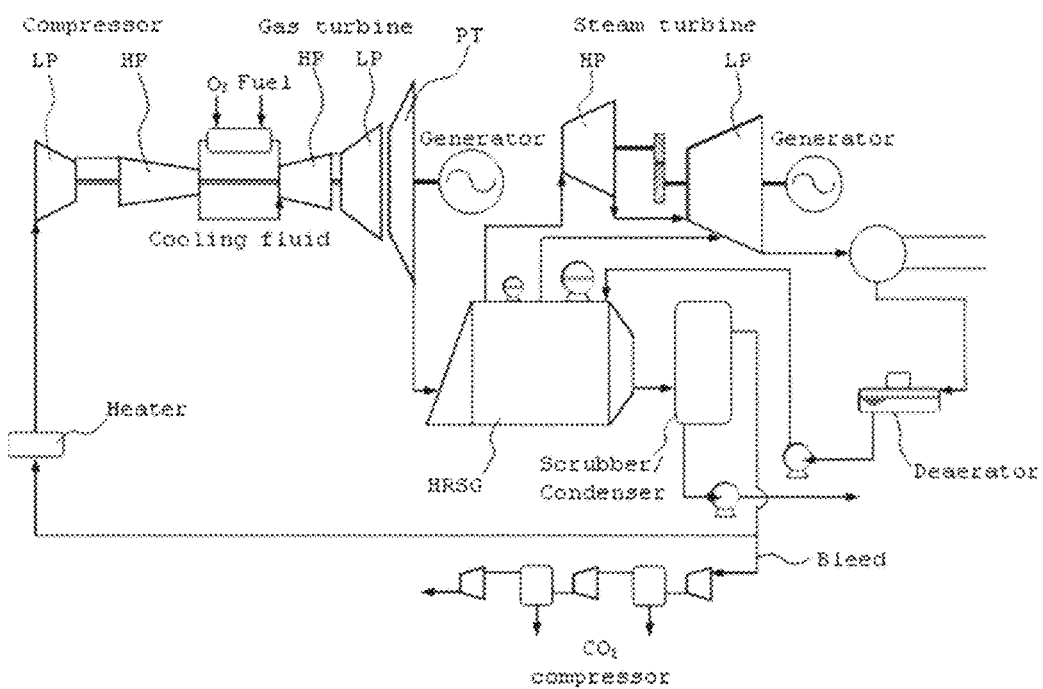
FIG. 32 shows a process flow diagram of power generation using oxy-fuel combustion combined cycle, which is another specific example of hydrogen production and carbon capture unit that constitutes the energy transportation system of the first embodiment of the present invention.

The oxy-fuel combustion combined cycle system employs a combustion technology that allows recovery of $CO_2$ without a $CO_2$ separation process such as chemical absorption using amine absorbent solution, etc., by burning the fuel methane gas with oxygen and recirculated combustion gas (i.e., $CO_2$), thereby increasing the $CO_2$ concentration in the exhaust gas to 90% or more, and it consists of a gas turbine cycle and a steam turbine cycle as shown in FIG. 32. In other words, the high-temperature exhaust gas discharged from the gas turbine that uses oxy-fuel combustion is introduced into the heat recovery steam generator (HRSG), and the steam generated using the thermal energy of the high-temperature exhaust gas is used in the steam turbine cycle.

Figure 33:
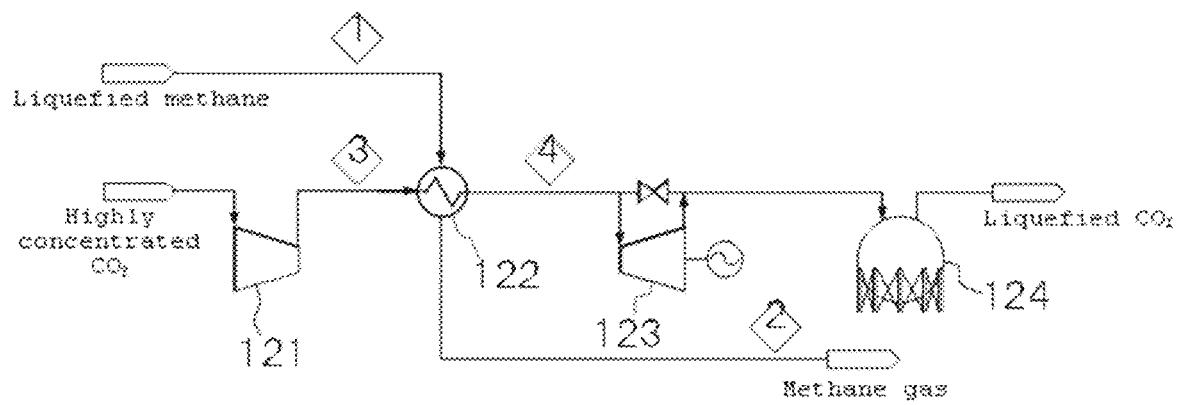
FIG. 33 shows a process flow diagram, mass balance and heat balance of a specific example of $CO_2$ liquefaction unit that constitutes the energy transportation system of the first embodiment of the present invention.

The recycled $CO_2$ recovered in the hydrogen production and carbon capture unit M10 is transferred to the $CO_2$ liquefaction unit. As shown in FIG. 33, the $CO_2$ liquefaction unit includes the compressor 121 that compresses the recycled $CO_2$ to a pressure of 45 to 80 barA, the heat exchanger 122 that liquefies the recycled $CO_2$ by cooling down to a temperature of −33 to −56° C. by using a cryogenic heat that is generated when regasifies the liquefied methane compressed by the second pump 75a of the receiving and regasifying unit M6 to a pressure of 10 to 100 barA, and a liquid turbine 123 to recover power by depressurizing the liquefied $CO_2$ liquefied by the heat exchanger 122 to a pressure of 5.2 to 12.8 barA. FIG. 33 shows the results of the heat balance calculation when liquefying the recycled $CO_2$ of 65 barA with liquefied methane of 50 barA.

Liquid $CO_2$ at a temperature of −56 to −33° C., which has been depressurized to a pressure of 5.2 to 12.8 barA by the above-described liquid turbine 123, is stored in the insulated spherical storage tank 124 that can store the liquefied $CO_2$ under these pressure and temperature conditions. The liquefied $CO_2$ stored in this spherical storage tank 124 is loaded onto a liquefied $CO_2$ tanker as a $CO_2$ transportation means and transported to a methane synthesis site, where the liquefied $CO_2$ is regasified and then used in the methane synthesizer M3 as a feedstock for the Sabatier reaction. There is no particular limitation regarding the regasification method of this liquid $CO_2$. For example, it is preferable that seawater or fresh water is used to heat the liquid $CO_2$ having a temperature of −56 to −33° C. to about 0° C., and waste heat from the product gas of the Sabatier reaction is used to heat it from 0° C. to about 200° C.

Figure 34:
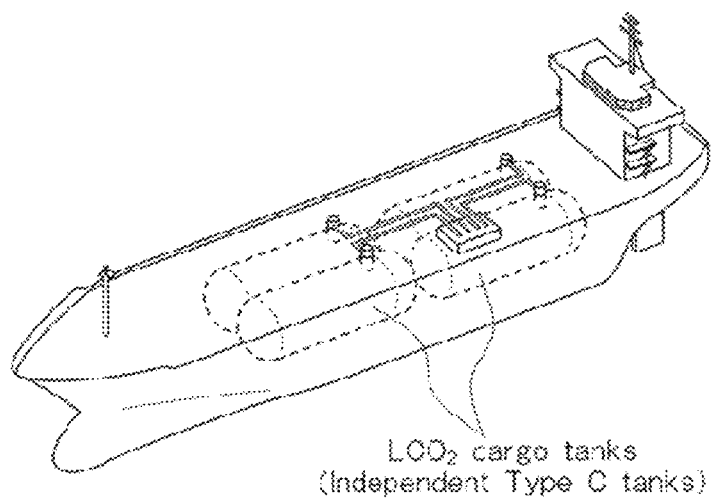
FIG. 34 shows a perspective view of a specific example of a cryogenic tanker for liquefied $CO_2$ equipped with a plurality of horizontal cylindrical tanks.

As mentioned above, the temperature and pressure of liquefied methane and liquefied $CO_2$ are different, so it is preferable to use a dedicated cryogenic tanker for transporting each of these liquefied methane and liquefied $CO_2$. Similarly, the temperature and pressure of liquefied oxygen and liquefied $CO_2$ are different, so it is preferable to use a dedicated cryogenic tanker for transporting each of these liquefied oxygen and liquefied $CO_2$. In other words, during the tanker transportation, liquefied $CO_2$ has a pressure of 5.2 to 12.8 barA and a temperature of −56 to −33° C., so it is preferable to use low-temperature steel for the material of cryogenic tankers for liquefied $CO_2$, such as aluminum-killed carbon steel, 1.5% Ni nickel steel, or high-tensile nickel steel for low temperatures. On the other hand, during tanker transportation, liquid oxygen has a pressure of 1.0 to 13.0 bar A and a temperature of −183.9 to −149° C., so it is preferable to use 8.5 to 9.5% Ni steel (JIS, SL9N590), 18-8 stainless steel, or aluminum alloy 5083 for the material of the cryogenic tanker for liquid oxygen. Since the liquid densities of the above liquefied $CO_2$ and liquefied oxygen are both higher than that of liquefied methane, it is preferable to use a cryogenic tanker with four to eight horizontally-oriented cylindrical tanks, as shown in FIG. 34, in order to keep the center of gravity of the tanker low.

On the other hand, for cryogenic tankers for liquefied methane, it is preferable to use Moss-type tankers with 3 to 7 spherical tanks, and materials of these spherical tanks should include the following: if the liquefied methane during transportation reaches pressures of −0.05 to 0.25 barG and a temperature of −162° C., preferred materials for these spherical tanks are 6-7.5% Ni steel (JIS, SL7N590), 8.5-9.5% Ni steel (JIS, SL9N590), 18-8 stainless steel, or aluminum alloy 5083, or if the liquefied methane reaches pressures of 8.0-12.8 barA and temperatures of −120 to −130° C., 6-7.5% Ni steel, 8.5-9.5% Ni steel, 18-8 stainless steel, aluminum alloy 5083, or 5% Ni steel is preferred.

If a common cryogenic tanker can be shared for transporting the liquefied methane and the liquefied $CO_2$, instead of using dedicated cryogenic tankers as described above, a significant cost reduction can be achieved because a dedicated tanker for liquefied $CO_2$ will not be needed. In other words, if a cryogenic tanker that loads liquefied methane at the liquefied methane shipping terminal at the PtG complex and transports the liquefied methane to the liquefied methane receiving terminal at the hydrogen production complex can be shared with a cryogenic tanker that loads liquefied $CO_2$ at the liquefied $CO_2$ shipping terminal at the hydrogen production complex and transports the liquefied $CO_2$ from there to the PtG complex for the return journey, transportation costs can be significantly reduced. Similarly, if a single cryogenic tanker could be used for both the transfer of liquefied oxygen and liquefied $CO_2$, rather than using a dedicated cryogenic tanker for each of these transfers, this would result in a significant cost reduction. As mentioned above, when using a shared tanker, the cryogenic tanker with 3 to 7 spherical tanks, or 4 to 8 horizontal cylindrical tanks can also be used. However, since liquefied methane and liquefied oxygen need to be transported at lower temperatures than liquefied $CO_2$, the material of these spherical tanks or horizontal cylindrical tanks must be selected to withstand such low-temperature liquefied methane and liquefied oxygen.

Specifically, when a transporting condition of liquefied methane is at a pressure of −0.05 to 0.25 barG and a temperature of −162° C., and a transporting condition of liquefied $CO_2$ is at a pressure of 5.2 to 12.8 barA and a temperature of −56° C. to −33° C., the tank materials of the common cryogenic tanker used for transporting the liquefied methane and the liquefied $CO_2$ should be selected from among 6-7.5% Ni steel, 8.5-9.5% Ni steel, 18-8 stainless steel, and aluminum alloy 5083.

On the other hand, when a transporting condition of pressurized liquefied methane is at a pressure of 8.0 to 12.8 barG and a temperature of −120 to −130° C., and a transporting condition of liquefied $CO_2$ is at a pressure of 5.2 to 10.8 barA and a temperature of −56° C. to −33° C., the tank materials of the common cryogenic tanker used for transporting the pressurized liquefied methane and the liquefied $CO_2$ should be selected from among 6-7.5% Ni steel, 8.5-9.5% Ni steel, 18-8 stainless steel, aluminum alloy 5083, and 5% Ni steel. Transporting the liquefied methane in the pressurized condition would allow the use of 5% Ni steel, which is less expensive than 6-7.5% Ni steel, 8.5-9.5% Ni steel, 18-8 stainless steel, and aluminum alloy 5083.

In addition, when transporting liquefied oxygen, the pressure is 1.0 to 13.0 barA and the temperature is −183.9 to −149° C., and when transporting liquefied $CO_2$, the pressure is 5.2 to 18.8 barA and the temperature is −56 to −33° C. The tank material of the cryogenic tanker used for the transport of these liquefied oxygen and liquefied $CO_2$ is 6-7.5% Ni steel, 8.5-9.5% Ni steel, 18-8 stainless steel, aluminum alloy 5083, or 5% Ni steel.

1-2. Green Energy Transportation Method

Next, an energy transportation method using the energy transportation system of the first embodiment of the present invention will be described. The energy transportation method using the energy transportation system of the first embodiment of the present invention includes a power generation step that generates and stores electricity from a renewable energy, a water electrolysis step that generates hydrogen by electrolysis of water using electricity obtained in the power generation step, a methane synthesis step that generates methane by methanation through a Sabatier reaction using the hydrogen produced in the water electrolysis step and a recycled $CO_2$ as raw materials, a methane liquefaction step that liquefies methane by using a rotary positive displacement type refrigerant compressor driven by a synchronous motor to which electricity from the renewable energy is supplied as an energy source via a variable speed motor inverter so as to transport the methane produced in the methane synthesis step in the form of liquefied methane, a liquefied methane transportation step that transports the methane produced in the methane synthesis step and liquefied in the methane liquefaction step to a hydrogen energy consumption site by using a means that does not emit $CO_2$ into the atmosphere, a liquefied methane receiving and regasifying step that regasifies the liquefied methane after received it in a liquid methane storage tank, an oxygen liquefaction step that liquefies the oxygen generated in the water electrolysis step by using a rotary positive displacement type refrigerant compressor driven by a synchronous motor to which electricity from the renewable energy is supplied as an energy source via a variable speed motor inverter so as to transport the oxygen generated in the water electrolysis step in the form of liquefied oxygen, a liquefied oxygen transportation step that transports the oxygen liquefied in the oxygen liquefaction step to the hydrogen energy consumption site by using a means that do not emit $CO_2$ into the atmosphere, a liquefied oxygen receiving and regasification step that regasifies the liquefied oxygen transported by the liquefied oxygen transportation step after received it in a liquefied oxygen storage tank, a hydrogen production and carbon capture and reuse (CCR) step that produces hydrogen by an autothermal reforming method using the methane and oxygen that have been received and regasified in the liquefied methane receiving and regasification step and the liquefied oxygen receiving and regasification step as raw materials, and recovers high-concentration $CO_2$ gas as recycled $CO_2$ from a process gas generated during the hydrogen production, and a $CO_2$ transportation step that transports the recycled $CO_2$ recovered in the hydrogen production and carbon capture and reuse (CCR) step to a methane synthesis site performing the methane synthesis step by using a means that does not emit $CO_2$ into the atmosphere. The energy transportation method may further include a power generation and carbon capture and reuse (CCR) step that generates power by extracting and reacting portions of the regasified methane and oxygen with each other, and the carbon discharged during the power generation is recovered in the form of high-concentration $CO_2$ gas.

The methane transportation step transports liquefied methane liquefied in the methane liquefaction step to the hydrogen energy consumption site by a liquefied methane tanker driven by the first power means that does not emit $CO_2$ into the atmosphere. The water electrolysis and carbon capture step has a $CO_2$ liquefaction step that liquefies the recycled $CO_2$ so as to transport the recovered recycled $CO_2$ in the form of liquid $CO_2$, and the methane synthesis step has a liquefied $CO_2$ receiving and regasifying step that regasifies the liquefied $CO_2$ transported by the liquefied $CO_2$ transport step after received it in the liquefied $CO_2$ storage tank. In this case, the $CO_2$ transportation step transports the liquefied $CO_2$ liquefied in the $CO_2$ liquefaction step to the methane synthesis site where the methane synthesis step is performed by a liquefied $CO_2$ tanker driven by a second power means that does not emit $CO_2$ into the atmosphere. The second power means that does not emit $CO_2$ into the atmosphere may be, as in the case of the liquefied methane transportation means M5 described above, an engine driven unit by combustion of hydrogen or fossil fuel (internal combustion engine) accompanied by a facility to recover $CO_2$ in the exhaust gas discharged during the combustion in the case of fossil fuel combustion, or a battery-driven unit such as secondary batteries represented by lithium-ion secondary batteries, or fuel cells accompanied by an electrochemical hydrogen compression facility and a high-pressure hydrogen storage facility. When a liquefied $CO_2$ tanker is equipped with a high-pressure hydrogen storage facility to be used as fuel for fuel cells, the ratio of the total capacity of high-pressure hydrogen containers such as hydrogen cylinders to the liquefied $CO_2$ tank volume (hull volume) is adjusted according to the transport distance and the storage pressure of the high-pressure hydrogen. For example, in the case of a liquefied $CO_2$ tanker transporting liquefied $CO_2$ between Japan and Alaska, a group of hydrogen storage cylinders with a total capacity of around 20% of the liquefied $CO_2$ tank volume is required to store the 700 barG high-pressure hydrogen for the round trip.

Figure 35:
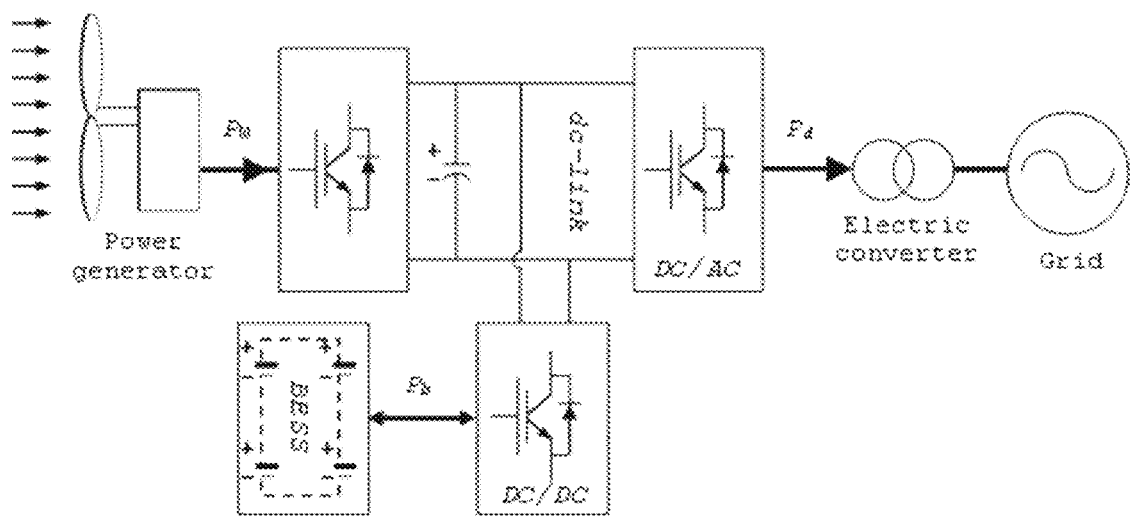
FIG. 35 shows a diagram showing a specific example of a wind power generator and storage batteries using a permanent magnet synchronous generator included in the power generator that constitutes the energy transportation system of the first embodiment of the present invention.

In the power generation step for generating electricity from renewable energy sources described above, any of the following renewable energy sources may be used as energy sources: wind power, photovoltaic power, solar thermal power, geothermal power, hydroelectric power, biomass power, wave/tidal-current/tidal power, etc., but wind turbine generators are suitably employed. In this case, a storage battery installed beside the above-described wind turbine generator should be set to have a capacity value in the range of 106 to 126% of the wind turbine rating of the wind turbine generator, and the storage battery should be operated in the operational range of 20 to 90% of the wind turbine rating. FIG. 35 shows a configuration diagram of a specific example of a wind turbine generator using a permanent magnet synchronous generator and a storage battery.

In the electrolysis of water in the water electrolysis step, the minimum electrolysis load, which is the power required for the electrolysis of water, should be preferably set within the range of 5 to 30% of the wind turbine rating. It is preferable to control the system such that if the power generated by the wind turbine generator, whose variable is the wind speed, is less than the minimum electrolysis load, its shortage is made up from the storage battery in which the above storage is performed. Whereas if the power generated by the wind turbine is equal to or above the minimum electrolysis load, the generated power is used for the electrolysis of water, and an excess power of the generated power over the minimum electrolysis load is charged to the storage battery under conditions of below an upper limit set within a range of 5 to 15% of the wind turbine rating and within the operational range of the storage battery. In principle, this control scheme allows the methane liquefaction processing of the methane liquefaction facility to be operated successively without stopping.

Figure 36:
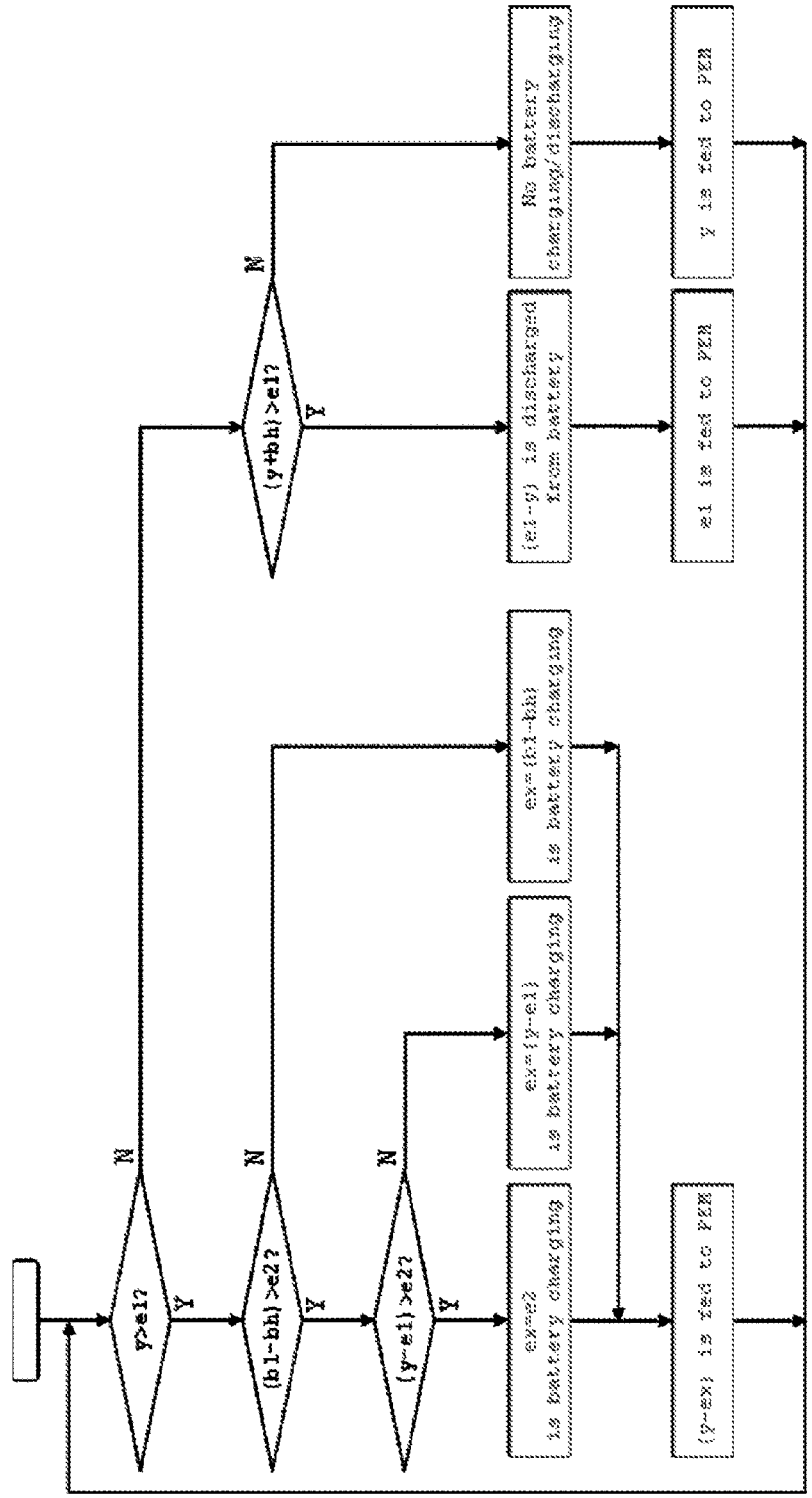
FIG. 36 shows a flowchart of a control algorithm that is suitably used in the power generator that constitutes the energy transportation system of the first embodiment of the present invention.

FIG. 36 shows a flowchart of a specific example of an algorithm for the above-described control. That is, when an amount of generated electricity (y) by wind power exceeds a minimum electrolysis load (e1), an excess power (ex) determined by a battery capacity upper limit (e2) specified within the range of 5 to 15% of the wind turbine rating, an upper limit of an operating range value (b1) determined from the battery capacity ratio, and a current battery charge (bh) is exported primarily to the storage battery for charging, a power obtained by subtracting the excess power (ex) from the amount of generated electricity (y) is then fed to for example the PEM water electrolysis unit. On the other hand, if the amount of generated electricity (y) of the wind power is less than the minimum electrolysis load (e1), a power is taken from the storage battery and fed to the PEM water electrolysis unit according to the value of the current battery charge (bh). This eliminates the need to shut down the methane liquefaction facility performing the methane liquefaction process unless an abnormal condition where the wind speed of 3.0 m/s or less continues for more than 20 hours.

Figure 37:
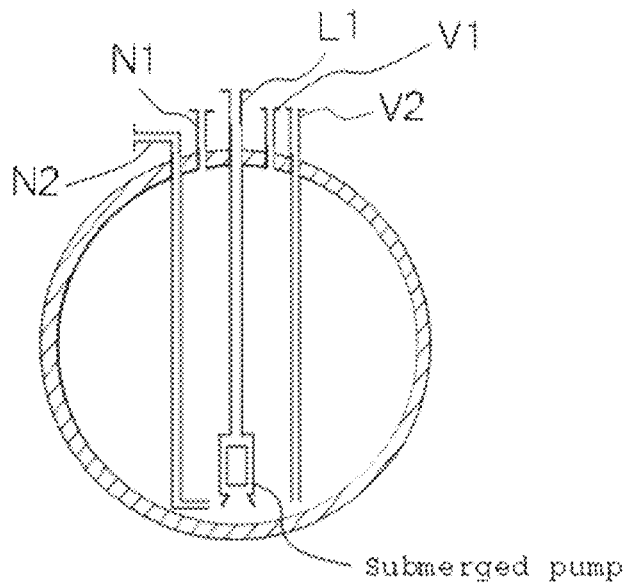
FIG. 37 shows a vertical cross-sectional diagram of a specific example of the spherical tank of the cryogenic tanker shown in FIG. 24.
Figure 38:
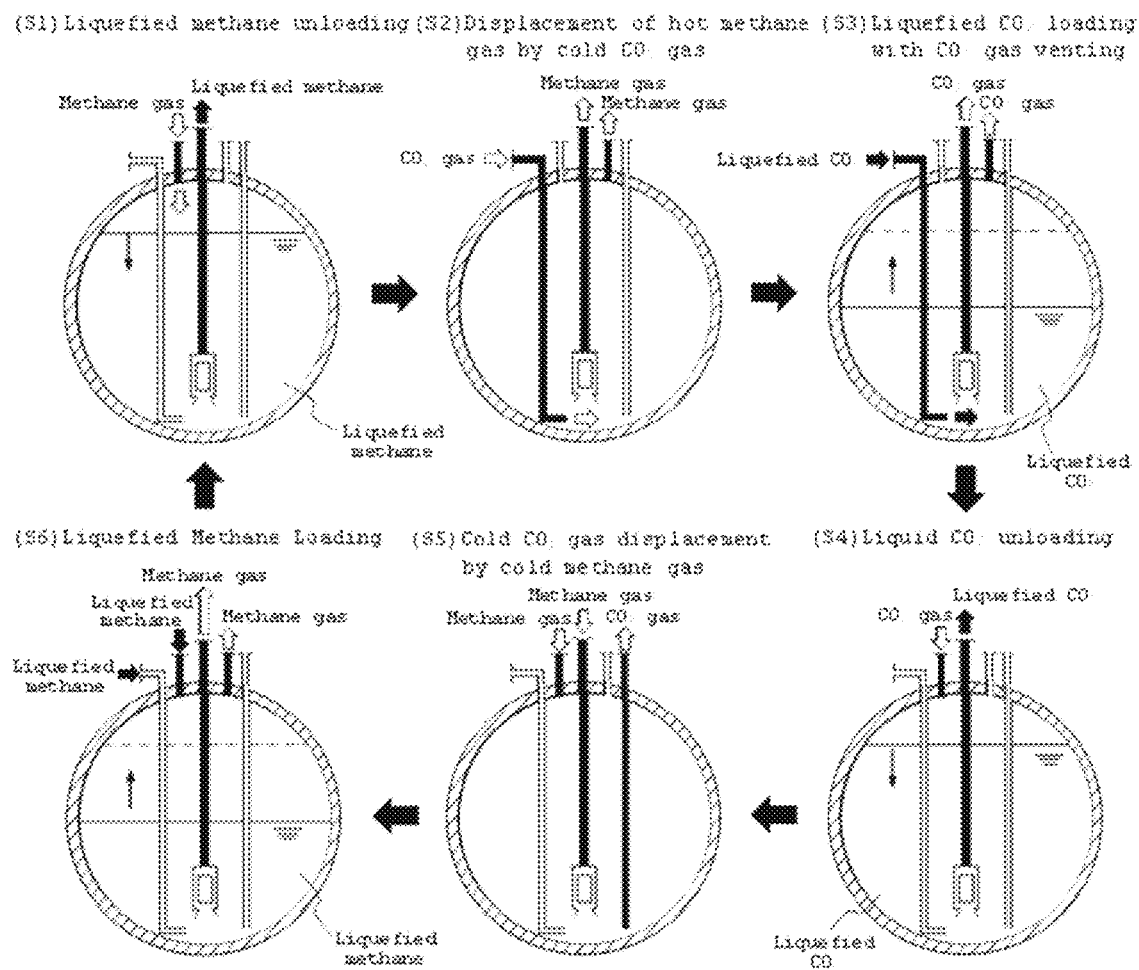
FIG. 38 shows a vertical cross-sectional diagram showing the loading and unloading procedures when the cryogenic tanker is used for both of the liquefied methane transportation means and the liquefied $CO_2$ transportation means that constitute the energy transportation system of the first embodiment of the present invention.

Next, as mentioned above, the procedure for loading/unloading the liquefied methane and the liquefied $CO_2$ to/from a common cryogenic tanker for transporting the liquefied methane and the liquefied $CO_2$ will be described based on an exemplary case: the storage conditions for the liquefied methane to be handled are a pressure of −0.05 to 0.25 barG and a temperature of −162° C., and the storage conditions for the liquefied $CO_2$ are a pressure of 5.2 to 12.8 barA and a temperature of −56 to −33° C. As shown in FIG. 37, each of a plurality of multiple tanks of the cryogenic tanker has a first feed nozzle N1 with a discharge port at an upper section in the tank, a second feed nozzle N2 with a discharge port at a lower section in the tank, a first vent nozzle V1 with a discharge port at an upper section in tank, a second vent nozzle V2 with a discharge port at a lower section in the tank, and a discharge nozzle L1 of a column for a submerged pump. Using these five nozzles, the liquefied methane and the liquefied $CO_2$ can be alternately transported by repeating the following operations S1 to S6, as shown in FIG. 38.

(S1) Liquefied Methane Unloading

The liquefied methane in the spherical tank is unloaded by operating the submerged pump while introducing methane gas at a low temperature of, for example, −50° C. as a displacement gas into the tank from the first feed nozzle N1, and the methane gas is continuously introduced after the unloading is completed to pressurize the tank to, for example, 6.92 barA.

(S2) Displacement of Hot Methane Gas by Cold $CO_2$ Gas

The cold $CO_2$ gas with a pressure of 6.92 barA and a temperature of −50° C., for example, is introduced from a lower section of the tank by the second feed nozzle N2, and methane gas in the tank is vented from the first vent nozzle V1 and the discharge nozzle L1 of the submerged pump to replace methane gas with carbon dioxide gas. The density ratio of the methane gas to the $CO_2$ gas at the time of this substitution is 1:2.75.

(S3) Liquefied $CO_2$ loading with $CO_2$ Gas Venting

The low-temperature liquefied $CO_2$ with a pressure of 6.92 barA and a temperature of −50° C., for example, is introduced from a lower section of the tank by the second feed nozzle N2 for loading, while the $CO_2$ gas in the tank is vented from the first vent nozzle V1 and discharge nozzle L1 of the submerged pump to replace $CO_2$ gas with liquid $CO_2$.

(S4) Liquid $CO_2$ Unloading

The liquefied $CO_2$ in the tank is unloaded by operating the submerged pump while introducing low-temperature $CO_2$ gas of −50° C., for example, as a replacement gas into the tank from the first feed nozzle N1.

(S5) Displacement of Cold $CO_2$ Gas by Cold Methane Gas

The cold methane gas with a pressure of 6.92 barA and a temperature of −50° C., for example, is introduced from an upper section of the tank and the pump column by the first feed nozzle N1 and the discharge nozzle L1 of the submerged pump, while the $CO_2$ gas in the tank is vented from the second vent nozzle V2 to replace the $CO_2$ gas with methane gas. The density ratio of the methane gas to the $CO_2$ gas during this substitution is 1:2.75.

(S6) Liquefied Methane Loading

The liquefied methane is sprayed from an upper section of the tank by the first feed nozzle N1 to cool the tank to a cryogenic temperature of, for example, −130° C., and then the liquefied methane is introduced from the second feed nozzle N2 while venting methane gas from the first vent nozzle V1 and discharge nozzle L1 of the submerged pump so as to perform loading with gradual rising of the liquid level from the bottom.

Next, the procedure for loading/unloading the pressurized liquefied methane and the liquefied $CO_2$ will be described based on an exemplary case where the storage conditions for the pressurized liquefied methane to be handled are a pressure of 8.0 to 12.8 barA and a temperature of −120 to −130° C., and the storage conditions for liquefied $CO_2$ are a pressure of 5.2 to 10.8 barA and a temperature of −56 to −33° C.

(S1) Liquefied Methane Unloading

The pressurized liquefied methane in the tank is unloaded by operating the submerged pump while introducing methane gas at a low temperature of, for example, −50° C. as a displacement gas into the tank from the first feed nozzle N1, and the methane gas is continuously introduced after the unloading is completed to pressurize the tank to, for example, 10 barA.

(S2) Displacement of Hot Methane Gas by Cold $CO_2$ Gas

The cold $CO_2$ gas with a pressure of 10 barA and a temperature of −40° C., for example, is introduced from a lower section of the tank by the second feed nozzle N2, and methane gas in the tank is vented through the first vent nozzle V1 and the discharge nozzle L1 of the submerged pump to replace the methane gas with carbon dioxide gas. The density ratio of the methane gas to the $CO_2$ gas during this substitution is 1:2.75.

(S3) Liquefied $CO_2$ loading with $CO_2$ Gas Venting

The low-temperature liquefied $CO_2$ with a pressure of 10 barA and a temperature of −40° C., for example, is introduced from a lower section of the tank by the second feed nozzle N2 for loading, while the $CO_2$ gas in the tank is vented from the first vent nozzle V1 and the discharge nozzle L1 of the submerged pump to replace $CO_2$ gas with liquid $CO_2$.

(S4) Liquid $CO_2$ Unloading

The liquefied $CO_2$ in the tank is unloaded by operating the submerged pump while introducing $CO_2$ gas at a low temperature of −40° C., for example, as a replacement gas into the tank from the first feed nozzle N1.

(S5) Displacement of Cold $CO_2$ Gas by Cold Methane Gas

The cold methane gas with a pressure of 10 barA and temperature of −40° C., for example, is introduced from an upper section of the tank and the pump column by the first feed nozzle N1 and the discharge nozzle L1 of the submerged pump, while the $CO_2$ gas in the tank is vented from the second vent nozzle V2 to replace the $CO_2$ gas with methane gas. The density ratio of the methane gas to the $CO_2$ gas during this substitution is 1:2.75.

(S6) Liquefied Methane Loading

The liquefied methane is sprayed from an upper section of the tank by the first feed nozzle N1 to cool the tank to a cryogenic temperature of, for example, −90° C., and then the liquefied methane is introduced from the second feed nozzle N2 while venting methane gas from the first vent nozzle V1 and discharge nozzle L1 of the submerged pump so as to perform loading with gradual raising of the liquid level from the bottom.

At the liquefied methane receiving terminal, the above-described operation S1 is sequentially performed one by one to the plurality of tanks filled with liquefied methane, and when operation S1 is completed, operations S2 and S3 are continuously performed in each of the plurality of tanks, which can eventually performs unloading of the liquefied methane and loading of the liquefied $CO_2$ in all tanks.

On the other hand, at the methane synthesis site, the above-described operation S4 is sequentially performed one by one to the plurality of tanks filled with the liquefied $CO_2$, and when operation S4 is completed, operations S5 and S6 are continuously performed in each of the plurality of tanks, which can eventually performs unloading of the liquefied $CO_2$ and loading of the liquefied methane in all tanks. The above unloading/loading operations are the same for pressurized liquefied methane.

Figure 39:
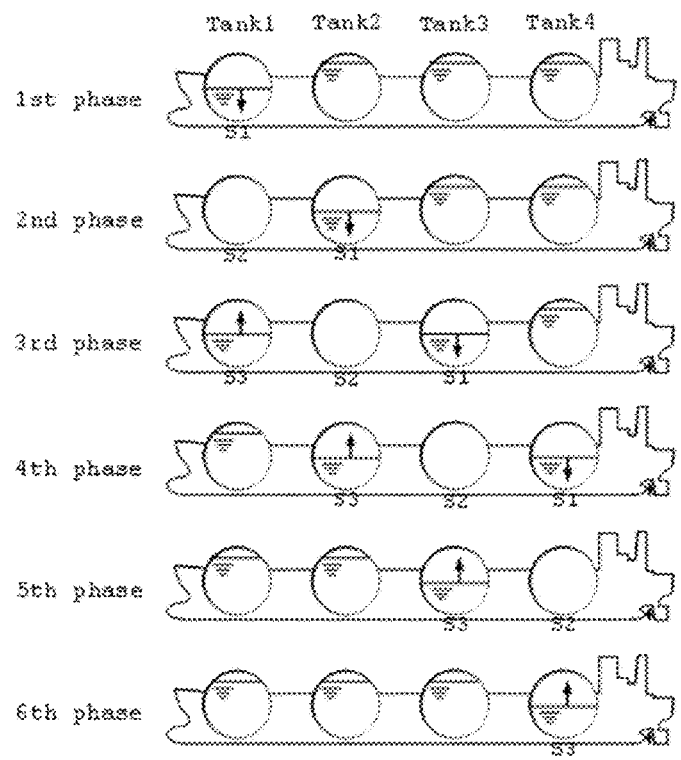
FIG. 39 shows a vertical cross-sectional diagram showing the procedure for replacing liquefied methane with liquefied $CO_2$ in the procedure of FIG. 38 by using a cryogenic tanker equipped with four spherical tanks.

The unloading/loading operations will be specifically described based on a case where a cryogenic tanker has four spherical tanks, at the liquefied methane receiving terminal, as shown in FIG. 39, among these four spherical tanks filled with liquefied methane, operation S1 is performed only on tank 1 in the first phase, and in the second phase, operation S1 is switched from tank 1 to tank 2, and operation S2 is performed on tank 1. In the third phase, operation S1 is switched from tank 2 to 3, operation S2 is switched from tank 1 to 2, and operation S3 is performed in tank 1. In the fourth phase, operation S1 is switched from tank 3 to 4, operation S2 is switched from tank 2 to 3, and operation S3 is performed on tank 2. In the fifth phase, operation S2 is switched from tank 3 to 4 and operation S3 is switched from tank 2 to 3, and in the sixth phase, operation S3 is switched from tank 3 to 4.

Figure 40:
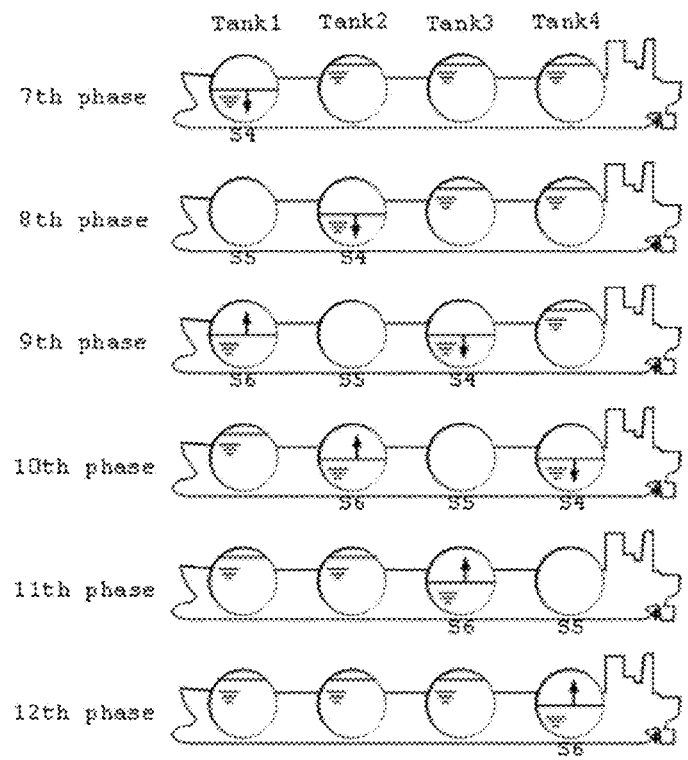
FIG. 40 shows a vertical cross-sectional diagram showing the procedure for replacing liquefied $CO_2$ with liquefied methane in the procedure in FIG. 38 by using a cryogenic tanker equipped with four spherical tanks.

Similarly, at the liquefied methane receiving station, as shown in FIG. 40, among these four spherical tanks filled with liquefied $CO_2$, operation S4 is first performed only on tank 1 in the seventh phase, and in the eighth phase, operation S4 is switched from tank 1 to 2 and operation S5 is performed on tank 1. In the ninth phase, operation S4 is switched from tank 2 to 3, operation S5 is switched from tank 1 to 2, and operation S6 is performed on tank 1. In the tenth phase, operation S4 is switched from tank 3 to 4, operation S5 is switched from tank 2 to 3, and operation S6 is performed in tank 2. In the eleventh phase, operation S5 is switched from tank 3 to 4 and operation S6 is switched from tank 2 to 3, and in the twelfth phase, operation S6 is switched from tank 3 to 4.

It is preferable that an equivalent amount of $CO_2$ emitted into the atmosphere from the entire steps, i.e., from the power generation step to the $CO_2$ transport step described above, is less than 3% of carbon consumed in the entire steps in terms of $CO_2$, and it is more preferable that the equivalent amount of $CO_2$ emitted is less than 1%. In order to offset this preferable equivalent amount of 3% or less of $CO_2$ emission, and more preferable equivalent amount of 1% or less of $CO_2$ emission, it is preferable to use $CO_2$ recovered from the combustion gas of biomass power generation or biomass combustion facilities, or from direct air capture (DAC) as the above-described recycled $CO_2$. This will achieve a zero $CO_2$ emission in the green energy transportation according to the embodiment of the present invention, when these biomass power generation or biomass combustion facilities, or direct air capture is taken into account in the $CO_2$ emissions as a whole.

When a cryogenic tanker with the structure shown in FIG. 37 is used for both the transportation of liquefied oxygen and the transportation of liquefied $CO_2$, the liquefied oxygen and liquefied $CO_2$ can be transported alternately by repeating the following operations in the same manner as above.

(S1) Unloading the liquid oxygen in the spherical tank by operating the submerged pump while introducing low-temperature oxygen gas into the tank as a gas for replacement from the first supply nozzle, and continuing to introduce oxygen gas after unloading is complete to pressurize the tank.

(S2) Low-temperature $CO_2$ gas is introduced from the bottom of the tank via the second supply nozzle, and the oxygen gas in the tank is vented from the first vent nozzle and the submerged pump discharge nozzle to replace the oxygen gas with carbon dioxide gas.

(S3) Loading is carried out by introducing low-temperature liquefied $CO_2$ from the bottom of the tank via the second supply nozzle, and $CO_2$ gas in the tank is vented from the first vent nozzle and the submerged pump discharge nozzle to replace the $CO_2$ gas with liquid $CO_2$.

(S4) Unloading the liquefied $CO_2$ in the spherical tank by operating the submerged pump while introducing low-temperature $CO_2$ gas into the tank from the first supply nozzle as a gas for replacement.

(S5) Replacing the $CO_2$ gas with oxygen gas by introducing low-temperature oxygen gas from the top of the tank and pump column through the first supply nozzle and the submerged pump discharge nozzle, and venting the $CO_2$ gas from the second vent nozzle.

(S6) After the spherical tank is cooled to a very low temperature by spraying liquid oxygen from the top of the tank using the first supply nozzle, loading is carried out by introducing liquid oxygen from the second supply nozzle while oxygen gas is vented from the first vent nozzle and the submerged pump discharge nozzle, so that the liquid level gradually rises from the bottom.

At the liquid oxygen receiving terminal, the operation S1 is performed sequentially for each of the plurality of tanks filled with liquid oxygen, and after the operation S1 is completed for each of the plurality of tanks, the operations S2 and S3 are performed sequentially, and finally, the unloading of liquid oxygen and the loading of liquid $CO_2$ can be performed for all of the tanks. On the other hand, at the oxygen liquefaction terminal, the S4 operation is performed sequentially for each of the plurality of tanks filled with liquefied $CO_2$, and after the S4 operation is completed for each of the plurality of tanks, the operations S5 and S6 are performed sequentially, and finally, the unloading of liquefied $CO_2$ and the loading of liquefied oxygen can be performed for all of the tanks.

2. Second Embodiment (Pipeline Transportation System)

2-1 Green Energy Transportation System

The energy transportation system of the first embodiment of the present invention described above includes the marine transportation via cryogenic tankers to transport methane and $CO_2$, but this marine transportation is not required when the PtG complex and the hydrogen production complex are located within the same continent, such as within the Eurasian, North American, and South American continents. In these cases, it is preferable to transport methane gas and $CO_2$ gas in the form of high-pressure gases via pipelines instead of transporting them by cryogenic tankers. In this case, the oxygen used at the hydrogen energy consumption site may be transported from the PtG complex to the hydrogen production complex via pipeline, or it may be supplied from an air separation unit installed adjacent to the hydrogen production complex. In the following description, it is assumed that oxygen produced by an air separation unit is used.

For example, on the North American continent, a network of natural gas pipelines extends across the United States as shown in FIG. 41, and there are plans to lay out a $CO_2$ gas pipeline network like the one shown in FIG. 42. These infrastructures of the natural gas pipeline network and the $CO_2$ gas pipeline network may be used to transport methane gas and $CO_2$ gas within the United States. The green energy transportation system according to the second embodiment of the present invention will be thus described hereinbelow in which methane gas and $CO_2$ gas are transported via pipelines.

It should be noted that this green energy transportation system using pipelines may be referred to as a green pipeline gas loop.

Figure 43:
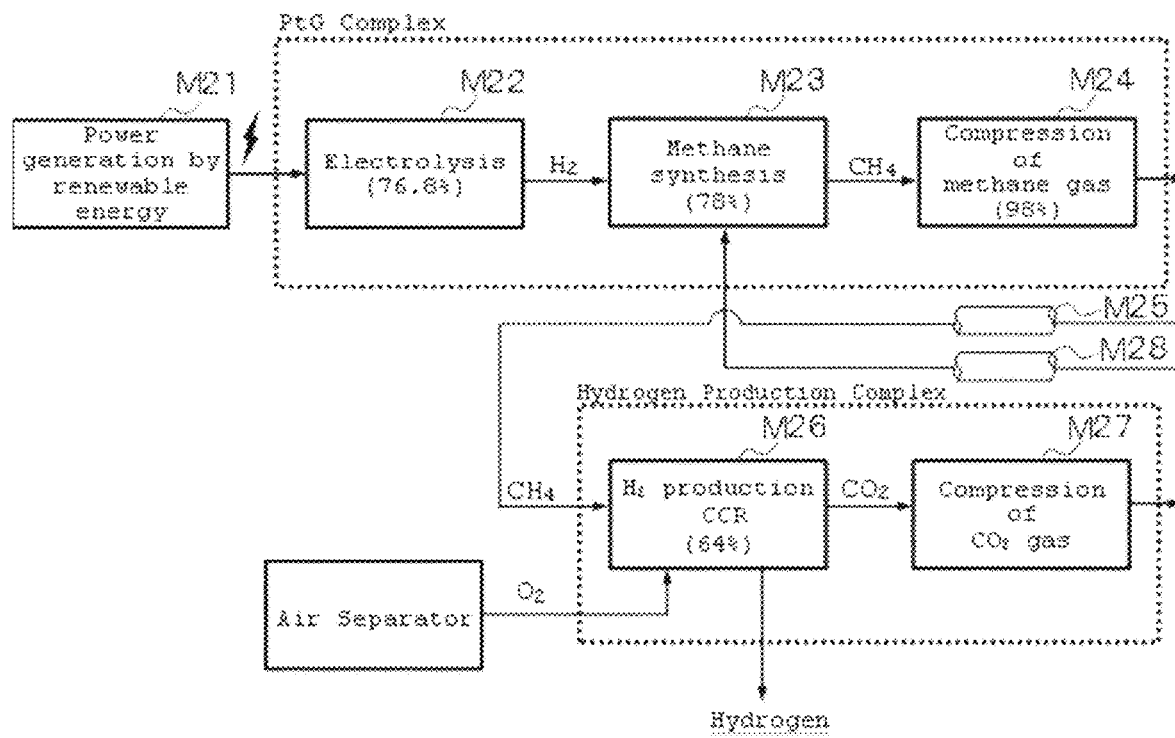
FIG. 43 shows a block flow diagram showing the energy transportation system of the second embodiment of the present invention.

As shown in FIG. 43, the energy transportation system of the second embodiment of the present invention includes a power generator M21 using a renewable energy, a water electrolyzer M22, a methane synthesizer M23, a methane gas compression unit M24, a methane transportation means M25, a hydrogen production and carbon capture unit M26, a $CO_2$ gas compression unit M27, and a $CO_2$ transportation means M28. It should be noted that numerical values in the parentheses of FIG. 43 denotes energy efficiencies. Among the above units and means, the power generator M21, the water electrolyzer M22, methane synthesizer M23, and hydrogen production and carbon recovery unit M26 are almost the same as the power generator M1, water electolyzer M2, methane synthesizer M3, and hydrogen production and carbon capture unit M10 of the first embodiment of the present invention described above, respectively, and therefore the following description mainly describe the methane gas compression unit M24, the methane transportation means M25, the $CO_2$ gas compression unit M27, and the $CO_2$ transportation unit M28.

The methane transportation unit M25 is a methane gas pipeline that transports methane gas produced by the methane synthesizer M23 from a methane synthesis site to a hydrogen energy consumption site. In order to maintain the pressure of methane gas flowing inside this methane gas pipeline within the range of about 50 to 125 barA, a methane gas compression unit M24 consisting of rotary positive displacement type compressors, each driven by a synchronous motor to which electricity from the renewable energy is supplied as an energy source via an inverter for variable speed motor, are provided at the front end of the methane gas pipeline as the methane transportation means M25 and at one or more relay points located at moderate intervals in the methane gas pipeline. In the subsequent stage of the methane transportation means M25, there is preferably provided a metering machine and a gas composition analyzer to measure the methane gas transported by the methane gas pipeline.

The $CO_2$ transportation means M28 is a $CO_2$ pipeline that transports recycled $CO_2$ collected by the hydrogen production and carbon capture unit M26 from the hydrogen energy consumption site to the methane synthesis site. As with the methane gas pipeline described above, in order to maintain the pressure of the recycled $CO_2$ flowing inside the $CO_2$ pipeline within the range of about 50 to 125 barA, a $CO_2$ gas compressor M27 consisting of compressors, each driven by a synchronous motor to which electricity from the renewable energy is supplied as an energy source via an inverter for variable speed motors, are installed at the front end of the $CO_2$ pipeline as the $CO_2$ transportation means M28 and at one or more relay points located at moderate intervals in the $CO_2$ pipeline.

The booster compressor for methane gas, which is installed when the pipeline for methane gas is laid over a long distance as described above, is preferably powered by feeding electricity from wind power generation to the VFD for synchronous motors via an extra-high-voltage direct current (HVDC) transmission, but purchased power may also be used to feed electricity to the VFD for synchronous motors. Similarly, the $CO_2$ booster compressor, which is installed when the $CO_2$ pipeline is long, is preferably powered by feeding electricity from wind power generation to the VFD for the synchronous motors via an extra-high-voltage direct current (HVDC) transmission, but purchased power may also be used to feed electricity to the VFD for the synchronous motor.

2-2 Green Energy Transportation Method

Next, an energy transportation method using the energy transportation system of the second embodiment of the present invention described above will be described. The energy transportation method using the energy transportation system of the second embodiment of the present invention includes a power generation step that generates and stores electricity from the renewable energy, a water electrolysis step that generates hydrogen by electrolysis of water using the power (electricity) obtained in the power generation step, a methane synthesis step that generates methane gas by methanation through a Sabatier reaction using the hydrogen generated in the water electrolysis step and a recycled $CO_2$ as raw materials, a methane transportation step that transports the methane gas produced in the methane synthesis step to an energy consumption site by using a means that does not emit $CO_2$ into the atmosphere, a hydrogen production and carbon capture step that produce hydrogen by an autothermal reforming method using the methane gas transported by the methane transportation step and oxygen prepared separately as feedstocks, and recovers concentrated $CO_2$ as a recycled $CO_2$ from a process gas generated during the hydrogen production, and a $CO_2$ transportation step that transports the recovered recycled $CO_2$ to the methane synthesis site where the methane synthesis step is performed by using a means that does not emit $CO_2$ into the atmosphere.

Of the above series of steps, the methane transportation step includes the transportation step of high-pressure methane gas through a methane gas pipeline extended from the methane synthesis site performing the methane synthesis step to the hydrogen energy consumption site, in which the high-pressure methane gas is obtained by compressing the methane gas in a rotary positive displacement type compressor driven by a synchronous motor to which electricity from the renewable energy is supplied as an energy source via a variable speed motor inverter. The $CO_2$ transportation step also includes the transportation step of high-pressure recycled $CO_2$ through a $CO_2$ pipeline extended from the hydrogen energy consumption site to the methane synthesis site, in which the high-pressure recycled $CO_2$ is obtained by compressing the recycled $CO_2$ with a rotary positive displacement type compressor driven by a synchronous motor to which electricity from the renewable energy is supplied as an energy source via a variable speed motor inverter.

In the above methane transportation step, the methane gas may be boosted or pressurized in the middle of the methane gas pipeline by using a methane gas booster compressor driven by a synchronous motor to which electricity from the renewable energy is supplied as an energy source via an ultra-high voltage direct current cable, or electricity is supplied from purchased electricity. Similarly, in the $CO_2$ transportation step, the recycled $CO_2$ may be boosted or pressurized in the middle of the $CO_2$ pipeline by using a $CO_2$ booster compressor driven by a synchronous motor to which electricity from the renewable energy is supplied as an energy source via an ultra-high voltage direct current cable, or electricity is supplied from purchased electricity.

Figure 44:
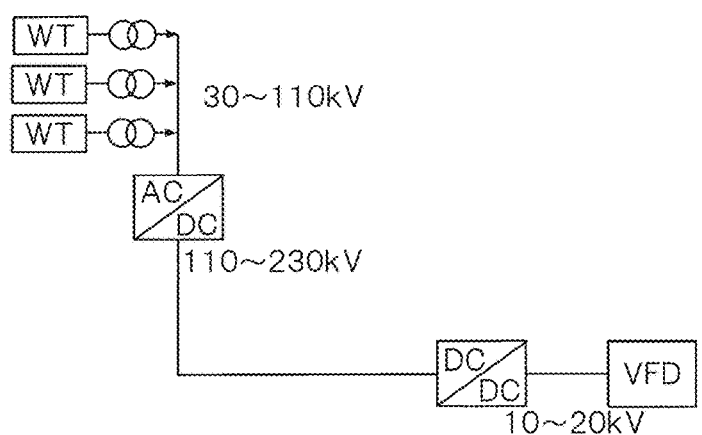
FIG. 44 shows a specific example of a power distribution diagram for the power generator that constitutes the energy transport system of the second embodiment of the present invention.

A configuration of the power distribution when using, for example, a wind turbine generator as an energy source of a renewable energy is shown in FIG. 44, in which the output voltage AC 690 V generated by the wind turbine generator (WT) is boosted to 30 to 110 kV by a transformer, and then converted to extra-high-voltage direct current of 110 to 230 kV by an AC-DC converter. This extra-high-voltage direct current is transmitted through an extra-high-voltage current cable, and then stepped down to 10 to 20 kV by a DC-DC converter installed near the synchronous motor.

CLAUSES (Clause 1)

A green energy transportation system comprising:
a power generator that generates and stores electricity using renewable energy;
a water electrolyzer that generates hydrogen by electrolyzing water using the electricity obtained from the power generator;
a methane synthesizer that generates methane through a Sabatier reaction using the hydrogen generated by the water electrolyzer and recycled $CO_2$ as raw materials;
a methane transportation means that transports the methane generated by the methane synthesizer to a hydrogen energy consumption site without emitting $CO_2$ into an atmosphere;
a hydrogen production and carbon capture unit that produces hydrogen by an autothermal reforming method, which is a process that generates a synthesis gas containing hydrogen and carbon monoxide by sequentially causing a partial oxidation reaction of methane and a steam reforming reaction to occur in a reactor, using the methane transported by the methane transportation means and oxygen prepared separately as raw materials and that recovers high-concentration $CO_2$ as recycled $CO_2$ from a process gas produced during the hydrogen production; and
a $CO_2$ transportation means that transports the recycled $CO_2$ without emitting $CO_2$ into an atmosphere to a methane synthesis site where the methane synthesizer is installed;
wherein the system further comprises an oxygen transportation means that transports the separately prepared oxygen generated by the water electrolyzer without emitting $CO_2$ into an atmosphere to the hydrogen energy consumption site.

(Clause 2)
The green energy transportation system according to clause 1, wherein the water electrolyzer is a solid oxide water electrolysis cell unit, a proton exchange membrane water electrolyzer, or an alkaline water electrolyzer.

(Clause 3)
The green energy transportation system according to clause 1, wherein an excess amount of hydrogen as the raw material is introduced into a reactor of the methane synthesizer in a range of 4.05 to 7.00 moles relative to a stoichiometric amount of 4 moles.

(Clause 4)
The green energy transportation system according to clause 1, wherein the methane synthesizer has a reverse water gas shift reactor that generates carbon monoxide from the raw materials of the hydrogen and recycled $CO_2$ immediately before a reactor that performs the Sabatier reaction.

(Clause 5)
The green energy transportation system according to clause 1, wherein a pressure of the hydrogen and oxygen generated by the water electrolyzer is within a range of 30 to 250 barA.

(Clause 6)
The green energy transportation system according to clause 1 further comprising: a hydrogen pressurize unit that pressurizes a portion of the generated hydrogen having a pressure above atmospheric pressure by a rotary positive displacement compressor and/or an electrochemical hydrogen compressor; and
a hydrogen storage facility that stores a high-pressure hydrogen made by the hydrogen pressurize unit, wherein the hydrogen pressurize unit and the hydrogen storage facility are provided downstream of the water electrolyzer.

(Clause 7)
The green energy transportation system according to clause 6 further comprising a fuel cell that uses the high-pressure hydrogen extracted from the hydrogen storage facility as a raw material.

(Clause 8)
The green energy transportation system according to clause 6, wherein the hydrogen pressurize unit is an electrochemical hydrogen compressor, and when the electrochemical hydrogen compressor is also used as an electrochemical hydrogen expander to depressurize the high-pressure hydrogen extracted from the hydrogen storage facility, a low-pressure hydrogen obtained by the depressurization is controlled at a temperature of 20 to 90° C. and a relative humidity of 60 to 95%.

(Clause 9)
The green energy transportation system according to clause 8, wherein the hydrogen pressurize unit is an electrochemical hydrogen compressor that pressurizes the generated hydrogen to 20 to 1000 barG, and the hydrogen storage facility has a capacity to store a quantity of the high-pressure hydrogen that ensures a minimum load ratio of 5% or more of the methane synthesizer.

(Clause 10)
The green energy transportation system according to clause 1, wherein the oxygen transportation means is a liquefied oxygen tanker that transports liquefied oxygen liquefied by an oxygen liquefaction unit at a temperature of −183.1 to −157° C. and a pressure of 1 to 8 barA.

(Clause 11)
The green energy transportation system according to clause 10, wherein the oxygen liquefaction unit pre-cools oxygen to a temperature of −20 to −40° C. by using a propane refrigerant, and then liquefies the oxygen by using a mixed refrigerant with a vapor pressure of 2.0-4.0 barA composed of 20-30 mol % nitrogen, 30-50 mol % methane, 20-30 mol % ethane or ethylene, and 5-15 mol % propane or propylene.

(Clause 12)
The green energy transportation system according to clause 10 further comprising a power generation and carbon capture unit that generates power by a solid oxide fuel cell system, an Allam cycle system, or an oxy-fuel combustion combined cycle system, where a portion of the methane transported by the methane transportation means is used as a raw material, and that recovers $CO_2$ generated during the power generation by the power generation and carbon capture unit, and when the Allam cycle system is used for the power generation, the liquefied oxygen transported by the oxygen transportation means is used and the $CO_2$ recovered by the power generation and carbon capture unit is mixed with the recycled $CO_2$.

(Clause 13)
The green energy transportation system according to clause 1 further comprising: a methane liquefaction unit that liquefies the methane by using a rotary positive displacement type refrigerant compressor driven by a synchronous motor to which electricity from a renewable energy is supplied as an energy source via a variable speed motor inverter so as to transport the methane generated by the methane synthesizer in a form of liquid;
a liquefied methane receiving and regasifying unit that regasifies the liquefied methane transported by the methane transportation means after received it in a liquefied methane storage tank such that the methane transportation means transports the liquefied methane liquefied by the methane liquefaction unit to a hydrogen energy consumption site by a liquefied methane tanker driven by a first power means without emitting $CO_2$ into an atmosphere;
a $CO_2$ liquefaction unit that liquefies the recycled $CO_2$ recovered in the power generation and carbon capture unit so as to transport the recycled $CO_2$ in a form of liquid; and
a liquefied $CO_2$ receiving and regasifying unit that regasifies the liquefied $CO_2$ transported by the $CO_2$ transportation means after received it in a liquefied $CO_2$ storage tank such that the $CO_2$ transportation means transports the liquefied $CO_2$ obtained in the $CO_2$ liquefaction unit to the methane synthesis site where the methane synthesizer is installed by a liquefied $CO_2$ tanker driven by a second power means without emitting $CO_2$ into an atmosphere,
wherein the methane liquefaction unit and the liquefied methane receiving and regasifying unit are respectively provided upstream and downstream of the methane transportation means, and the $CO_2$ liquefaction unit and the liquefied $CO_2$ receiving and regasifying unit are respectively provided upstream and downstream of the $CO_2$ transportation means.

(Clause 14)
The green energy transportation system according to clause 13, wherein each of the first power means and the second power means is either an internal combustion engine fueled by hydrogen or liquefied methane, a fuel cell using hydrogen as a raw material, or a rechargeable battery, and the hydrogen is a high-pressure hydrogen compressed to 70-1000 barG by an electrochemical hydrogen compressor.

(Clause 15)
The green energy transportation system according to clause 13, wherein the methane liquefaction unit performs a cascade process that sequentially cools methane using a plurality of refrigeration cycle systems including a propane refrigerant system, an ethylene or ethane refrigerant system, and a methane refrigerant system.

(Clause 16)
The green energy transportation system according to clause 13, wherein the methane liquefaction unit has a stripper that flushes the liquefied methane under a pressure of 0.8 to 2.0 barA and a temperature of −170 to −184° C., and a non-liquefied hydrogen produced by the stripper is recycled to the methane synthesizer and reused as a raw material.

(Clause 17)
The green energy transportation system according to clause 16, wherein the methane liquefaction unit has a heat exchanger to exchange heat between methane and refrigerant, and the heat exchanger is designed that a flow rate of methane containing the non-liquefied hydrogen is ensured to have at least 20% of a design flow rate.

(Clause 18)
The green energy transportation system according to clause 13, wherein the $CO_2$ liquefaction unit includes a compressor that compresses the recycled $CO_2$ recovered in the power generation and carbon capture unit to a pressure of 45 to 80 barA, and a heat exchanger that cools the recycled $CO_2$ for liquefaction to a temperature of −33 to −56° C. by using a cold heat from regasification of the liquefied methane having a pressure of 10 to 100 barA.

(Clause 19)
The green energy transportation system according to clause 18, wherein the $CO_2$ liquefaction unit further includes a liquid turbine that recovers power by depressurizing the liquefied $CO_2$, which is liquefied by the heat exchanger, to a pressure of 5.2 to 12.8 barA; or
an insulated spherical storage tank that stores the liquefied $CO_2$ at a pressure of 5.2 to 12.8 barA and a temperature of −56 to −33° C.

(Clause 20)
The green energy transportation system according to clause 18, wherein the $CO_2$ liquefaction unit further includes an insulated spherical storage tank that stores the liquefied $CO_2$ at a pressure 5.2 to 12.8 barA and temperature −56 to −33° C.

(Clause 21)
The green energy transportation system according to clause 1, wherein the methane transportation means includes a methane gas pipeline that transports a methane gas produced by the methane synthesizer to the hydrogen energy consumption site, and methane gas compressors installed at a front end and a relay point of the methane gas pipeline each consisting of a rotary positive displacement type driven by a synchronous motor to which electricity from the renewable energy is supplied as an energy source via a variable speed motor inverter so as to maintain a pressure of the methane gas flowing inside the methane gas pipeline in a range of 50 to 125 barA, and
the $CO_2$ transportation means includes a $CO_2$ pipeline that transports the recycled $CO_2$ recovered from the power generation and carbon capture unit to the methane synthesis site, and $CO_2$ gas compressors installed at a front end and a relay point of the $CO_2$ pipeline each driven by a synchronous motor to which electricity from the renewable energy as an energy source is supplied via a variable speed motor inverter so as to maintain a pressure of the recovered recycled $CO_2$ flowing inside the $CO_2$ pipeline in a range of 50 to 125 barA.

(Clause 22)
A green energy transportation method comprising:
a power generation step that generates and stores electricity using renewable energy;
a water electrolysis step that generates hydrogen by electrolyzing water using the electricity obtained in the power generation step;
a methane synthesis step that generates methane through a Sabatier reaction using the hydrogen generated by the water electrolysis step and recycled $CO_2$ as raw materials;
a methane transportation step that transports the methane generated in the methane synthesis step to a hydrogen energy consumption site by using a means that does not emit $CO_2$ to the atmosphere;
a hydrogen production and carbon capture step that produces hydrogen and carbon monoxide by an autothermal reforming method, which is a process that generates a synthesis gas containing hydrogen and carbon monoxide by sequentially causing a partial oxidation reaction of methane and a steam reforming reaction to occur in a reactor using the methane transported by the methane transportation step and oxygen prepared separately as raw materials and that recovers high concentration $CO_2$ as recycled $CO_2$ from a process gas produced during the hydrogen production; and
a $CO_2$ transportation step that transports the recycled $CO_2$ to a methane synthesis site where the methane synthesis step is carried out by using a means that does not emit $CO_2$ to the atmosphere;
wherein the method further comprises an oxygen transportation step that transports the separately prepared oxygen generated by the water electrolysis step to the hydrogen energy consumption site by using a means that does not emit $CO_2$ to the atmosphere.

(Clause 23)
The green energy transportation method according to clause 22, wherein the power generation by the renewable energy is performed by a wind turbine generator equipped with a storage battery, and the storage battery is set to have a capacity value in a range of 106 to 126% of a wind turbine rating of the wind turbine, and the storage battery is operated in an operational range of 20 to 90% of the wind turbine rating.

(Clause 24)
The green energy transportation method according to clause 22, wherein a portion of hydrogen generated by the water electrolysis step is pressurized and stored as a high-pressure hydrogen so as to supply hydrogen as a raw material at a constant rate to the methane synthesis step.

(Clause 25)
The green energy transportation method as claimed in clause 23, wherein the electrolysis of water in the water electrolysis step is set to have a minimum electrolysis load, which is a power required for the electrolysis of water, within a range of 5 to 30% of the wind turbine rating, and if a generated power by the wind turbine, whose variable is the wind speed, is less than the minimum electrolysis load, its shortage is made up from the storage battery, and if the generated power is equal to or above the minimum electrolysis load, the generated power is used for the electrolysis of water and an excess power of the generated power over the minimum electrolysis load is charged to the storage battery under conditions at an upper limit or below that is set within a range of 5 to 15% of the wind turbine rating and within the operational range of the storage battery.
(Clause 26)

The green energy transportation method according to clause 22 further comprising: a methane liquefaction step that liquefies the methane by using a rotary positive displacement type refrigerant compressor driven by a synchronous motor to which electricity from a renewable energy is supplied as an energy source via a variable speed motor inverter;
  a liquefied methane receiving and regasifying step that regasifies the liquefied methane after received it in a liquefied methane storage tank such that the methane transportation step transports the liquefied methane liquefied by the methane liquefaction step to a hydrogen energy consumption site by a liquefied methane tanker driven by a first power means without emitting $CO_2$ into an atmosphere;
  a $CO_2$ liquefaction step that liquefies the recycled $CO_2$; and
  a liquefied $CO_2$ receiving and regasifying unit that regasifies the liquefied $CO_2$ transported by the $CO_2$ transportation step after received it in a liquefied $CO_2$ storage tank such that the $CO_2$ transportation step transports the liquefied $CO_2$ liquefied in the $CO_2$ liquefaction step to the methane synthesis site where the methane synthesis step is performed by a liquefied $CO_2$ tanker driven by a second power means without emitting $CO_2$ into an atmosphere,
  wherein the methane liquefaction step and the liquefied methane receiving and regasifying step are respectively performed before and after the methane transportation step, and the $CO_2$ liquefaction step and the liquefied $CO_2$ receiving and regasifying unit are respectively performed before and after the $CO_2$ transportation step.
(Clause 27)

The green energy transportation method according to clause 26, wherein the wind turbine generator is a permanent magnet synchronous generator, and the AC voltage generated by the wind turbine generator is boosted to 30 to 110 kV by a transformer and then converted to a DC power having DC voltage of 10 to 20 kV and DC current of 5.0 to 10.0 kA by an AC-DC converter, and the DC power is fed to an electrolyzer that performs the electrolysis of water via a DC-DC converter consisting of a solid-state transformer to step down to 100 to 150V as well as fed to the synchronous motor that drives the refrigerant compressor.
(Clause 28)

The green energy transportation method according to clause 26, wherein dedicated cryogenic tankers are respectively used for the liquefied methane transportation and the liquefied $CO_2$ transportation, and when the liquefied $CO_2$ to be transported has a pressure of 5.2 to 12.8 barA and a temperature of −56 to −33° C., the cryogenic tanker for the liquefied $CO_2$ is equipped with 3 to 7 spherical tanks or 4 to 8 horizontal cylindrical tanks, and material of the tanks is aluminum-killed carbon steel, 1.5% Ni nickel steel, or high tensile nickel steel for low-temperature service.
(Clause 29)

The green energy transportation method according to clause 28, wherein the cryogenic tanker for liquefied methane transportation is a Moss type with 3 to 7 spherical tanks, and when the liquefied methane to be transported has a pressures of −0.05 to 0.25 barG and a temperature of −162° C., material of the tanks is 6-7.5% Ni steel, 8.5-9.5% Ni steel, 18-8 stainless steel, or aluminum alloy 5083, and when the liquefied methane has pressures of 8.0 to 12.8 barA and temperatures of −120 to −130° C., material of the tanks is 6-7.5% Ni steel, 8.5-9.5% Ni steel, 18-8 stainless steel, aluminum alloy 5083, or 5% Ni steel.
(Clause 30)

The green energy transportation method according to clause 26, wherein the methane transportation step transports a liquefied methane at a pressure of −0.05 to 0.25 barG and a temperature of −162° C., and the $CO_2$ transportation step transports liquefied $CO_2$ at a pressure of 5.2 to 12.8 barA and a temperature of −56 to −33° C., and a common cryogenic tanker with 3 to 7 spherical tanks or 4 to 8 horizontal cylindrical tanks is shared for transportation of the liquefied methane and the liquefied $CO_2$, where material of the tanks is 6-7.5% Ni steel, 8.5-9.5% Ni steel, 18-8 stainless steel, or aluminum alloy 5083.
(Clause 31)

The green energy transportation method according to clause 26, wherein the methane transportation step transports a pressurized liquefied methane at a pressure of 8.0 to 12.8 barA and a temperature of −120 to −130° C., and the $CO_2$ transportation step transports a liquefied $CO_2$ at a pressure of 5.2 to 10.8 barA and a temperature of −56 to −33° C., and a common cryogenic tanker with 3 to 7 spherical tanks or 4 to 8 horizontal cylindrical tanks is shared for transportation of the pressurized liquefied methane and the liquefied $CO_2$, where material of the tanks is 6-7.5% Ni steel, 8.5-9.5% Ni steel, 18-8 stainless steel, aluminum alloy 5083, or 5% Ni steel.
(Clause 32)

The green energy transportation method according to clause 31, wherein the pressurized liquefied methane is produced by exchanging heat of a pre-pressurized methane gas with a refrigerant for cooling, followed by flushing to partially depressurize to a pressure of 8.0 to 12.8 barA by using an expansion unit.
(Clause 33)

The green energy transportation method according to clause 22, wherein the oxygen transportation step transports a liquefied oxygen liquefied by the oxygen liquefaction unit at a pressure of 1.0 to 13 barA and a temperature of −183.9 to −149° C., and the $CO_2$ transportation step transports a liquefied $CO_2$ at a pressure of 5.2 to 10.8 barA and a temperature of −56 to −33° C., and a common cryogenic tanker with 3 to 7 spherical tanks or 4 to 8 horizontal cylindrical tanks is shared for transportation of the liquefied oxygen and the liquefied $CO_2$, where material of the tanks is 6-7.5% Ni steel, 8.5-9.5% Ni steel, 18-8 stainless steel, aluminum alloy 5083, or 5% Ni steel.
(Clause 34)

The green energy transportation method according to clause 30 or 31, wherein each of the tanks on the cryogenic tanker has a first feed nozzle with a discharge outlet at an upper section in the tank, a second feed nozzle with a discharge outlet at a lower section in the tank, a first vent nozzle with a discharge outlet at an upper section of the tank, a second vent nozzle with a discharge outlet at a lower section of the tank, and a discharge nozzle of a column for a submerged pump, and the liquefied methane and the liquefied $CO_2$ are alternately transported by repeating the following operations S1 to S6 using these five nozzles:
  (S1) Liquefied methane in the tank is unloaded by operating the submerged pump while introducing low-temperature methane gas as a displacement gas into the tank from the first feed nozzle, and then pressurizing the tank by continuously introducing the methane gas after the unloading is completed.

(S2) Low-temperature CO$_2$ gas is introduced from a lower section of the tank through the second feed nozzle, and the methane gas in the tank is vented through the first vent nozzle and the discharge nozzle of the submerged pump to replace the methane gas with the CO$_2$ gas.

(S3) Low-temperature liquefied CO$_2$ is introduced from a lower section of the tank by the second feed nozzle for loading, and the CO$_2$ gas in the tank is vented from the first vent nozzle and the discharge nozzle of the submerged pump to replace the CO$_2$ gas with the liquid CO$_2$.

(S4) Liquid CO$_2$ in the tank is unloaded by operating the submerged pump while introducing low-temperature CO$_2$ gas into the tank as the replacement gas from the first feed nozzle.

(S5) Low-temperature methane gas is introduced from an upper section of the tank and the pump column by the first feed nozzle and the discharge nozzle of the submerged pump, and the CO$_2$ gas in the tank is vented from the second vent nozzle to replace the CO$_2$ gas with the methane gas.

(S6) Liquefied methane is sprayed from an upper section of the tank by the first feed nozzle to cool the spherical tank to a very low temperature, and then liquefied methane is introduced from the second feed nozzle while venting methane gas from the first vent nozzle and the discharge nozzle of the submerged pump so as to perform loading with gradual rising of a liquid level.

(Clause 35)

The green energy transportation method according to clause 34, wherein the operation S1 is sequentially performed to the tanks filled with the liquefied methane one by one, and when the operation S1 is completed, the operations S2 and S3 are continuously performed in each of the tanks, which eventually performs unloading of the liquefied methane and loading of the liquefied CO$_2$ in all the tanks at a liquefied methane receiving site, whereas the operation S4 is sequentially performed to the tanks filled with the liquefied CO$_2$ one by one, and when the operation S4 is completed, the operations S5 and S6 are continuously performed in each of the tanks which eventually performs unloading of the liquefied CO$_2$ and loading of the liquefied methane in all the tanks at the methane synthesis site.

(Clause 36)

The green energy transportation method according to clause 33, wherein each of the tanks on the cryogenic tanker has a first feed nozzle with a discharge outlet at an upper section in the tank, a second feed nozzle with a discharge outlet at a lower section in the tank, a first vent nozzle with a discharge outlet at an upper section of the tank, a second vent nozzle with a discharge outlet at a lower section of the tank, and a discharge nozzle of a column for a submerged pump, and the liquefied oxygen and the liquefied CO$_2$ are alternately transported by repeating the following operations S1 to S6 using these five nozzles:

(S1) Liquefied oxygen in the tank is unloaded by operating the submerged pump while introducing low-temperature oxygen gas as a displacement gas into the tank from the first feed nozzle, and then pressurizing the tank by continuously introducing the oxygen gas after the unloading is completed.

(S2) Low-temperature CO$_2$ gas is introduced from a lower section of the tank through the second feed nozzle, and the oxygen gas in the tank is vented through the first vent nozzle and the discharge nozzle of the submerged pump to replace the oxygen gas with the CO$_2$ gas.

(S3) Low-temperature liquefied CO$_2$ is introduced from a lower section of the tank by the second feed nozzle for loading, and the CO$_2$ gas in the tank is vented from the first vent nozzle and the discharge nozzle of the submerged pump to replace the CO$_2$ gas with the liquid CO$_2$.

(S4) Liquid CO$_2$ in the tank is unloaded by operating the submerged pump while introducing low-temperature CO$_2$ gas into the tank as the replacement gas from the first feed nozzle.

(S5) Low-temperature oxygen gas is introduced from an upper section of the tank and the pump column by the first feed nozzle and the discharge nozzle of the submerged pump, and the CO$_2$ gas in the tank is vented from the second vent nozzle to replace the CO$_2$ gas with the oxygen gas.

(S6) Liquefied oxygen is sprayed from an upper section of the tank by the first feed nozzle to cool the spherical tank to a very low temperature, and then liquefied oxygen is introduced from the second feed nozzle while venting oxygen gas from the first vent nozzle and the discharge nozzle of the submerged pump so as to perform loading with gradual rising of a liquid level.

(Clause 37)

The green energy transportation method according to clause 36, wherein the operation S1 is sequentially performed to the tanks filled with the liquefied oxygen one by one, and when the operation S1 is completed, the operations S2 and S3 are continuously performed in each of the tanks, which eventually performs unloading of the liquefied oxygen and loading of the liquefied CO$_2$ in all the tanks at the hydrogen energy consumption site, whereas the operation S4 is sequentially performed to the tanks filled with the liquefied CO$_2$ one by one, and when the operation S4 is completed, the operations S5 and S6 are continuously performed in each of the tanks which eventually performs unloading of the liquefied CO$_2$ and loading of the liquefied oxygen in all the tanks at the methane synthesis site.

(Clause 38)

The green energy transportation method according to clause 22, wherein the methane transportation step uses a methane gas pipeline extended from the methane synthesis site where the methane synthesis step is performed to a hydrogen energy consumption site to transport a high-pressure methane gas obtained by compressing the methane by a rotary positive displacement type compressor driven by a synchronous motor to which electricity from the renewable energy as an energy source is supplied via a variable speed motor inverter, and the CO$_2$ transport step uses a CO$_2$ pipeline extended from the hydrogen energy consumption site to the methane synthesis site to transport a high-pressure recycled CO$_2$ obtained by compressing the recycled CO$_2$ with a rotary positive displacement type compressor driven by a synchronous motor to which electricity from the renewable energy as an energy source is supplied via a variable speed motor inverter.

(Clause 39)

The green energy transportation method according to clause 38, wherein the methane transportation step includes a methane gas pressurize step in a middle of the methane gas pipeline which uses a booster compressor for methane gas driven by a synchronous motor to which electricity is supplied from a purchased electricity or from the renewable energy as an energy source via an ultra-high voltage direct current cable, and the $CO_2$ transportation step includes a recycled $CO_2$ pressurize step in the middle of the $CO_2$ pipeline by using a booster compressor for $CO_2$ driven by a synchronous motor to which electricity is supplied from a purchased electricity or from the renewable energy as an energy source via an ultra-high voltage direct current cable.

(Clause 40)

The green energy transportation method according to clause 22, wherein an equivalent amount of $CO_2$ emission into an atmosphere is equal to or less than 3% of carbon consumed in the entire steps from the power generation step to the $CO_2$ transportation step.

(Clause 41)

The green energy transportation method according to clause 40, wherein $CO_2$ recovered from a biomass power generation or a combustion gas of biomass combustion facilities or $CO_2$ recovered from direct air capture is used as the recycled $CO_2$ to offset the 3% or less of the $CO_2$ emissions.

EXPLANATION OF SYMBOLS

1 Wind power generator
2 Power collection system
3 Power transmission line
4 Substation
10 Primary pressurize unit
11 Secondary pressurize unit
12 High-pressure hydrogen storage facility
12a Primary piping
12b Manifold
12c Storage pipes
13 Fuel cell facility
14 Pipe
15 Housing
16 Unit
17 Leg
21, 22, 23, 24 Reactor
25, 26, 27, 28, 29 Cooler
30 Carbon dioxide removal unit
31, 41 First heat exchanger
32, 42 Second heat exchanger
33, 43 Third heat exchanger
34 Propane multi-stage compressor
35 Dryer
36 Scrubbing column
37a, 37b, 37c MR compressor
38 Main cryogenic heat exchanger
39, 47, 55 Flash drum
44 Propane compressor
45 Ethylene compressor
46 Methane compressor
51, 52 Compressor
53 Expander
54 Heat exchanger
61: Pressurized heat exchanger
62: Expansion unit
63: Cooling system
71: Unloading arm
72: Unloading line
73: Liquefied methane tank
74: First pump
75a: Second pump
75b: Booster pump
76a: High-pressure vaporizer
76b: Low-pressure vaporizer
77 Return gas blower
78 BOG compressor
81 Pre-reformer
82 ATR reactor
83 1st shift reactor
84 2nd shift reactor
85 Gas-liquid separator
86 Decarbonation unit
87 Pressure swing adsorption unit
91 Absorption column
92 Reboiler
93 Regeneration column
94 Circulation system
101 Reformer
$102_1$, $102_2$, $102_n$ Fuel cells
103 Condenser
111 Turbine
112 Heat exchanger
113 Compressor
121 Compressor
122 Heat exchanger
123 Liquid turbine
124 Spherical storage tank
L1: Discharge nozzle
N1: First supply nozzle
N2: Second supply nozzle
V1: First vent nozzle
V2: Second vent nozzle
T: Cryogenic tanker

The invention claimed is:

1. A green energy transportation system comprising:
a power generator that generates and stores electricity using renewable energy;
a water electrolyzer that generates hydrogen by electrolyzing water using the electricity obtained from the power generator;
a methane synthesizer that generates methane through a Sabatier reaction using the hydrogen generated by the water electrolyzer and recycled $CO_2$ as raw materials;
a methane transportation means that transports the methane generated by the methane synthesizer to a hydrogen energy consumption site without emitting $CO_2$ into an atmosphere;
a hydrogen production and carbon capture unit that produces hydrogen by an autothermal reforming method, which is a process that generates a synthesis gas containing hydrogen and carbon monoxide by sequentially causing a partial oxidation reaction of methane and a steam reforming reaction to occur in a reactor, using the methane transported by the methane transportation means and oxygen prepared separately as raw materials and that recovers high-concentration $CO_2$ as the recycled $CO_2$ from a process gas produced during the hydrogen production; and
a $CO_2$ transportation means that transports the recycled $CO_2$ without emitting $CO_2$ into an atmosphere to a methane synthesis site where the methane synthesizer is installed;
wherein the system further comprises an oxygen transportation means that transports the separately prepared oxygen generated by the water electrolyzer without emitting $CO_2$ into an atmosphere to the hydrogen energy consumption site.

2. The green energy transportation system according to claim 1, wherein an excess amount of hydrogen as the raw material is introduced into a reactor of the methane synthesizer in a range of 4.05 to 7.00 moles relative to a stoichiometric amount of 4 moles.

3. The green energy transportation system according to claim 1, wherein the methane synthesizer has a reverse water gas shift reactor that generates carbon monoxide from the raw materials of the hydrogen and recycled $CO_2$ immediately before a reactor that performs the Sabatier reaction.

4. The green energy transportation system according to claim 1 further comprising: a hydrogen pressurize unit that pressurizes a portion of the generated hydrogen having a pressure above atmospheric pressure by a rotary positive displacement compressor and/or an electrochemical hydrogen compressor; and
a hydrogen storage facility that stores a high-pressure hydrogen made by the hydrogen pressurize unit, wherein the hydrogen pressurize unit and the hydrogen storage facility are provided downstream of the water electrolyzer.

5. The green energy transportation system according to claim 4 further comprising a fuel cell that uses the high-pressure hydrogen extracted from the hydrogen storage facility as a raw material.

6. The green energy transportation system according to claim 4, wherein the hydrogen pressurize unit is an electrochemical hydrogen compressor, and when the electrochemical hydrogen compressor is also used as an electrochemical hydrogen expander to depressurize the high-pressure hydrogen extracted from the hydrogen storage facility, a low-pressure hydrogen obtained by the depressurization is controlled at a temperature of 20 to 90° C. and a relative humidity of 60 to 95%.

7. The green energy transportation system according to claim 6, wherein the hydrogen pressurize unit is an electrochemical hydrogen compressor that pressurizes the generated hydrogen to 20 to 1000 barG, and the hydrogen storage facility has a capacity to store a quantity of the high-pressure hydrogen that ensures a minimum load ratio of 5% or more of the methane synthesizer.

8. The green energy transportation system according to claim 1, wherein the oxygen transportation means is a liquefied oxygen tanker that transports liquefied oxygen liquefied by an oxygen liquefaction unit at a temperature of −183.1 to −157° C. and a pressure of 1 to 8 barA.

9. The green energy transportation system according to claim 8 further comprising a power generation and carbon capture unit that generates power by a solid oxide fuel cell system, an Allam cycle system, or an oxy-fuel combustion combined cycle system, where a portion of the methane transported by the methane transportation means is used as a raw material, and that recovers $CO_2$ generated during the power generation by the power generation and carbon capture unit, and when the Allam cycle system is used for the power generation, the liquefied oxygen transported by the oxygen transportation means is used and the $CO_2$ recovered by the power generation and carbon capture unit is mixed with the recycled $CO_2$.

10. The green energy transportation system according to claim 1 further comprising: a methane liquefaction unit that liquefies the methane by using a rotary positive displacement type refrigerant compressor driven by a synchronous motor to which electricity from a renewable energy is supplied as an energy source via a variable speed motor inverter so as to transport the methane generated by the methane synthesizer in a form of liquid;
a liquefied methane receiving and regasifying unit that regasifies the liquefied methane transported by the methane transportation means after received it in a liquefied methane storage tank such that the methane transportation means transports the liquefied methane liquefied by the methane liquefaction unit to a hydrogen energy consumption site by a liquefied methane tanker driven by a first power means without emitting $CO_2$ into an atmosphere;
a $CO_2$ liquefaction unit that liquefies the recycled $CO_2$ recovered in the power generation and carbon capture unit so as to transport the recycled $CO_2$ in a form of liquid; and
a liquefied $CO_2$ receiving and regasifying unit that regasifies the liquefied $CO_2$ transported by the $CO_2$ transportation means after received it in a liquefied $CO_2$ storage tank such that the $CO_2$ transportation means transports the liquefied $CO_2$ obtained in the $CO_2$ liquefaction unit to the methane synthesis site where the methane synthesizer is installed by a liquefied $CO_2$ tanker driven by a second power means without emitting $CO_2$ into an atmosphere,
wherein the methane liquefaction unit and the liquefied methane receiving and regasifying unit are respectively provided upstream and downstream of the methane transportation means, and the $CO_2$ liquefaction unit and the liquefied $CO_2$ receiving and regasifying unit are respectively provided upstream and downstream of the $CO_2$ transportation means.

11. The green energy transportation system according to claim 10, wherein each of the first power means and the second power means is either an internal combustion engine fueled by hydrogen or liquefied methane, a fuel cell using hydrogen as a raw material, or a rechargeable battery, and the hydrogen is a high-pressure hydrogen compressed to 70-1000 barG by an electrochemical hydrogen compressor.

12. The green energy transportation system according to claim 10, wherein the methane liquefaction unit performs a cascade process that sequentially cools methane using a plurality of refrigeration cycle systems including a propane refrigerant system, an ethylene or ethane refrigerant system, and a methane refrigerant system.

13. The green energy transportation system according to claim 10, wherein the methane liquefaction unit has a stripper that flushes the liquefied methane under a pressure of 0.8 to 2.0 barA and a temperature of −170 to −184° C., and a non-liquefied hydrogen produced by the stripper is recycled to the methane synthesizer and reused as a raw material.

14. The green energy transportation system according to claim 13, wherein the methane liquefaction unit has a heat exchanger to exchange heat between methane and refrigerant, and the heat exchanger is designed that a flow rate of methane containing the non-liquefied hydrogen is ensured to have at least 20% of a design flow rate.

15. The green energy transportation system according to claim 10, wherein the $CO_2$ liquefaction unit includes a compressor that compresses the recycled $CO_2$ recovered in the power generation and carbon capture unit to a pressure of 45 to 80 barA, and a heat exchanger that cools the recycled $CO_2$ for liquefaction to a temperature of −33 to −56° C. by using a cold heat from regasification of the liquefied methane having a pressure of 10 to 100 barA.

16. The green energy transportation system according to claim 15, wherein the $CO_2$ liquefaction unit further includes a liquid turbine that recovers power by depressurizing the liquefied $CO_2$, which is liquefied by the heat exchanger, to a pressure of 5.2 to 12.8 barA; or an insulated spherical storage tank that stores the liquefied $CO_2$ at a pressure of 5.2 to 12.8 barA and a temperature of −56 to −33° C.

17. The green energy transportation system according to claim 1, wherein the methane transportation means includes a methane gas pipeline that transports a methane gas produced by the methane synthesizer to the hydrogen energy consumption site, and methane gas compressors installed at a front end and a relay point of the methane gas pipeline each consisting of a rotary positive displacement type driven by a synchronous motor to which electricity from the renewable energy is supplied as an energy source via a variable speed motor inverter so as to maintain a pressure of the methane gas flowing inside the methane gas pipeline in a range of 50 to 125 barA, and the $CO_2$ transportation means includes a $CO_2$ pipeline that transports the recycled $CO_2$ recovered from the power generation and carbon capture unit to the methane synthesis site, and $CO_2$ gas compressors installed at a front end and a relay point of the $CO_2$ pipeline each driven by a synchronous motor to which electricity from the renewable energy as an energy source is supplied via a variable speed motor inverter so as to maintain a pressure of the recovered recycled $CO_2$ flowing inside the $CO_2$ pipeline in a range of 50 to 125 barA.

18. A green energy transportation method comprising:
a power generation step that generates and stores electricity using renewable energy;
a water electrolysis step that generates hydrogen by electrolyzing water using the electricity obtained in the power generation step;
a methane synthesis step that generates methane through a Sabatier reaction using the hydrogen generated by the water electrolysis step and recycled $CO_2$ as raw materials;
a methane transportation step that transports the methane generated in the methane synthesis step to a hydrogen energy consumption site by using a means that does not emit $CO_2$ to the atmosphere;
a hydrogen production and carbon capture step that produces hydrogen and carbon monoxide by an autothermal reforming method, which is a process that generates a synthesis gas containing hydrogen and carbon monoxide by sequentially causing a partial oxidation reaction of methane and a steam reforming reaction to occur in a reactor using the methane transported by the methane transportation step and oxygen prepared separately as raw materials and that recovers high concentration $CO_2$ as recycled $CO_2$ from a process gas produced during the hydrogen production; and
a $CO_2$ transportation step that transports the recycled $CO_2$ to a methane synthesis site where the methane synthesis step is carried out by using a means that does not emit $CO_2$ to the atmosphere;
wherein the method further comprises an oxygen transportation step that transports the separately prepared oxygen generated by the water electrolysis step to the hydrogen energy consumption site by using a means that does not emit $CO_2$ to the atmosphere.

19. The green energy transportation method according to claim 18, wherein a part of hydrogen generated by the water electrolysis step is pressurized and stored as a high-pressure hydrogen so as to supply hydrogen as a raw material at a constant rate to the methane synthesis step, or to use as a raw material for a fuel cell used as a backup power supply of the water electrolysis step.

20. The green energy transportation method according to claim 18 further comprising: a methane liquefaction step that liquefies the methane by using a rotary positive displacement type refrigerant compressor driven by a synchronous motor to which electricity from a renewable energy is supplied as an energy source via a variable speed motor inverter;

a liquefied methane receiving and regasifying step that regasifies the liquefied methane after received it in a liquefied methane storage tank such that the methane transportation step transports the liquefied methane liquefied by the methane liquefaction step to a hydrogen energy consumption site by a liquefied methane tanker driven by a first power means without emitting $CO_2$ into an atmosphere;
a $CO_2$ liquefaction step that liquefies the recycled $CO_2$; and
a liquefied $CO_2$ receiving and regasifying unit that regasifies the liquefied $CO_2$ transported by the $CO_2$ transportation step after received it in a liquefied $CO_2$ storage tank such that the $CO_2$ transportation step transports the liquefied $CO_2$ liquefied in the $CO_2$ liquefaction step to the methane synthesis site where the methane synthesis step is performed by a liquefied $CO_2$ tanker driven by a second power means without emitting $CO_2$ into an atmosphere,
wherein the methane liquefaction step and the liquefied methane receiving and regasifying step are respectively performed before and after the methane transportation step, and the $CO_2$ liquefaction step and the liquefied $CO_2$ receiving and regasifying unit are respectively performed before and after the $CO_2$ transportation step.

* * * * *